United States Patent
Averbuch et al.

(10) Patent No.: US 9,843,596 B1
(45) Date of Patent: Dec. 12, 2017

(54) ANOMALY DETECTION IN DYNAMICALLY EVOLVING DATA AND SYSTEMS

(71) Applicant: ThetaRay Ltd., Hod HaSharon (IL)

(72) Inventors: Amir Averbuch, Tel Aviv Yaffo (IL); Ronald R. Coifman, North Haven, CT (US); Gil David, Zichron-Yaakov (IL)

(73) Assignee: ThetaRay Ltd., Hod Hassharon (IL)

( * ) Notice: Subject to any disclaimer, the term of this patent is extended or adjusted under 35 U.S.C. 154(b) by 0 days.

(21) Appl. No.: 14/791,269

(22) Filed: Jul. 3, 2015

Related U.S. Application Data

(63) Continuation of application No. 12/263,473, filed on Nov. 2, 2008.

(60) Provisional application No. 60/985,176, filed on Nov. 2, 2007, provisional application No. 60/985,172, filed on Nov. 2, 2007.

(51) Int. Cl.
H04L 29/06 (2006.01)

(52) U.S. Cl.
CPC ........ *H04L 63/1416* (2013.01); *H04L 63/145* (2013.01)

(58) Field of Classification Search
CPC ............. H04L 63/1416; H04L 63/1408; H04L 63/1441; H04L 63/1458
USPC ........................................... 726/23; 370/252
See application file for complete search history.

(56) References Cited

U.S. PATENT DOCUMENTS

| | | | |
|---|---|---|---|
| 4,344,142 A | 8/1982 | Diehr et al. | |
| 5,446,874 A * | 8/1995 | Waclawsky | H04L 43/00 714/1 |
| 8,166,554 B2 * | 4/2012 | John | H04L 63/102 726/26 |
| 8,204,974 B1 * | 6/2012 | Bhattacharyya | H04L 41/142 709/223 |
| 2003/0145232 A1 * | 7/2003 | Poletto | H04L 63/1408 726/22 |
| 2003/0236990 A1 * | 12/2003 | Hrastar | H04L 63/1416 726/11 |
| 2006/0045353 A1 * | 3/2006 | Brand | G06K 9/6232 382/224 |
| 2006/0156404 A1 | 7/2006 | Day | |

(Continued)

FOREIGN PATENT DOCUMENTS

WO   2008012812 A2   1/2008

OTHER PUBLICATIONS

Wang, "Abstracting massive data for lightweight intrusion detection in computer networks", 2016, Information Sciences, p. 1-13.*

(Continued)

*Primary Examiner* — Thanhnga B Truong
*Assistant Examiner* — Gregory Lane
(74) *Attorney, Agent, or Firm* — Nathan & Associates Patent Agents Ltd.; Menachem Nathan

(57) ABSTRACT

Detection of abnormalities in multi-dimensional data is performed by processing the multi-dimensional data to obtain a reduced dimension embedding matrix, using the reduced dimension embedding matrix to form a lower dimension (of at least 2D) embedded space, applying an out-of-sample extension procedure in the embedded space to compute coordinates of a newly arrived data point and using the computed coordinates of the newly arrived data point and Euclidean distances to determine whether the newly arrived data point is normal or abnormal.

18 Claims, 31 Drawing Sheets

(56) References Cited

U.S. PATENT DOCUMENTS

| | | | |
|---|---|---|---|
| 2006/0212942 A1* | 9/2006 | Barford | H04L 63/1416 726/24 |
| 2006/0221967 A1* | 10/2006 | Narayan | H04L 45/00 370/392 |
| 2007/0064617 A1* | 3/2007 | Reyes | H04L 63/1425 370/252 |
| 2007/0206498 A1* | 9/2007 | Chang | H04L 43/045 370/232 |
| 2008/0181503 A1 | 7/2008 | Schclar et al. | |
| 2009/0234899 A1* | 9/2009 | Kramer | G06F 17/30539 708/200 |
| 2009/0241197 A1* | 9/2009 | Troyansky | H04L 12/5885 726/26 |
| 2010/0071061 A1* | 3/2010 | Crovella | H04L 63/1425 726/23 |

OTHER PUBLICATIONS

R.R. Coifman and S. Lafon; "Diffusion maps", Applied and Computational Harmonic Analysis, 21(1), 5-30, 2006.

W.B. Johnson and J. Lindenstrauss; "Extensions of Lipshitz mapping into Hilbert space",vol. 26 of Contemporary Mathematics, , pp. 189-206, Amer. Math. Soc.,30 1984.

A. Averbuch, G. David, "Clustering mixed data via diffusion maps", Internal 20 Report 2008.

R.R. Coifman and S. Lafon; "Geometric harmonics: A novel tool for multiscale out-of-sampleextension of empirical functionsA tool for multiscale out-of-sample extension of empirical functions", Applied and Computational Harmonic Analysis, 21(1), 31-52, 2006.

A. Averbuch, A. Schclar; "Diffusion bases for dimensionality reduction", IJCCI (NCTA) pp. 151-156. 2015.

David Cavero Pintado, PhD Dissertation, Christian Albrechts University, Kiel, Germany, 2006.

C. D. Manning, H. Schü tze, "Foundations of Statistical Natural Language Processing", MIT Press: 1999.

Lincoln Laboratory, MIT, "DARPA Intrusion Detection Evaluation Datasets".

Lafon et al; "Data fusion and multicue data matching by diffusion maps" IEEE transactions on pattern analysis and machine intelligence vol. 82, No. 11 pp. 1784-1797. 2006.

Coifman et al; "Diffusion wavelets" Elsevier Science. 2004.

Thomasaian et al; "Recursive Clustering with Singular Value Decomposition for Dimension Reduction in Content-based Retrieval of Large Image/Video Databases" IBM report .1997.

Nikerson et al; "Data Reduction Techniques abd Hypothesis Testing for Analysis of Benchmarking Data" International Journal of Production Research vol. 37, No. 8, pp. 1717-1741. 1999.

Lendasse et al; "Dimension reduction of technical indicators for the prediction of financial times—Application to the BEL20 Market index" European Journal Economic and Social System. 15 N° 2 pp. 31-48.2001.

\* cited by examiner

Normal cluster          Abnormalities

Normal cluster          Abnormalities

Top

Bottom

GRADIENTS    COHERENCY MEASURES

EACH PIXEL IS REPRESENTED BY 8 FEATURES

Top

Bottom

US 9,843,596 B1

ANOMALY DETECTION IN DYNAMICALLY EVOLVING DATA AND SYSTEMS

CROSS REFERENCE TO RELATED APPLICATIONS

This application is a Continuation application of U.S. patent application Ser. No. 12/263,473 filed Nov. 2, 2008 which claims the benefit of U.S. Provisional patent applications 60/985,172 and 60/985,176, both filed Nov. 2, 2007 and both of which are incorporated herein by reference in their entirety.

FIELD OF THE INVENTION

The invention relates in general to methods and systems for detection of anomalies (abnormalities) that deviate from normal behavior in multi-dimensional data and more particularly to online (real-time) anomaly detection in such data.

BACKGROUND OF THE INVENTION

Huge amounts of data are generated by many sources. "Data" refers to a collection of organized information, the result of experience, observation or experiment, other information within a computer system, or a set of premises that may consist of numbers, characters, images, or as measurements of observations. Data usually comes from conversion of physical quantities from observations or measurements into symbols (also called sampling). Data also refers to a collection of numbers, characters, images or outputs from devices that convert physical quantities into symbols. Such data is typically further processed by a human or input into a computer, stored and processed there, or transmitted to another human or computer.

Data is structured in known formats. When data is transferred or received continuously or intermittently in a time dependent fashion, the data is said to be "streamed" in a data stream. "Packet-oriented" data refers to a collection of basic units of structured information in a data stream. In communication networks, packet oriented data contain headers and payload. "Connection-oriented" data refers to a collection of packet-oriented data.

In many cases, the data is high-dimensional (also called multi-dimensional), where a data dimension n (or "N")>3. If source ("original" or "raw") data is described for example by 25 measured parameters ("features") that are sampled (recorded, measured) in every predetermined time interval (e.g. every minute), then the data is of dimension n=25. Multi-dimensional data is a collection of data points. A "data point" (also referred to herein as "sample", "sampled data", "point", "vector of observations", "vector of measurements") is one unit of data of the original (source) multi-dimensional data that has the same structure as the original data. A data point maybe expressed by boolean, integer and real characters.

In this invention, "features" refers to the individual measurable properties of the phenomena being observed. Features are usually numeric, but may be structural such as strings. "Feature" is also normally used to denote a piece of information which is relevant for solving the computational task related to a certain application. More specifically, features can refer to specific structures ranging from simple structures to more complex structures such as objects. The feature concept is very general and the choice of features in a particular application may be highly dependent on the specific problem at hand.

In particular, high-dimensional data, with all its measured features and available sources of information (e.g. databases), may be classified as heterogeneous high-dimensional data or simply as "heterogeneous data". The term "heterogeneous" means the data includes data points assembled from numbers and characters having different meanings, different scales and possibly different origins or sources. The process of finding similar areas that identify common (similar) trends is called clustering, and these areas are called clusters. Heterogeneous data may change constantly in time, in which case the data is called "heterogeneous dynamic data".

In known art, high-dimensional data is incomprehensible to understand, to draw conclusions from or to find anomalies in that deviate from a "normal" behavior. Throughout this invention, the terms "anomaly", "abnormality" and "intrusion" are used interchangeably. Similarly, the terms "cluster" and "manifold" are also used interchangeably.

Network Intrusion Detection

Assume for example that an entity such as a network, device, appliance, service, system, subsystem, apparatus, equipment, resource, behavioral profile, inspection machine, performance or the like is monitored per time unit. Assume further that major activities in incoming streamed multi-dimensional data obtained through the monitoring are recorded, i.e. a long series of numbers and/or characters are recorded in each time unit. The numbers or characters represent different features that characterize the activities in or of the entity. Often, such multi-dimensional data has to be analyzed to find specific trends (abnormalities) that deviate from "normal" behavior. An intrusion detection system ("IDS", also referred to as anomaly detection system or "ADS") is a typical example of a system that performs such analysis.

An intrusion detection system attempts to detect all types of malicious network traffic and malicious computer uses ("attacks") which cannot be detected by conventional protection means such as firewalls. These attacks may include network attacks against vulnerable services, data driven attacks on applications, host based attacks such as privilege escalation, unauthorized logins and access to sensitive files, mal-ware (viruses, Trojan horses, and worms) and other sophisticated attacks that exploit every vulnerability in the data, system, device, protocol, web-client, resource and the like. A "protocol" (also called communication protocol) in the field of telecommunications is a set of standard rules for data representation, signaling, authentication and error detection required to send information over a communication channel. The communication protocols for digital computer network communication have many features intended to ensure reliable interchange of data over an imperfect communication channel. A communication protocol means basically certain rules so that the system works properly. Communication protocols such TCP/IP and UDP have a clear structure.

A network intrusion detection system (NIDS) tries to detect malicious activities such as DoS, distributed DoS (DDoS), port-scans or even attempts to crack into computers by monitoring network traffic while minimizing the rate of false alarms and miss-detections. A NIDS operates by scanning all the incoming packets while trying to find suspicious patterns. If, for example, a large number of requests for TCP connections to a very large number of different ports is observed, one can assume that someone is committing a port scan at some of the computers in the network.

A NIDS has unlimited ability to inspect only incoming network traffic. Often, valuable information about an ongoing intrusion can be learned from outgoing or local traffic as well. Some attacks may even be staged from inside the monitored network or network segment ("internal attacks"), and are therefore not regarded as incoming traffic at all. However, they are considered as major threats that have to be treated. Internal attacks can be either intentional or un-intentional.

A NIDS has to handle large networks by processing and analyzing packets from and to many (hundreds and thousands) of network devices. In these networks, a human operator is assigned to the task. The operator has to decide if the network functions properly or if some immediate action needs undertaking. However, the operator is incapable of understanding, compiling and processing huge amounts of data or making fast decisions because of the huge volume of data. This problem can be looked at as a data mining problem—finding patterns that deviate from normal behavior in an ocean of numbers and information that is constantly dynamically changed. The operator cannot handle malicious attacks and malicious usage of networks because: these attacks can develop and evolve slowly; more and more protocols in network environments are encrypted; analysis of the payload is impractical due to encryption and privacy violation; there are rapid changes in protocols and there is an avalanche of new protocols and applications (many per year); network applications become more and more masqueraded and thus difficult to identify; identification of unauthorized applications becomes more difficult; there is a growing number of hidden attacks and applications under HTTP and P2P protocols that try to "hijack" systems, and the like. All of these make it more difficult to detect malicious uses of network systems.

IDS and NIDS have become integral components in security systems. The challenge is to perform online IDS and NIDS without miss-detections and false alarms. Throughout the rest of this disclosure, "online" is used among other things to mean an algorithm that can efficiently process the arrival of new samples from high bandwidth networks in real-time. To achieve online intrusion detection, most systems use signatures of intrusions which are developed and assembled manually after a new intrusion is exposed and distributed to the IDS clients. This approach is problematic because these systems detect only already-known intrusions (yesterday's attacks) but fail to detect new attacks (zero day attacks). In addition, they do not cover a wide range of high quality, new, sophisticated emerging attacks that exploit many network vulnerabilities.

Similar problems of identifying abnormalities in data are encountered in many network unrelated applications, e.g. in the control or monitoring of a process that requires detection of any unusual occurrences in real-time. One example is the real-time (online) detection of mastitis in dairy farming. Mastitis is expressed by abnormal somatic cell counts (SCC) and its detection may be significantly aided by detection of abnormal SCC counts or of other milk parameters during milking Automatic mastitis detection using different statistical methods is reviewed by David Cavero Pintado, PhD Dissertation, Christian Albrechts University, Kiel, Germany, 2006. In the past, statistical methods were applied to data which included number of milkings, electrical conductivity, milk yield, milk flow rate and SCC. However, such statistical methods fail to provide adequate warning for the appearance or occurrence of mastitis.

SUMMARY OF THE INVENTION

The invention provides a framework (methods, system and algorithms) based on diffusion processes and diffusion geometries for finding meaningful geometric descriptions in large, uniform, heterogeneous and distributed multi-dimensional data captured from different sensors. Eigenfunctions of generated underlying Markov matrices are used to construct diffusion maps (called hereinafter "RLDM" and described exemplarily in R. R. Coifman and S. Lafon, "Diffusion maps", *Applied and Computational Harmonic Analysis*, 21(1), 5-30, 2006 and in US patent application 2006/0004753 A1) or diffusion bases (called hereinafter "AADB" and described exemplarily in A. Schclar and A. Averbuch, "Diffusion bases methods for segmentation and clustering", U.S. patent application Ser. No. 11/699,359). These, with or without random projections (called hereinafter "RP" and described exemplarily in W. B. Johnson and J. Lindenstrauss, "Extensions of Lipshitz mapping into Hilbert space", Volume 26 of Contemporary Mathematics, pp. 189-206, Amer. Math. Soc., 1984), generate efficient representations of complex high dimensional geometric structures in a lower (reduced) dimension space (also called "embedded space") for further analysis. An associated family of diffusion distances, obtained by iterating a Markov matrix, defines multi-scale (coarse-graining) geometries. The spectral properties of Markov processes are related to their geometric counterparts. The dimensionality of the data is reduced in a non-linear way to the reduced-dimension space where all the sought after information lies. The non-linear dimension reduction also enables to classify the data and to analyze it in the reduced—dimension space, without violating the integrity and the coherence of the original multi-dimensional data. The invention enables to find anomalies that deviate from normal behavior in dynamically changing multi-dimensional data.

Unlike in known art, the classification of multi-dimensional data points as normal or abnormal is done by the application of an out-of-sample extension algorithm which provides coordinates (parameterization) for each newly arrived data point in the embedded space. "Out-of-sample extension" is defined here as the action of providing diffusion coordinates to each newly arrived data point in the embedded space. Thus, the application of out-of-sample extension enables, upon arrival of each new data point, to determine whether the newly arrived data point in a cluster of normal activities or outside (deviates, abnormality) a cluster. The organization of the empirical observations into simpler low-dimensional structures is enabled by spectral and harmonic analysis of the non-linear embedding and by the application of the out-of-sample extension.

In a method of the invention, a large number of observable quantities from the multi-dimensional input data are organized as data points. In some embodiments, each data point (vector of observation) comprises a plurality (normally larger than 3) of different parameters measured simultaneously in a time unit. The collection of such data points is considered to be a "surrogate to the system" and is organized as a graph in which various vectors of data points are linked by their similarity. The similarity is a measure imposed by the user. A diffusion similarity metrics imposes a similarity relationship between any two data points by computing all combinations among pairs of data points. Clustering of these data points in the similarity metrics characterizes different system regimes, such that all the normal data points are inside "normal" clusters and all abnormal data points are outside the same clusters. Various local criteria of linkage between data points lead to distinct geometries. In these geometries, the user can redefine relevance via a similarity measure, and this way filter away unrelated information. Self organization of network traffic data points is achieved through local similarity modeling. The choice of the eigen-functions of a normalized similarity matrix provides global organization of the given set of data points. The diffusion maps and diffusion bases embed the data into a low-dimensional space and convert isometrically the (diffusion) relational inference metrics (also called "diffusion similarity matrix") to a corresponding Euclidean distance.

Diffusion coordinates are assigned to each newly arrived data point without having to re-compute the diffusion maps or diffusion bases as new data streams in. The Euclidean distance represents the computed diffusion metrics in the low-dimensional embedding using the diffusion maps or bases. The total computation time scales linearly with the data size and can be updated online. The diffusion maps/bases enable data exploration and perceptualization, since they convert complex similarity chains to an ordinary physical distance in the embedded reduced space, thus providing situational awareness of the state of the system. This performs the out-of-sample extension procedure, which enables to calculate the coordinates of each arrival of a new data point.

A method of the invention includes two major sequential procedures:

1. Training ("learning"): Normal activities of incoming multi-dimensional data are studied and parameters from "normal data" (also called "training data") are extracted. The training procedure is called once or a very limited number of times during an operation cycle to create an embedding matrix. The embedding matrix is created by finding the geometry (manifold) on which original "normal" multi-dimensional data resides, followed by dimensionality reduction of the collected normal data. This is a non-linear transformation from multi-dimensional data representation to an embedded lower dimension space, which also reveals the underlying features and parameters that govern these original data. The feature extraction procedure, followed by its embedding in lower dimension space, describes faithfully the normal behavior of measured data or monitored system and data. After analysis, each training dataset (or "training set") represents a typical normal profile of the activities in the incoming multi-dimensional data. The training procedure clusters the data into "normal" clusters. Since the training procedure is always done offline, it can be updated in the background all the time. Therefore, it supports steady online construction of training data to replace current training data, if the latter deviate from the current training profile. If the training data is partially corrupted, it can still be useful to determine the normal behavior of the incoming multi-dimensional data. The above training procedure (extraction of parameters and their embedding in lower dimension space) can overcome a situation in which a portion of the training data is corrupted.

2. Detection: This is the offline or online application of automatic (unsupervised) tools which detect events (anomalies) that deviate from the normal behavior determined in the training procedure. The detection procedure classifies each newly arrived data point as either normal (belonging to a normal cluster derived in the training procedure) or abnormal (representing either intrusion or "strange" behavior). The classification is inventively done by the application of the out-of-sample extension algorithm, which provides coordinates for each newly arrived data point in the reduced dimension (embedded) space, to decide whether the newly arrived data point is "normal" (located inside a normal cluster) or "abnormal" (located outside a normal cluster). The classification procedure analyzes constantly the behavior of a dynamic data in order to detect anomalies that deviate from their normal behavior.

According to the invention, there is provided a computer implemented method for detection of abnormalities in multi-dimensional data comprised of multi-dimensional data points, the method including the steps of: processing the multi-dimensional data to obtain a reduced dimension embedding matrix; using the reduced dimension embedding matrix to form an embedded space; applying an out-of-sample extension procedure in the embedded space to compute coordinates of a newly arrived data point; and determining whether the newly arrived data point is normal or abnormal based on its computed coordinates.

According to the invention, there is provided a computer implemented method for detection of abnormalities in N-dimensional data comprised of N-dimensional data points where N>3, the method including the steps of: processing a plurality M of N-dimensional data points into a normal cluster in an embedded space having a dimension D lower than N; and applying an out-of-sample extension procedure to a newly arrived N-dimensional data point which does not belong to the plurality M, to determine whether the newly arrived N-dimensional data point belongs or does not belong to the normal cluster, thereby classifying the newly arrived N-dimensional data point as, respectively, normal or abnormal.

In some embodiments, the methods are applied to communication network intrusion detection.

In some embodiments, the methods are applied to hyperspectral imaging.

In some embodiments, the methods are applied to semiconductor wafer inspection.

In some embodiments, the multi-dimensional data includes financial data and the methods are applied to financial markets monitoring.

In some embodiments, the multi-dimensional data includes financial transaction data and the methods are applied to financial transactions monitoring.

In some embodiments, the multi-dimensional data includes physiological data and the methods are applied to human health monitoring.

In some embodiments, the methods are applied to mastitis detection.

According to the invention, there is provided an anomaly detection system (ADS) for detection of abnormalities in N-dimensional data comprised of N-dimensional data points where N>3, the ADS running a computer program stored on a computer readable medium, the computer program dedicated to processing a plurality M of N-dimensional data points into a normal cluster in an embedded space having a dimension D lower than N and to classifying a newly arrived N-dimensional data point which does not belong to the plurality M as normal or abnormal by applying an out-of-sample extension procedure that determines whether the newly arrived N-dimensional data point belongs or does not belong to the normal cluster.

In some embodiments, the multi-dimensional data includes network traffic data.

In some embodiments, the multi-dimensional data includes hyperspectral data.

In some embodiments, the multi-dimensional data includes financial data.

In some embodiments, the multi-dimensional data includes human physiological data.

In some embodiments, the multi-dimensional data includes process monitoring data.

In some process monitoring embodiments, the monitored multi-dimensional data is semiconductor process data.

In some embodiments, the multi-dimensional data includes data selected from the group consisting of optical data, electrical data, mechanical data, acoustical data, magnetic data, flow data, heat data and a combination thereof.

In some embodiments, the multi-dimensional data is acquired during milking or another real-time process.

BRIEF DESCRIPTION OF THE DRAWINGS

The invention is herein described, by way of example only, with reference to the accompanying drawings, wherein.

It is to be understood that the X, Y, Z coordinates in FIGS. 14-21, 23-36, 41, 43 and 44 are three discriminating eigenvectors for visualization purposes. The term "discriminating eigenvector" is explained next. Discriminating by selecting eigenvectors is done as follows: The first eignevalue and its associated eigenvector are chosen. The distance between the cluster generated by this eigenvector and the clusters generated by the rest of the eigenvectors is computed. This process is repeated where each time another eigenvector is chosen and compared to the others. This is an exhaustive search that is performed once. The eigenvectors that generate the highest distances are chosen. The output of this procedure can produce any combination of eigenvectors that are not necessarily sequential. This is also described in A. Averbuch, G. David, "Clustering mixed data via diffusion maps", Internal Report 2008.

In general, the number of discriminating eigenvectors may differ from three, and more specifically may be r, where r≥2. The boxes and the numbers in FIGS. 16, 17, 21 and 25-27 represent respectively the duration of each attack and its appearance as an anomaly. For example, the box in FIG. 17 means that there were two attacks: "portsweep", which started at time (minutes) 45 and ended at time 72 and "ipsweep", which started at time 305 and ended at time 331. The numbers, which appear and are marked as abnormalities, are taken from the ranges 45-72 and 305-331.

DETAILED DESCRIPTION OF THE INVENTION

This description uses communication networks as exemplary entities, without in any way limiting the scope of the invention to networks alone. A communication network is just one example of an entity having, producing, supplying or transferring data, and the application of the methods and algorithms described in detail below with reference to metadata or packet data in networks is only one exemplary application that can be extended to any type of data of any other entity. "Metadata" is "data about data" of any sort in any medium. An item of metadata may describe an individual data point or content item, or a collection of data including multiple content items and hierarchical levels, for example a database schema.

Figure 1:
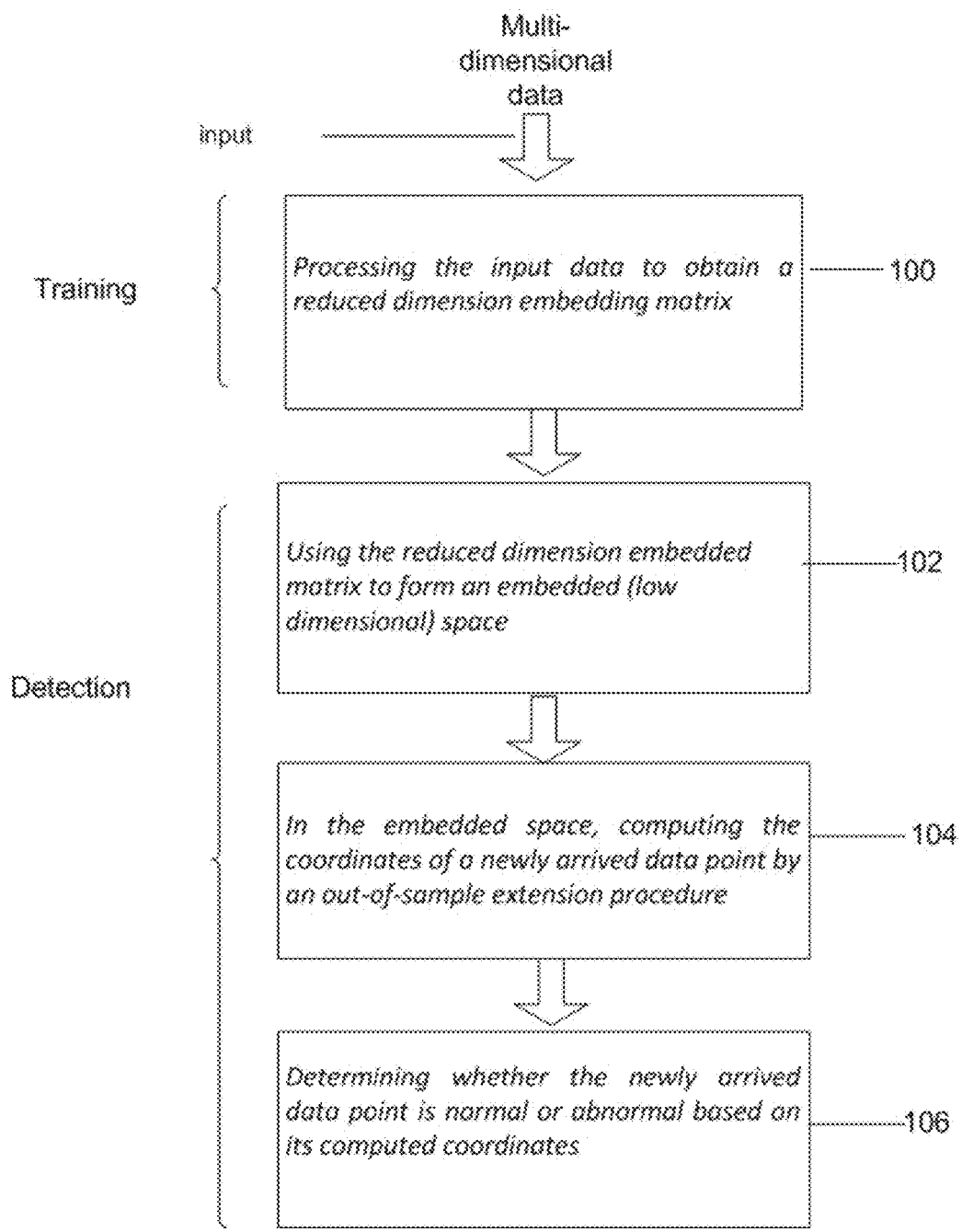
FIG. 1 is a flow chart showing the main steps (training of a method of the invention)

FIG. 1 shows a flow chart with the main steps of a method of the invention. Step 100 represents the offline training procedure. In this step, a multi-dimensional data of an incoming data stream (also called a "training data") is received and processed using an algorithm of the invention (described in more detail below) to provide an embedding matrix. Steps 102-106 represent the detection procedure (which can be offline or online). In step 102, the embedding matrix forms a lower dimension (e.g. two-dimensional (2D) or three-dimensional (3D)) embedded space. In step 104, an out-of-sample extension algorithm computes coordinates of each newly arrived multi-dimensional data point in the lower dimension embedded space. In step 106, the computed coordinates of the data point are used to classify the normality or abnormality of the newly arrived multi-dimensional data point, which has the same structure as the source data used in the training procedure, but which was not used as source data for parameter extraction ("parameter" here meaning a property in the data) in the training procedure. The newly arrived data point is classified as either normal (if it belongs to a normal cluster derived in the training step) or abnormal (if it does not belong to a normal cluster).

Figure 2:
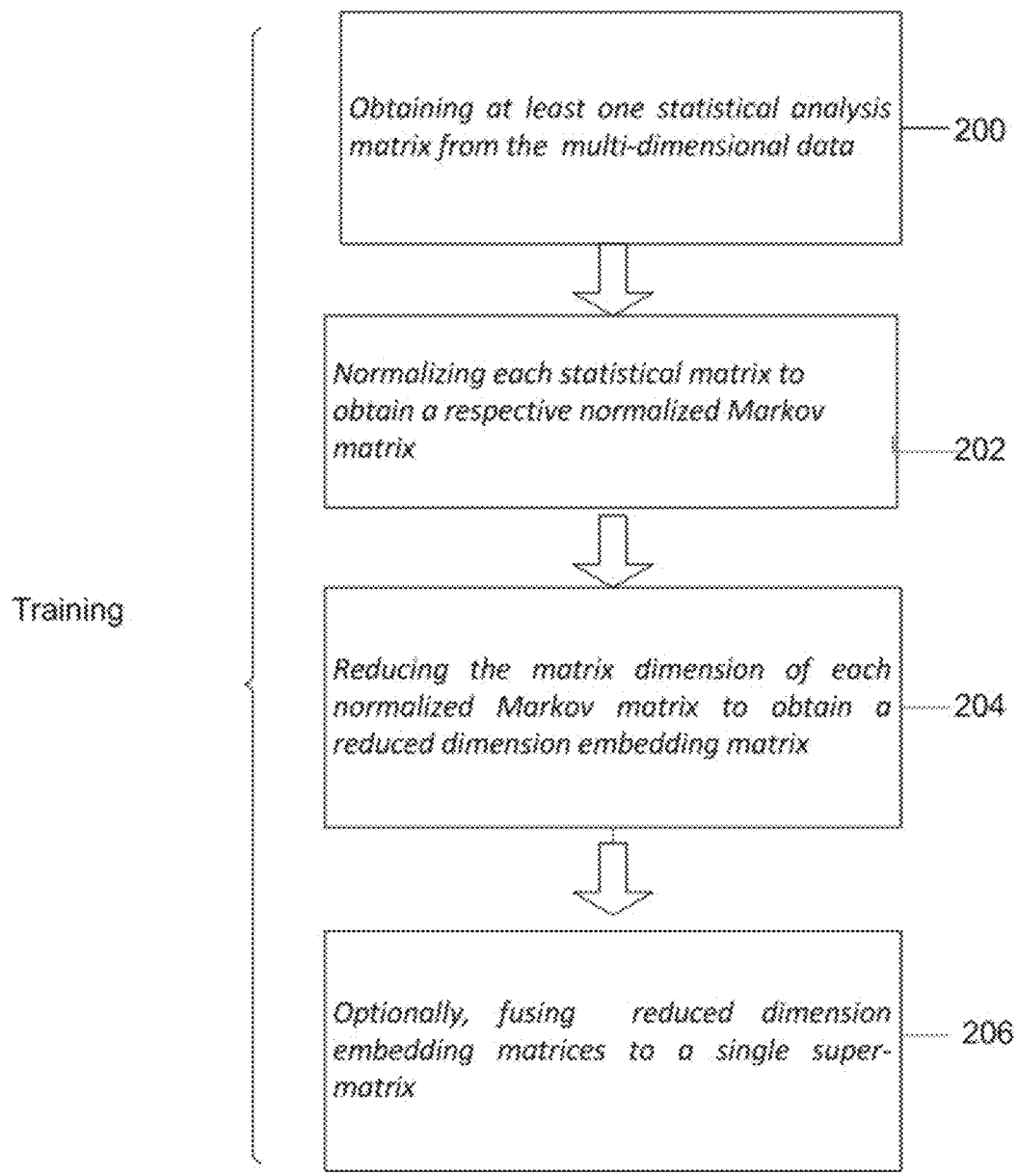
FIG. 2 is a flow chart showing details of the training step in the method described by FIG. 1.
Figure 3:
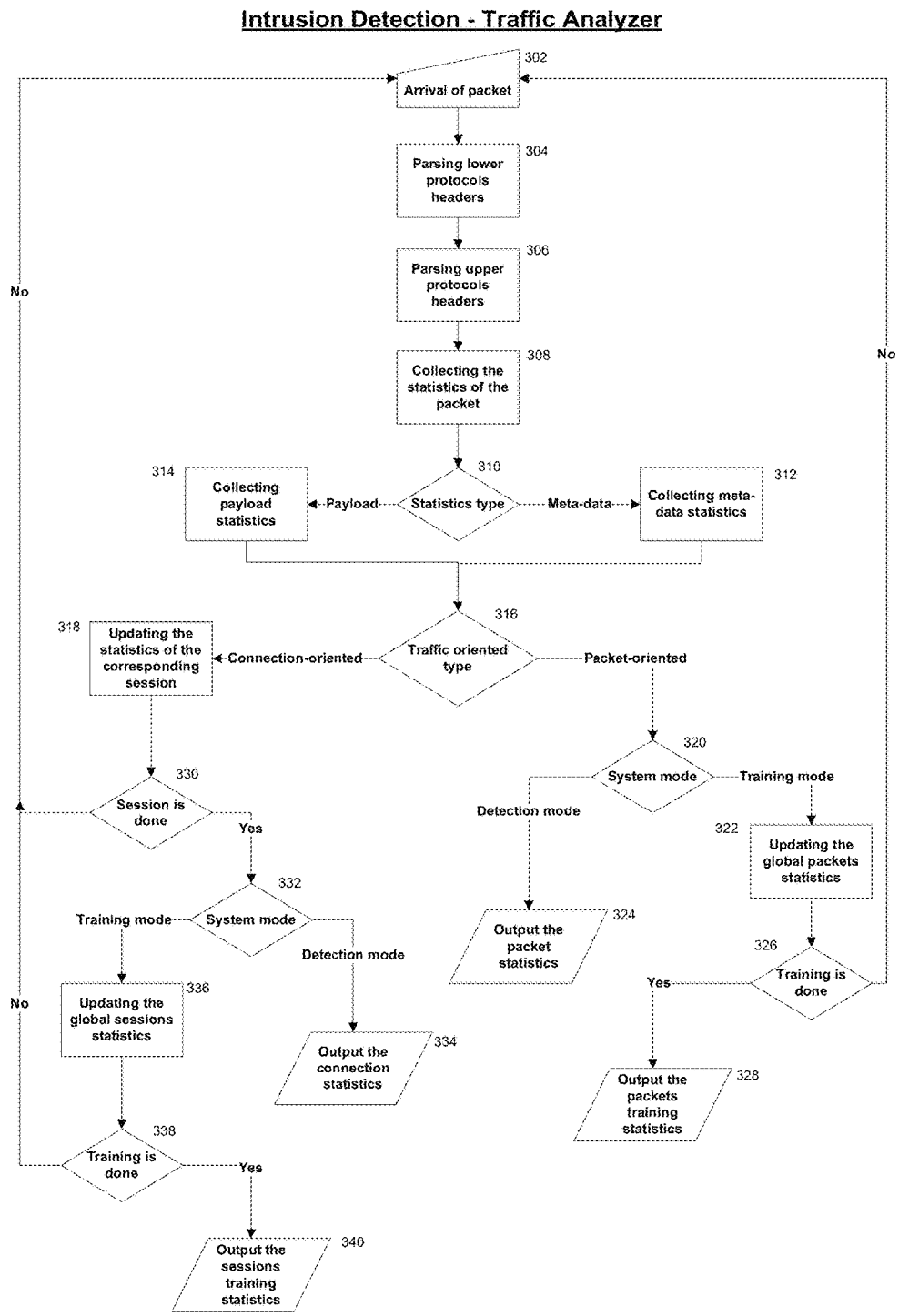
FIG. 3 is a flow chart showing in detail the flow of a traffic analyzer for intrusion detection according to the invention.

FIG. 2 is a flow chart showing more details of training step 100. In step 200, the multi-dimensional data is processed to provide at least one statistical matrix, which contains the data statistics. Exemplary processing is described in FIG. 3 and in step 408 of FIG. 4. The input to the training procedure may be multi-dimensional data processed by different traffic analyzers (i.e. a packet-oriented traffic analyzer (POTA) or a connection-oriented traffic analyzer (COTA)), which yields different types of statistical matrices. A "traffic analyzer" is a system for processing an incoming data stream and which extracts information (features) from the data stream. There are two types of statistical matrices related to network data:

1. Matrices with statistical information on metadata (step 312 in FIG. 3). These matrices include the statistics on various metadata values collected by the traffic analyzers. A POTA yields a matrix with the statistical occurrences of different metadata in the processed data (step 328 in FIG. 3), e.g. IP, ICMP and TCP. A COTA yields two matrices (step 340 in FIG. 3): one with the statistical occurrences on the collection of metadata, e.g. TCP, and another with statistical occurrences of the metadata in the collected data, e.g. HTTP request-response pairs.

2. Matrices with statistics of the payload. These matrices include the statistics of the n-gram (described exemplarily in C. D. Manning, H. Schütze, *Foundations of Statistical Natural Language Processing*, MIT Press: 1999, called hereinafter n-gram) from the connection-oriented traffic analyzer, i.e. the information collected by the COTA from the HTTP for different types of HTTP data units: request URI, request headers, request body, request payload, response status, response headers, response body and response payload.

In non-network related data, statistical matrices may be generated from incoming multi-dimensional data of other types, for example (but not limited to) pixels in images; measurements generated by a device (equipment), by a performance monitor, for example one installed in a computer that handles financial transactions and generates data about CPU utilization, queues of transactions, virtual memory usage, disk usages, communication queues, etc; measurements generated by resource profiling which provides utilization data of this resource; measurements of a physical property including an electrical, optical, mechanical, acoustic, magnetic, heat, pressure, flow property; human physiological data including pulse, temperature, heart rate, EEG data, EKG data, blood oxygenation, blood sugar, blood pressure and the like.

In step 202, each statistical matrix is normalized to obtain a respective Markov matrix. This can be done using normalization procedures known in the art, or using a specific normalization procedure described in steps 406 in FIGS. 4 and 508 and 510 in FIG. 5. The normalization converts each column (feature) in a statistical matrix to a common scale with the other features. In step 204, each Markov matrix is reduced in dimension to obtain the embedding matrix, by using either AADB or RLDM. The embedding matrix has the same number of rows as the Markov matrix but has a smaller number of columns. Several columns of the embedding matrix are now used to obtain reduced dimension manifold. For visualization of the geometry of this embedding, three columns of the embedding matrix are now used to obtain a reduced (at least two-dimensional—2D) dimension manifold. There is one embedding matrix per each Markov matrix. In step 206, all embedding matrices are fused into a single embedding super-matrix, as described in more detail in steps 414-420 in FIG. 4. The anomaly detection may be performed in one of two ways:

1. Offline intrusion detection (OFID). OFID is applied to analyze offline raw multi-dimensional data. For example, OFID fits post-mortem analysis of log data files. In this case, all the data is analyzed and processed at once. Fewer efforts are channeled to improve the efficiency of the algorithms and their operations. Furthermore, the offline data analysis contains all the information needed for performing anomaly detection. Therefore, anomaly detection is performed in a single offline stage that includes two "sub-steps": training and detection, performed consecutively.
2. Online (real-time) intrusion detection (OLID). OLID is applied to analyze real-time raw multi-dimensional data. For example, it is suitable for analysis and detection of online multi-dimensional data which is constantly streamed through a network, or of data obtained from real-time measurements in process monitoring. In this case, the data is analyzed and processed continuously. Here, the efficiency of the algorithms and their operation are critical. In contrast with OFID, OLID involves a single offline initial training step (100 in FIG. 1) for a pre-determined training period, followed by detection (102-106 in FIG. 1) applied online. The training generates the infrastructure for the detection (the "normal clusters"). In communications related applications, OLID using metadata is called hereinafter OLIDMD and OLID using payloads is called hereinafter OLIDPL. More details of each process are given next.

OFID

The OFID process is described exemplarily, for ease of understanding, with reference to packet traffic over a communication system such as the Internet. It should be understood that this is a non-limiting example and that the anomaly processing described herein may be applied to any multi-dimensional data stream or data from any entity, as discussed above. The original multi-dimensional data is collected by either POTA or COTA and processed into dense statistical matrices which contain features with different measurement scales. For example, in a communication network, the number of IP packets summarizes all the IP traffic (TCP, UDP, FTP, HTTP, etc.). A TCP session represents a TCP connection between two IP addresses but not the volume of the traffic between them. Therefore, the number of packets is not directly connected to the number of sessions. Thus, these two measurements have different scales with different ranges. Consequently, the two measurements have to be normalized to bring their columns to a common scale before further processing.

First we outline the major steps in the OFID process. Then we provide detailed descriptions of each stage in this outline.
OFID High Level Description 1. As mentioned, in step 200, the traffic analyzer is applied to the original (source) multi-dimensional data to produce a matrix whose entries are modified to be the logarithm values of the original entries. Details of step 200 are shown in the flow chart of FIG. 3. A packet (data point) is received by the traffic analyzer (step 302). The packet lower protocol headers are parsed first (step 304), followed by parsing of the higher protocol headers (step 306). Next, the statistics of the packet are collected (step 308). The statistical data type is analyzed in step 310. If the data type is metadata, then metadata statistics are computed in step 312. Otherwise, the data type is payload and its statistics are computed in step 314. The traffic oriented type is then checked (step 316) to decide if it is payload or connection-oriented type. If the traffic oriented type was packet-oriented type, then step 320 checks to decide if it is training or system mode. If the system mode is "training", then step 322 updates the global packet statistics and if the training mode is not completed (step 326) it goes to step 302. If the training is completed, step 328 is called to produce final training statistics of the packets. If the system mode is "detection", then step 324 is called to produce the packet statistics. If the statistical data was connection-oriented, step 318 is called to produce updated statistics of the corresponding session. If the session is not completed, step 302 is called. If the session is completed, the system mode in step 332 checks to decide if it is training or detection mode. If it is training mode, the global statistics of the session is updated (step 336) and, if the training is not completed (step 338), then step 302 is called. If the training is completed (step 338), the final training statistics matrix is produced in step 340. If the system mode (step 332) is detection mode, then the statistics matrix of the connection is produced in step 334. This completes step 200 in FIG. 2.

The same operation described above is used to generate the matrices with the statistical data in the online OLIDMD and OLIDPL algorithms. Since FIG. 3 describes the OFID procedure, the training and detection procedures appear in the same flow-chart. Therefore, in the detection mode, outputs of statistical matrices will be generated in step 334 from COTA and in step 324 from POTA.

2. Step 202 is described in more detail in the flow chart of FIG. 4. If the statistical data type is metadata, normalization is done in step 406. If it is payload, n-gram training is generated in step 408 and the size of the statistical matrix is reduced by consecutive application of coarse graining (step 410) followed by the application of random projection (step 412). The same sequence of operations will be used to generate the statistical matrices in the OLIDMD and OLIDPL algorithms. Each column (feature vector) of the statistical matrix is normalized as follows:
   a. Pair-wise distances between statistical matrix elements are computed to produce a similarity matrix;
   b. The similarity matrix is analyzed via the application of diffusion maps (RLDM) or diffusion bases (AADB). The normalized output matrix from this procedure is described by a selected group of r discriminating eigenvectors of the distances matrix, where r≥2;

c. Each column vector (which describes a feature) of the normalized output matrix is set to the selected discriminating eigenvectors of the distances matrix.

3. In step 204, the normalized output matrix is processed using either RLDM or AADB to derive its embedding matrix as follows:
   a. RLDM:
      i. Pair-wise distances in the normalized output matrix are computed using one of the following distance metrics:
         1. Euclidean distance;
         2. Weighted Euclidean distance;
         3. Cosine distance;
         4. Mahalanobis distance.
      ii. The distances matrix is analyzed by the application of RLDM to return its first four eigenvectors;
      iii. A selected group of r discriminating eigenvectors, where r≥2, is chosen from the embedding matrix. For two-dimensional (2D) or three-dimensional (3D) visualization, two or three eigenvectors from the selected group of r eigenvectors may be chosen, respectively;
   b. AADB:
      i. The normalized output matrix is transposed into a transposed normalized matrix;
      ii. A distances matrix of pair-wise distances is computed from the transposed normalized matrix;
      iii. The distances matrix is analyzed by the application of AADB. It returns a selected group of r, r≥2, discriminating eigenvectors of the distances matrix. For 2D or 3D visualization, two or three eigenvectors from the selected group of r eigenvectors may be chosen, respectively;
      iv. The normalized distance matrix (iii) is projected on the selected group of r discriminating eigenvectors;
      v. For 2D or 3D visualization, two or three eigenvectors from the selected group of r discriminating eigenvectors form the embedding matrix.

4. The identification of abnormal points using the embedding matrix is performed as follows (steps 104-106 in FIG. 1):
   a. The density (the number of points in each data point's neighborhood) of each point in the embedding matrix using Euclidean distance is computed;
   b. A histogram of the density values is generated;
   c. All the points in the smallest bin are classified as abnormal (intrusion), while all the other points are classified as normal.

Detailed Description of OFID

Processing the Multi-Dimensional Raw Data:

Let H be a multi-dimensional data of raw data (packets). Let C be a matrix of size m×n produced from H by the corresponding traffic analyzer (step 316 in FIG. 3) as follows:

1. POTA—steps 320, 322, 326, 328 in FIG. 3: m is the number of time slices (can for example be a minute) and n is the number of metadata features gathered by the packet oriented traffic analyzer every time slice;

2. COTA—steps 318, 330, 332, 336-340 in FIG. 3: m is the number of features (for example, TCP connections) and n is the number of metadata features gathered by the connection oriented traffic analyzer (for example, for every TCP connection).

Normalizing Matrix C:

We take column l, 1≤l≤n, from matrix C denoted by $c^l = \{c_{il}: 1 \le i \le m\}$. We compute for this column vector its pair-wise Euclidean distances matrix whose entries are $\tilde{c}_{ij}^l = \{|c_{il} - c_{jl}|: i, j = 1, \ldots, m\}$. We build a Gaussian kernel $$K_{ij}^l = e^{-\frac{\tilde{c}_{ij}}{\varepsilon}}, i, j = 1, \ldots, m.$$

$K_{ij}^l$ is symmetric and non-negative. $\varepsilon$ can be determined by the procedure in AADB. Then we normalize C into a Markov transition matrix $P_{ij}^l$. $P_{ij}^l$ is known in the art as the normalized graph Laplacian and is constructed as follows:

$$P_{ij}^l = \frac{K_{ij}^l}{\sum_{q=1}^m K_{iq}^l}, i, j = 1, \ldots, m.$$

$P_{ij}^l$ is a Markov matrix since $\sum_{q=1}^m P_{iq}^l = 1$ and $P_{ij}^l \ge 0$. Since $P_{ij}^l$ is a symmetric positive semi-definite kernel, it leads to the following eigen-decomposition: $P_{ij}^l = \sum_{w \ge 1}^m \lambda_w^l v_w^l(c_{il}) v_w^l(c)$ where $\lambda_w^l$ are the eigen-values and $v_w^l$ are the eigenvectors. Finally, we build the column 1 of the normalized matrix A by taking the second eigenvector of the eigen-decomposition of $P^l$, where $a^l = v_2^1$. We repeat this for each l, l=1, ..., n. At the end of this process, the original data in matrix C is replaced by the normalized matrix A.

Processing Normalized Matrix A—Derivation of Embedding Matrix Ψ:

We reduce the dimensionality of the data from n (number of features) to r where usually in high-dimensional problems r<<n. This process applies either the RLDM or AADB. We begin with RLDM.

Embedding by RLDM:

We denote the row vector i, 1≤i≤m in the normalized matrix A by $\vec{a} = \{a_{ik}: 1 \le k \le n\}$. We compute for A its pair-wise distances matrix A whose entries are $\tilde{a}_{ij}$ using one of the following distance metrics:

1. Euclidean distance metric:

$$\tilde{a}_{ij} = \left\{ \sqrt{(\vec{a}_i - \vec{a}_j) \cdot (\vec{a}_i - \vec{a}_j)} : i, j = 1, \ldots, m \right\}.$$

2. Weighted Euclidean distance metric:

$$\tilde{a}_{ij} = \left\{ \sqrt{\frac{(\vec{a}_i - \vec{a}_j)}{\vec{w}} \cdot \left(\frac{(\vec{a}_i - \vec{a}_j)}{\vec{w}}\right)^T} : i, j = 1, \ldots, m \right\},$$

where $\vec{w} = \{w_k: k=1, \ldots, n\}$ is a weighting factor vector. The larger is $w_k$, the smaller is the influence of the k-th feature on the distance between $\vec{a}_i$ and $\vec{a}_j$.

3. Cosine distance metric:

$$\vec{a}_{ij} = \left\{ \left(1 - \frac{\vec{a}_i \vec{a}_j^T}{\sqrt{\vec{a}_i^T \cdot \vec{a}_i} \sqrt{\vec{a}_j^T \cdot \vec{a}_j}}\right), i, j = 1, \ldots, m \right\}.$$

4. Mahalanobis distance metric:

$$\tilde{a}_{ij} = \left\{ \sqrt{(\vec{a}_i - \vec{a}_j) \cdot \Sigma^{-1} \cdot (\vec{a}_i - \vec{a}_j)^T} : i, j = 1, \ldots, m \right\}$$

where $\Sigma$ is the sample covariance matrix. $\Sigma$ can also be the features matrix. We build a Gaussian kernel $$K_{ij} = e^{-\frac{\tilde{a}_{ij}}{\epsilon}}, i, j = 1, \ldots, m.$$

Since $\epsilon$ is fixed for all entries in $\tilde{A}$, it gives a coarse scaling control. A finer scaling control can be achieved as follows: First, we build the initial Gaussian kernel $\tilde{K}_{ij}$ with the fixed scale control $\epsilon$, $$\tilde{K}_{ij} = e^{-\frac{\tilde{a}_{ij}}{\epsilon}}, i, j = 1, \ldots, m.$$

Then, we build a Gaussian kernel with a finer scale control, $$K_{ij} = e^{-\frac{\tilde{a}_{ij}}{\sum_{q=1}^{m} \tilde{K}_{iq}}}, i, j = 1, \ldots, m.$$

This finer scale control provides better and more compact description of the local geometric properties of the pair-wise distances matrix $\tilde{A}$. This process is repeated until the scale factor is sufficiently fine and until $K_{ij}$ represents optimally the nature of the local geometry of $\tilde{A}$. $K_{ij}$ is normalized into a matrix $P_{ij}$ by one of the following methods:

1. Graph Laplacian matrix:

$$P_{ij} = \frac{K_{ij}}{\sqrt{\sum_{q=1}^{m} K_{iq}} \sqrt{\sum_{q=1}^{m} K_{jq}}}.$$

2. Laplace-Beltrami matrix: First, we compute the graph Laplacian matrix $$\tilde{P}_{ij} = \frac{K_{ij}}{\sqrt{\sum_{q=1}^{m} K_{iq}} \sqrt{\sum_{q=1}^{m} K_{jq}}}.$$

We repeat this process and get the Laplace-Beltrami matrix $$P_{ij} = \frac{\tilde{P}_{ij}}{\sqrt{\sum_{q=1}^{m} \tilde{P}_{iq}} \sqrt{\sum_{q=1}^{m} \tilde{P}_{jq}}}.$$

Since P is a symmetric positive semi-definite kernel, it enables the following eigen-decomposition: $P_{ij} = \sum_{w \geq 1}^{m} \lambda_w v_w(\vec{a}_i) v_w(\vec{a}_j)$ where $\lambda_w$ are the eigen-values and $v_w$ are the eigenvectors. Finally, we build the embedding matrix $\Psi$ of dimension r. We denote the $i\beta^{th}$ column of $\Psi$ by $\Psi^i$. For visualization purpose, we can present the embedding in a 3D view by taking r=3 out of r, r≥4, eigenvectors as a selected group of discriminating eigenvectors of the eigen-decomposition of P. One possible option is to choose $\Psi^1 = v_2$, $\Psi^2 = v_3$, $\Psi^3 = v_4$.

Embedding by AADB:

We denote the $i^{th}$ i=1, . . . n, row vector in the transposed normalized matrix $A^T$ of A by $\vec{a}_i^T = \{a_{ki}: k=1, \ldots, m\}$. We compute for $A^T$ its pair-wise Euclidean distances matrix $\tilde{A}^T$ whose entries are $a_{ij}^T = \{\|\vec{a}_i^T - \vec{a}_j^T\|: i, j=1, \ldots n\}$. We build a Gaussian kernel $$K_{ij}^T = e^{-\frac{a_{ij}^T}{\epsilon}}, i, j = 1, \ldots, n.$$

$K_{ij}^T$ is normalized into a graph Laplacian matrix by $$P_{ij}^T = \frac{K_{ij}^T}{\sum_{q=1}^{N} K_{iq}}.$$

Since $P_{ij}^T$ is a symmetric positive semi-definite kernel, it leads to the following eigen-decomposition: $P_{ij}^T = \sum_{w \geq 1}^{n} \lambda_w^T T_w^w T(\vec{a}_i^T) v_w^T(\vec{a}_j^T)$ where $\lambda_w^T$ are the eigenvalues and $v_w^T$ are the eigenvectors. Finally, we build the embedding matrix $\Psi$. We project the normalized matrix A on a selected group of r, r≥2, discriminating eigenvectors of the eigen-decomposition of $P^T$. For example, one option is to choose $\Psi^1 = A \cdot v_1^T, \Psi^2 = A \cdot v_2^T, \Psi^3 = A \cdot v_3$.

Identifying Abnormal (Intrusion) Points in Embedding Matrix $\Psi$ (Steps 104-106 in FIG. 1):

Embedding matrix $\Psi$ is now used to identify the abnormal points in the data. We compute the minimum and maximum values for every column i, i=1, . . . , r in $\Psi$, denoting them by $\min_{\Psi^i}$ and $\max_{\Psi^i}$, respectively. We take the row vectors from $\Psi$, denoting the $j^{th}$ row in $\Psi$ by $\vec{\Psi}^j = \{\Psi_{jl}: l=1, \ldots, r\}$, j=1, . . . , m. We compute for each j the number of row vectors which reside in its neighborhood, i=1, . . . , r, j=1, . . . , m, denoting $$R_{ik}^j \left( \Psi_{ji} - \frac{\max_{\Psi^i} - \min_{\Psi^i}}{\delta} \leq \Psi_{ki} \leq \Psi_{ji} + \frac{\max_{\Psi^i} - \min_{\Psi^i}}{\delta} \right) \quad (1)$$

where $\delta$ is a pre-determined scale control of the neighborhood of each point. Then, we count all $\vec{\Psi}^k$, k=1, . . . , m, that satisfy the condition in Eq. 1. Formally, $\phi_j = |\{\vec{\Psi}^k: k=1, \ldots, m \text{ that satisfy } R_{1k}^j \text{ and } R_{2k}^j \text{ and } R_{3k}^j\}|.$ Let $\phi = \{\phi_1, \ldots, \phi_j, \ldots, \phi_m\}$ and $\Phi = \{\Phi_1, \ldots, \Phi_j, \ldots, \Phi_m\}$ where $$\Phi_j = \frac{\phi_j}{\|\phi\|_2}$$

is the normalized density vector. The maximum value in $\Phi$ is denoted by $\max_\Phi$. We construct an histogram of $\Phi$ denoted by $\text{hist}_\Phi$. This histogram is divided into $\beta$ bins of size $$\frac{\max_\phi}{\beta}.$$

Since the majority of the points in me data are normal, all the normal points have a higher number of neighbors and their normalized density value is mapped into the upper bins in $\text{hist}_\Phi$. Conversely, since the abnormal points are a minority, these points have a smaller number of neighbors and their normalized density value is mapped into the smallest bin. Therefore, all the points in the smallest bin are classified as abnormal points. These points are the sought after intrusions in the processed datasets. Formally, $\vec{\Psi}^j$, j=1, ..., m, is an intrusion if $$\Phi_j \leq \frac{\max_\phi}{\beta}.$$

Otherwise, $\vec{\Psi}^j$ is a normal point. The output from this process is an embedding matrix $\Psi$ and a decision mechanism that determines whether each data point (row vector) in this matrix is normal or abnormal. The output can be visualized if it is two- or three dimensional.

Next we describe OLIDMD and OLIDPL in more detail. Both are described exemplarily, for ease of understanding, with reference to packet traffic over a communication network such as the Internet.

OLIDMD

The OLIDMD process described below uses the metadata in the matrices generated by the traffic analyzer. A major challenge in the OLID algorithms (OLIDMD and OLIDPL) is how to add many arrivals of new data points in a predetermined time interval to the existing embedding matrix and how to classify them efficiently. New data points are constantly produced by the traffic analyzer. As new data streams in, diffusion coordinates are assigned to each newly arrived data point without having to re-compute the diffusion maps/bases. This requirement is critical for NIDS to be efficient and operational in practice, because of the increasing bandwidths of existing networks infrastructures. Since the normalization of each newly arrived data point is critical for the analysis, the normalization is done efficiently after previous data points have already been normalized in the training process, without having to re-compute the diffusion maps or bases as new data streams in. In addition, the learned features of the normalized data points are added efficiently to the existing embedding matrix to enlarge its coverage for more normal events.

OLIDMD Algorithms

We describe two OLIDMD algorithms: The first is a straightforward algorithm which is somewhat slower than the second one, but which has one advantage: its embedding matrix is more accurate, robust and covers better normal activities in the multi-dimensional data, since a newly arrived data point is added and is processed against all the data accumulated so far. The second algorithm fits better online (real-time) situations, because it provides fast processing for a newly arrived data point.

1. Straightforward Algorithm: The statistics of a newly arrived data point from the multi-dimensional raw data are added to the statistical matrix as done to the raw data processed by OFID. In other words, the normalization process applied in OFID in the training phase is performed here again on a new population which includes the newly arrived data point. In essence, the OFID process is applied to an extended matrix which contains the original multi-dimensional data plus the newly added data point. This newly arrived data point is normalized with the rest of the existing source data and is then embedded and detected correctly.

2. Efficient Algorithm: This algorithm has two steps: offline training (step 100 in FIG. 1) done once from using the training data; and online detection and classification of newly arrived data points (102-106 in FIG. 1). Both steps involve normalization of features extracted from the multi-dimensional source data. We recall from the OFID process that the normalization process of a statistical matrix there involves the application of RLDM or AADB to this matrix. This step is needed in order to bring all the features in the matrix to a common normalization scale. A newly arrived data point produced by the traffic analyzer is not normalized. Therefore, its values must be brought to the common normalization scale of the statistical matrix produced in the training procedure. All the columns in the matrix were normalized by RLDM or AADB in the training procedure. The geometric harmonics (GH) methodology ("A tool for multiscale out-of-sample extension of empirical functions", Applied and Computational Harmonic Analysis, 21(1), 31-52, 2006) is exemplarily applied to each newly arrived data point. However, since RLDM or AADB is applied to every column (feature) in the statistical matrix, GH is applied to every value of the newly arrived data point as well. Therefore, this normalization requires the application of GH according to the number of features. A major advantage of this algorithm is that there is no need to apply the RLDM or AADB to the complete current data (training data plus newly arrived data point) from the beginning, as in the straightforward algorithm. Thus, it is more efficient. Moreover, we suggest alternative normalization procedures replacing the one used in the second step in the OFID algorithm described above. After the second normalization, the embedding matrix, determined in the training procedure, is extended efficiently with the new normalized data point via the application of GH. Finally, the newly arrived data point, now normalized, is classified to be either normal or abnormal according to whether it respectively belongs or not to the training cluster generated in the training procedure.

Outline of the OLIDMD Algorithm

The OLIDMD algorithm has two sequential steps:

1. Training (100 in FIGS. 1 and 200-206 in FIG. 2): The training step is based on the OFID algorithm described above. The normalization is replaced with new normalization procedures which do not require the re-application of RLDM or AADB. The remaining steps are the same as in the OFID algorithm. The output of the training step is the embedding matrix, also called a "baseline profile matrix" for an online detection process. The normalization is applied to each newly arrived data point. After a newly arrived data point is normalized, GH is applied to extend the (reduced) embedding baseline profile matrix with the newly arrived data point, resulting in a new embedding for the new data point. Finally, the extended baseline profile matrix is used to classify the newly arrived data point as either normal or abnormal. The training includes, in more detail:

a. Application of the traffic analyzer to produce a matrix of statistical data. The selection process for the features vector was described with reference to step 402 in FIG. 4.
b. Each column (feature vector) of the matrix is normalized by one of the following methods:
   i. Gaussian normalization (406 in FIG. 4) as follows:
      1. Computation of the standard deviation of the column;
      2. Computation of the Gaussian kernel for each value in the column, using the pre-computed standard deviation. Each column (feature vector) in the normalized matrix is the output of the Gaussian kernel;
      3. Saving of the computed Gaussian kernel parameters are a baseline for the online detection step.
   ii. Normalization of the normal probability density function as follows:
      1. Computation of the standard deviation and the mean of the column (feature vector);
      2. Computation of a normalization factor using the pre-computed standard deviation;
      3. Computation of a normal probability density function kernel for each value in the column, using the pre-computed standard deviation, mean and normalization factor. Each column vector in the normalized matrix is the output from the normal probability density function kernel;
      4. Saving of the computed normal probability density function parameters as a baseline for the online detection step.
c. The normalized matrix is processed by the application of RLDM or AADB to derive its embedding matrix (described in the training procedure in OFID) as follows:
   i. Computation of pair-wise distances in the normalized matrix;
   ii. Analysis of the distances matrix by the application or AADB, which returns a group of r, r≥2, discriminating eigenvectors. This group is the embedding matrix;
   iii. Saving of the computed embedding matrix as a baseline for the online detection step.
d. Identification of abnormal points using the embedding as follows:
   i. Computation of the density value for each data point in the embedding matrix (the number of points in its neighborhood);
   ii. Generation of a histogram of the density values;
   iii. Classification of all the data points in the smallest bin as abnormal points while all the other data points are classified as normal;
   iv. Classification of all abnormal data points as intrusions;
   v. Saving of the computed density and histogram parameters as a baseline for the online detection step.
2. Detection (102-104 in FIG. 1): Application of automatic unsupervised tools that enable online detections of problems (anomalies and intrusions). This application classifies each newly arrived data point to be either normal or abnormal. The detection includes, in more detail:
   a. Online application of the traffic analyzer to produce, in every pre-determined time slice, a logarithm value of a new arrived sample (row vector) of statistical data;
   b. Normalization of each value (feature) in the newly arrived row vector according to the saved baseline normalization method parameters (508 in FIG. 5) as follows:
      i. Computation of a normalization kernel using the corresponding baseline normalization kernel parameters;
      ii. Each value in the normalized row vector is the output of the normalization kernel.
   c. The normalized row vector is processed by the application of GH to derive its embedding vector (514 in FIG. 5) as follows:
      i. Analysis of the row vector using the baseline embedding matrix (computed and saved in the training step). The analysis returns the matrix extension, which is the new embedding vector of the new processed sample.
   d. Classification of the newly arrived sample as normal or abnormal:
      i. Computation of the density value using the baseline embedding matrix and the baseline density parameters (computed and saved in the training step);
      ii. Placement of the density value in the baseline histogram (also computed and saved in the training step);
      iii. Classification of a point mapped to the smallest bin of the baseline histogram as an abnormal point. If the point is not mapped to the smallest bin, it is classified as a normal point.

Detailed and Formal Description of OLIDMD Algorithm

The next section provides finer mathematical details of the description above.

1. Training:
   a. Processing the raw training data: Let H be a data of raw data (packets). Let C be a matrix of size m×n that is produced from H by the corresponding traffic analyzer:
      i. POTA: m is the number of time slices (can be for example a minute) and n is the number of meta-data features that are gathered every time slice;
      ii. COTA: m is the number of tcp connections and n is the number of metadata features that are gathered for every tcp connection.
   b. Normalization of matrix C: The matrix C is normalized by either Gaussian normalization or by normal probability density function normalization.
      i. Gaussian normalization: Let $c^l = \{c_{il}: i=1, \ldots, m\}$ be the column l, l=1, \ldots, n, in C. The normalized standard deviation $$\delta^l = \varepsilon \sqrt{\frac{1}{m}\sum_{i=1}^{m}(c_{il} - \bar{c}^l)^2}, \; \bar{c}^l = \frac{1}{m}\sum_{i=1}^{m} c_{il}$$

is computed for this column vector l. We build the Gaussian kernel $$K_i^l = e^{\frac{c_{il}}{\delta^l}}, i = 1, \ldots, m,$$

where $K^l$ is a column vector. $s^l = \sum_{i=1}^{m} K_i^l$ is computed for this column vector. The normalized column vector $A^l$ is computed as $$A_i^l = \frac{K_i^l}{s^l}, i = 1, \ldots, m.$$

$A^l$ is normalized already since $\sum_{i=1}^{m} A_i^l = 1$. The normalization parameters $\delta^l$ and $s^l$ are saved for the online detection step. We repeat it for each l, l=1, ..., n. At the end of this process, the original data in the matrix C is replaced by the normalized matrix A.

ii. Normal probability density function normalization: Let $c^l = \{c_{il}: i=1, \ldots, m\}$ be the column 1, l=1, ..., n, in C. The normalized standard deviation $$\delta^l = \varepsilon \sqrt{\frac{1}{m} \sum_{i=1}^{m} (c_{il} - \bar{c}^l)^2},$$

$$\bar{c}^l = \frac{1}{m} \sum_{i=1}^{m} c_{il}$$

is computed for this column vector l. Its normalization factor is $\beta = \delta^l \sqrt{2\pi}$. The normal probability density function kernel becomes $$K_i^l = \frac{1}{\delta^l \sqrt{2\pi}} e^{\frac{-(c_{il} - \bar{c}^l)^2}{2\delta^{l2}}}, i = 1, \ldots, m,$$

where $K^l$ is a column vector. The normalized column vector $A^l$ becomes: $A_i^l = K_i^l \cdot \beta^l$, i=1, ..., m. The normalization parameters $\delta^l$, $\bar{c}^l$ and $\beta^l$ are saved for the online detection step. The normalization is repeated for each l, l=1, ..., n. At the end of this process, the original data in the matrix C is replaced by normalized matrix A.

c. Processing the normalized matrix A: derivation of its embedding matrix $\Psi$. The dimensionality of the data is reduced from n (number of features) to a smaller number r where usually r<<n. This process applies RLDM as described above re. OFID. The output of this process is the embedding matrix $\Psi$, which is saved for the online detection step.

d. Identification of abnormal (intrusion) points in the embedding $\Psi$: The embedding matrix $\Psi$ is used to identify the abnormal points in the data. We recall that in OFID we performed the following: computed the minimum and maximum values, denoted by $\min_{\Psi^i}$ and $\max_{\Psi^i}$, respectively, for every column i, i=1, ... r, in $\Psi$; built the normalized density vector $\Phi$ using the norm of the density values $\|\phi\|_2$ and constructed the histogram that is divided into $\beta$ bins of size $$\gamma = \frac{\max_\Phi}{\beta}.$$

All were saved for the online detection step.

The outputs from the training step are the normalization parameters ($\delta l$—the normalized standard deviation and $s^l$, l=1, ..., n–the sum of the Gaussian kernel), the 3D embedding matrix ($\Psi$) and the parameters ($\min_{\Psi^i}$ and $\max_{\Psi^i}$, i=1, ... r, $\|\phi\|_2$ and $\gamma$) for the decision mechanism that determine whether each point in this matrix is normal or abnormal. These outputs are the baseline parameters for the online detection step next.

2. Detection:
   a. Online processing of a new sample: Let P be a row vector of size 1×n produced online by the traffic analyzer in every time slice interval, where n is the number of features gathered in every time slice interval. These features are described in POTA.
   b. Online normalization of sample P: We use the baseline normalization parameters $\delta^l$ and $s^l$ saved in the training step. Two methods are described:
      i. Gaussian normalization: Denote $P = \{p^1, \ldots, p^n\}$. The Gaussian kernel $$K^l = e^{\frac{p^l}{\delta^l}}$$

is computed using $\delta^l$ and $s^l$, l=1, ..., n. The normalized value $A^l$ is constructed as follows:

$$A^l = \frac{K^l}{s^l}.$$

The kernel computation and normalization is repeated for each l, l=1, ..., n. At the end of this process, the original row vector P is replaced by the normalized row vector $A = \{A^1, \ldots, A^n\}$.

ii. Normal probability density function normalization: We use baseline parameters $\delta^l$, $\bar{c}^l$ (the mean) and $\beta^l$ (the normalization factor), l=1, ..., n. Denote $P = \{p^1, \ldots, p^n\}$. We compute the normal probability density function kernel $$K^l = \frac{1}{\delta^l \sqrt{2\pi}} e^{\frac{-(p^l - \bar{c}^l)^2}{2\delta^{l2}}}$$

and the normalized value $A^l$ as follows: $A^l = K^l \cdot \beta^l$. The kernel computation and normalization is repeated for each l, l=1, ..., n. At the end of this process, the original row vector P is replaced by the normalized row vector $A = \{A^1, \ldots, A^n\}$.

c. Processing of normalized matrix A—derivation of embedding matrix $\Psi$: We start with the baseline embedding matrix $\Psi$, saved in the training step. The dimensionality of A is reduced from n to a smaller dimension r where usually r<<n. This process uses the application of GH to extend the baseline embedding matrix $\Psi$ with the normalized vector A and obtain an extension of the matrix. This extension is the new embedding vector $\psi$ of the new sample.

d. Online classification of a newly arrived data point as normal or abnormal using the embedding matrix $\psi$: Baseline embedding matrix $\Psi$ and the baseline identification parameters $\min_{\Psi^i}$ and $\max_{\Psi^i}$, i=1, ..., r $\|\phi\|_2$ (the norm of the density values) and $\gamma$ (the size of the bins in the histogram), saved in the training step, are used to classify the newly arrived data point $\psi$ as normal or abnormal using the new embedding vector $\psi$. Equation 1 is used to compute for $\psi$ the number of row vectors in $\Psi$ that reside in its neighborhood. Then, all the vectors which satisfy the condition in Eq. 1, are counted and denoted by $\phi_\psi$. The normalized density value is computed by $$\Phi_\psi = \frac{\phi_\psi}{\|\phi\|_2}.$$

In the MID algorithm, it was shown that the normalized density value of an abnormal point is mapped into the smallest bin. Therefore, all the points in the smallest bin are classified as abnormal points. These are the sought after intrusions points. Therefore, the new sample is classified as abnormal if it is mapped into the smallest bin. Formally, $\psi$ is an intrusion if $\Phi_\psi \leq \gamma$. Otherwise, $\psi$ is a normal point.

In summary, the output of the detection step is at least a 2D embedding vector $\psi$ and a decision mechanism that determines whether each newly arriving new point is normal or abnormal.

OLIDPL

Figure 4:
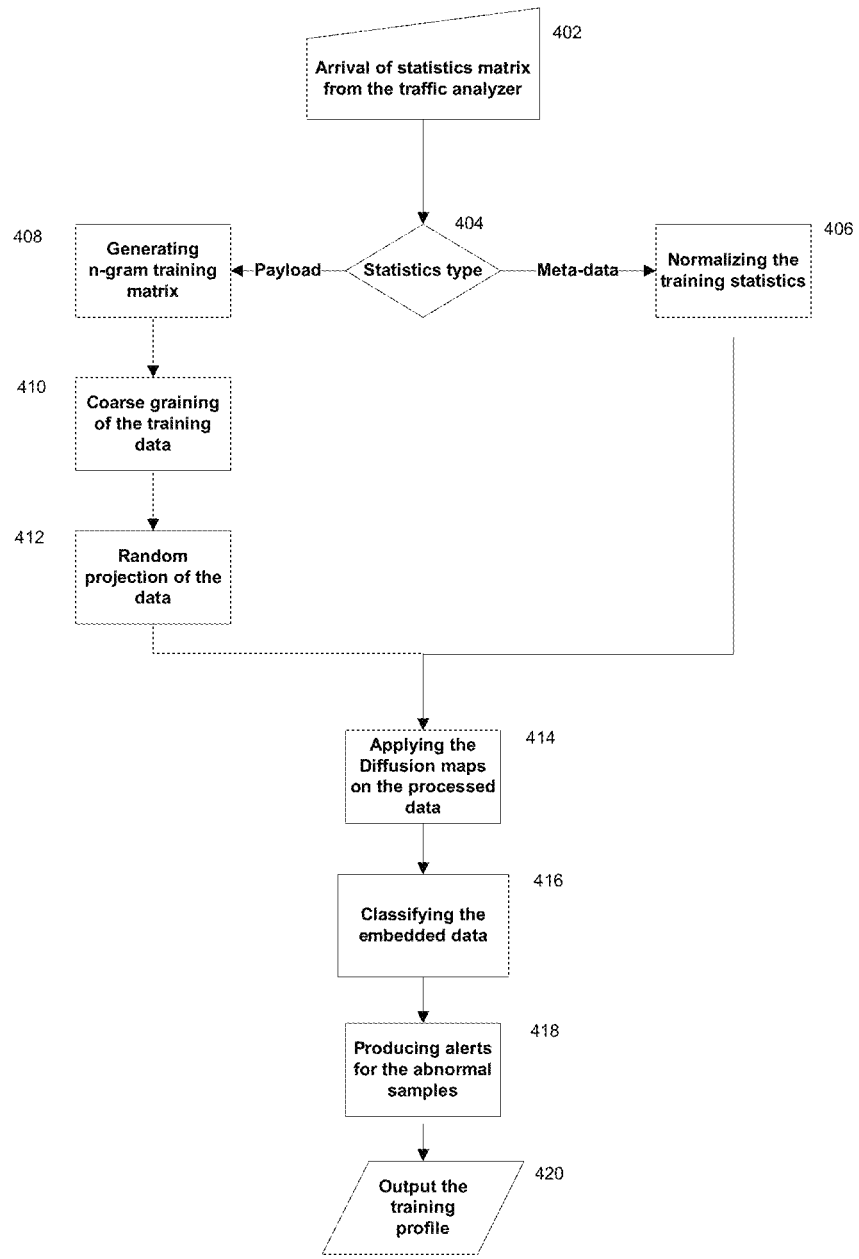
FIG. 4 is a flow chart showing in detail the flow of the training step in the traffic analyzer of FIG. 3.
Figure 5:
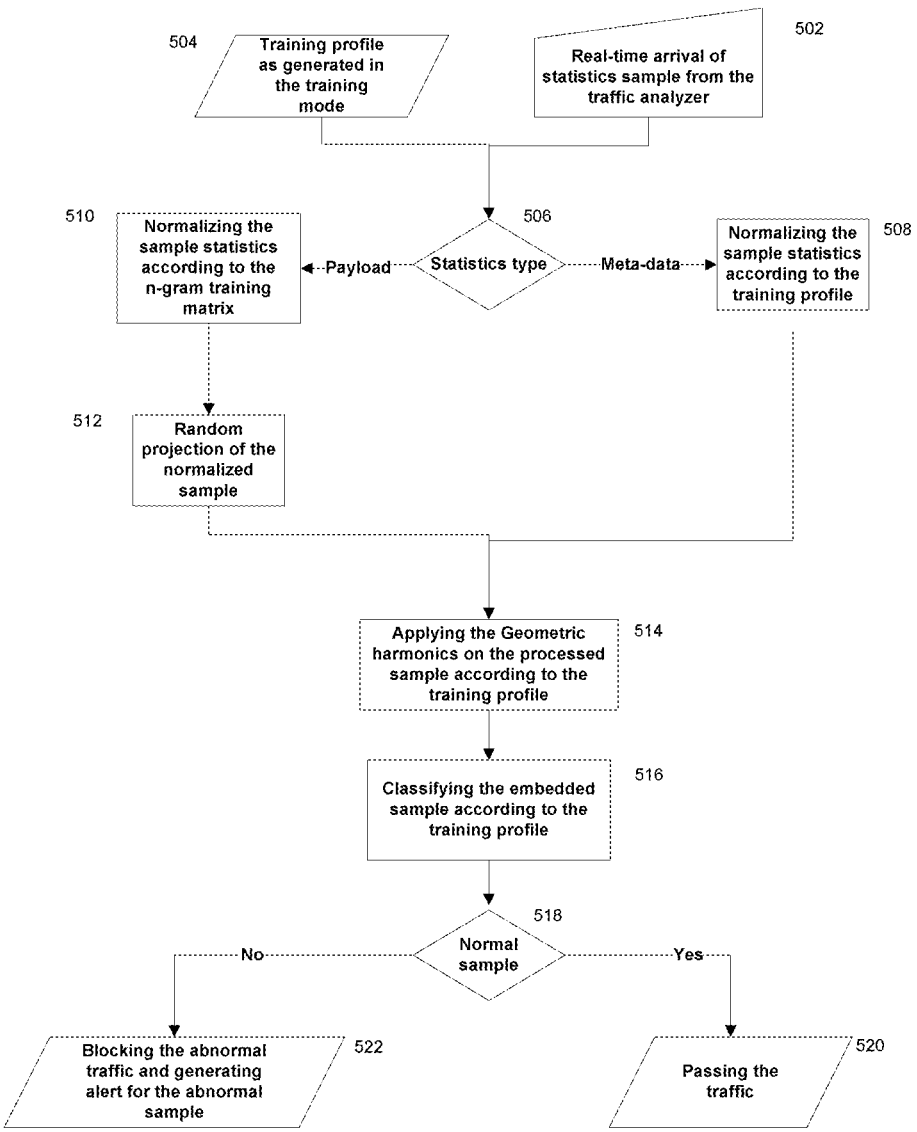
FIG. 5 is a flow chart showing in detail the flow of the detection mode in the traffic analyzer of FIG. 3.

The OLIDPL process described below uses the payload matrices generated by the COTA (step 408 in FIG. 4). The OLIDMD algorithm is suitable for analysis of many of the metadata values in protocols, for example, from the lower and upper layer protocols, including the application layer in HTTP (steps 304-306 in FIG. 3, steps 404-406 in FIG. 4). However, in this specific example, the COTA produces statistical HTTP content matrices of n-gram (n is between 2-7) ascii frequency, where each row contains $256^n$ features (step 408 in FIG. 4). The proposed payload inspection for frequency gathering of n-gram ascii content does not violate the privacy of the inspected payload. Only occurrences of symbols are gathered. These matrices have the following characteristics:

High sparsity—these matrices are very sparse, since usually each sample in the payload contains only dozens of bytes. Therefore, there are very few n-gram entries in the $256^n$ rows. The length of the payload is too small compared with the total features space size. In our experiments, most of the samples occupy less than 0.1% of the $256^n$ space.

High dissimilarity—different normal samples can have very different representations in the $256^n$ space. In our experiments, there is a little overlap between most of the different normal samples in row vectors.

High homogeneity—most of the normal samples use a very limited space in the $256^n$ space. In our experiments, most of the samples use 1-5% of the $256^n$ space, whereas 95-99% of the $256^n$ space are never used.

There are cases in which comparison between the frequency statistics of n-grams against each other is meaningless since there is a high dissimilarity among them. It is also meaningless to compare between frequency statistics of n-grams and a model. This is true in these cases because the training data is too sparse. One way to overcome the above sparsity issue is to generate sufficient frequency statistics of n-grams to build an accurate training distribution. This is impractical since the training dataset become too large to handle. The OLIDPL algorithm addresses these issues.

Outline of the OLIDPL Algorithm

The OLIDLPL algorithm has two sequential steps:
1. Training (step 100 in FIG. 1 and steps 200-206 in FIG. 2): The training step is based on the training step in the OLIDMD algorithm. We add an additional pre-processing step that addresses the issues described above, and which utilizes the sparsity of the n-gram data. The pre-processing step reduces the dimension of the multi-dimensional data, diminishes the sparsity of the data points and increases the similarity between normal samples (steps 510-512 in FIG. 5). Moreover, it replaces a large number of training data points with a small group of new data points that best represent the training traffic (step 512 in FIG. 5). The rest of the steps follow those in the OLIDMD training step. The output is an embedding matrix ("baseline profile embedding matrix") to be used in OLIDPL.
   a. Application of the traffic analyzer to produce a matrix of statistical data. The features of the vector process selection from the traffic payload are described in COTA (step 408 FIG. 4).
   b. This matrix is pre-processed (step 408 in FIG. 4) as follows:
      i. Generation of a unified n-gram training matrix as follows:
         1. Generation of the statistical training matrix, which describes a unified n-gram frequency;
         2. Updating of the unified n-gram training matrix with the frequency statistics of every training sample;
         3. The unified n-gram training matrix contains the frequency statistics of all the training samples;
         4. Computation of the distribution matrix of the unified matrix and saving of the unified matrix as a baseline for the online detection step.
      ii. Coarse graining of the training samples (step 410 in FIG. 4) as follows:
         1. Generation of initial random clusters according to a pre-determined number of training representatives;
         2. Computation of new cluster centers based on the random clusters;
         3. Reassignment of the samples according to the new centers;
         4. Repetition of this process until all the training representatives of the training clusters reach steady state and form a training representative matrix;
         5. Saving of the matrix of the training representatives as a baseline for the online detection step.
      iii. Dimension reduction and sparsity removal from the training samples representatives by using RP (step 412 in FIG. 4) as follows:
         1. Generation of number of $256^n$ random Gaussian vectors. We use the number 100 in experiments described below;
         2. Division of each training representative, which is a $256^n$ row vector, by the training distribution matrix;
         3. Computation of inner products of the output of step 2 with the random matrix that was computed by RP;

4. Replacement of each training representative by the logarithm of the output from its random projection;
5. Saving of the random projected representatives from the training matrix and of the random matrix computed by RP as a baseline for the online detection step.

c. The random projected representatives from the training matrix are processed by RLDM or AADB to derive its embedding matrix (step 414 in FIG. 4) as follows:
   i. Computation of pair-wise distances in the training matrix to provide a distances matrix;
   ii. Analysis of the distances matrix by the application of RLDM or AADB, which returns a selected group of r, r≥2, discriminating eigenvectors. This group of selected eigenvectors are the embedding matrix;
   iii. Saving of the embedding matrix as a baseline for the online detection.

d. Identification of abnormal points in the embedding (step 418 in FIG. 4) as follows:
   i. Computation of the density value for each point in the embedding matrix (the number of points in its neighborhood);
   ii. Generation of a histogram of the density values;
   iii. Classification of all the data points in the smallest bin as abnormal points while all the other data points are classified as normal;
   iv. Classification of all abnormal points as intrusions;
   v. Saving of the computed density and histogram parameters as a baseline for the online detection step.

2. Detection (102-106 in FIG. 1): The detection step is based on the OLIDMD algorithm. After the newly arrived data point is pre-processed, GH is applied to extend the (reduced) embedding baseline profile matrix with the newly arrived data point. The result is a new embedding for the new data point. The baseline profile matrix is then used to classify the newly arrived data point as either normal or abnormal.

a. Online application of the traffic analyzer to produce a logarithm value of each newly arrived data point (row vector) of statistical data (step in FIG. 5);
   b. The newly arrived row vector (data point) is pre-processed according to the baseline pre-processing algorithm (510 in FIG. 5) as follows:
      i. The new 256' row vector is divided by the baseline unified training distribution matrix (510 in FIG. 5);
      ii. Random vectors are generated from the application of RP. An inner product is computed between a random vector from RP and the normalized vector from step i (512 in FIG. 5);
      iii. The newly arrived row vector is replaced by the logarithm of the output from its random projection;
      iv. The random projected row vector is the output of the pre-processing step.
   c. The random projected row vector is processed by GH to derive its embedding vector (step 514 in FIG. 5) as follows:
      i. The row vector is analyzed by the application of the GH using the baseline embedding matrix (computed and saved in the training step). The analysis returns a matrix extension. The matrix extension is the new embedding vector of the new sample.
   d. Classification of the newly arrived data point as normal or abnormal (step 516 in FIG. 5) as follows:
      i. A density value, defined above, is computed using the baseline embedding matrix and the baseline density parameters (computed and saved in the training step);
      ii. The density value is placed in the baseline histogram (computed and saved in the training step);
      iii. A point that is mapped to the smallest bin of the baseline histogram is classified as an abnormal point. Otherwise, it is classified as a normal point (step 518 in FIG. 5).

Detailed and Formal Description of the OLIDPL Algorithm

This section provides finer mathematical details of the description above.

1. Training:
   a. Processing the raw training data: Let H be a data of raw data (packets). Let C be a matrix of size m×n that is produced from H by the POTA. m is the number of samples and n is the dimension of the n-gram space. Since in our examples we use a n-gram representation, there are $256^n$ n-grams possibilities;
   b. Pre-processing of matrix C: We pre-process matrix C by first generating a unified n-gram matrix, then coarse graining the training samples and reducing the dimensionality of the training sample representatives. There are two options:
      i. Generation of a unified n-gram training matrix U: An empty training matrix U of size $256^n$, which will contain the frequency of its unified n-gram, is allocated. Assume r, r=1, . . . , m, is a row in C, denoted by $c^r=\{c_{ri}: i=1, \ldots, n\}$. $c^r$ is a row vector that can also be reshaped to a matrix $\tilde{c}^r$ of size $\sqrt{n} \sqrt{n}$ ($256^n$ in our case). U is updated with the values of the reshaped row r: $U=U+\tilde{c}^r$. This is repeated for each r, r=1, . . . , m. Finally, every zero entry in this matrix is replaced by ϵ. At the end of this process, U contains the n-gram frequency of all the m training samples. We build the distribution matrix $\tilde{U}$ of the unified matrix U by dividing the unified matrix by the number of training samples: $\tilde{U}=U/m$. $\tilde{U}$ is saved as a baseline for the online detection step;
      ii. Coarse graining of training matrix C: The reduced training matrix A of size p×n, p<<m, is generated. A row r in A is denoted by $a^r=\{a_{ri}: 1, \ldots, n\}$, r=1, . . . , p, where p is the number of representatives in the reduced matrix. This matrix represents the reduced matrix C. A group $G=\{g^1, \ldots, g^p\}$ of p empty clusters is built. Assume, s, s=1, . . . , m, is a row in C that is denoted by $c^s=\{c_{si}: i=1, \ldots, n\}$. Each $c^s$ is randomly assigned to one of the p clusters in G. At the end of this process, each row vector from matrix C is assigned to one of the clusters in G. The reduced training matrix A is updated with the new centers (representatives of each cluster). Let $a^i=\bar{g}^i$, i=1, . . . , p. $\bar{g}^i$ is the averaged vector of all the samples assigned to $g^i$. The samples are reassigned to the clusters in G. according to the minimal distance between $c^s$, s=1, . . . , m, to every new center $a^i$=1, . . . , p. This process is repeated (updating A with the new centers and reassigning the samples) several times until A reached steady state;

iii. Dimension reduction of matrix A: Gaussian random vectors w are generated, where w is the desired dimension of the matrix A. A Gaussian random matrix RP of size $256^n \times w$, denoted by $rp^i = \{rp_{ji}: j-1, 256^n\}$, $i=1, \ldots$ w where the mean of each random vector is $$\overline{rp}^i = \frac{1}{256^n} \sum_{j=1}^{256^n} rp_{ji} = 0,$$

the standard deviation $$\sqrt{\frac{1}{256^n} \sum_{j=1}^{256^n} (rp_{ji} - \overline{rp}^i)^2} = 1$$

and the variance $$\frac{1}{256^n} \sum_{j=1}^{256^n} (rp_{ji} - \overline{rp}^i)^2 = 1,$$

is generated. A normalized matrix $\tilde{A}$ from the training matrix A, which uses the unified training matrix $\tilde{U}$ is, computed. Assume r, r=1, ..., p, is a row in A denoted by $a^r = \{a_{rj}: j=1, \ldots, 256^n\}$. The unified training matrix $\tilde{U}$ is reshaped into a row vector $\vec{U}$. The normalized training vector $a^r$ is computed as follows:

$$\tilde{a}^r = \frac{a^r}{\vec{U}}.$$

The computation of $\tilde{a}^r$ repeated for each r, r=1, ..., p. $\tilde{A}$ is the normalized training matrix that reflects the frequency of each training vector according to the unified training matrix. A random projected training matrix $A^{RP}$ is generated. Assume r, r=1, ..., p, is a row in $\tilde{A}$ denoted by $\tilde{a}^r = \{\tilde{a}_{rj}: j=1, \ldots, 256^n\}$. A random projected vector $a^{RP^r}$ is constructed as follows: $a_i^{RP^r} = \log(\tilde{a}^r \cdot rp^i)$, $i=1, \ldots$, w. The computation of $a^{RP^r}$ is repeated for each r, r=1, ..., p. At the end of this process, the training matrix A is replaced by the logarithm of the normalized and reduced matrix $A^{RP}$. The Gaussian random matrix RP and the random projected training matrix $A^{RP}$ are saved as baseline for the online detection step.

c. Processing the reduced matrix $A^{RP}$ derivation of its embedding matrix $\Psi$: The dimensionality of the data was reduced from w (number of random vectors) to a smaller number r where usually r<<w. This process applies RLDM or AADB to output the embedding matrix $\Psi$, which is saved for the online detection step.

d. Identifying abnormal (intrusion) points in embedding matrix $\Psi$: The embedding matrix $\Psi$ is used to identify the abnormal points in the data as described for OFID. We recall that in OFID, we performed the following: computed the minimum and maximum values, denoted by $\min_{\psi^i}$ and $\max_{\psi^i}$, respectively, for every column i, i=1, ... r, in $\Psi$; built the normalized density vector $\Phi$ using the norm of the density values $\|\phi\|_2$ and constructed the histogram that is divided into $\beta$ bins of size $$\gamma = \frac{\max_\Phi}{\beta}.$$

All were saved for the online detection step.

The outputs from the training step are the normalization parameters ($\delta^1$–the normalized standard deviation and $s^l$, l=1, ..., n–the sum of the Gaussian kernel), the 3D embedding matrix ($\Psi$) and the parameters ($\min_{\psi^i}$ and $\max_{\psi^i}$, i=1, ..., r, $\|\phi\|_2$ and $\gamma$) for the decision mechanism that determine whether each point in this matrix is normal or abnormal. These outputs are the baseline parameters for the online detection step next.

2. Detection:
a. Online production of a new sample: Let P be a row vector of size $1 \times 256^n$ produced by the traffic analyzer online, where n is the n-gram dimension;
b. Pre-processing and dimension reduction in online of a new sample P: The baseline pre-processing parameters, which were saved in the training step, are: $\tilde{U}$ (the unified training matrix) and RP (the Gaussian random matrix). RP is of size $256^n \times w$, where w is the desired reduced dimension, and is denoted $rp^i = \{rp_{ji}: j=1, \ldots, 256^n\}$, $i=1, \ldots,$ w. A normalized vector $\tilde{P}$ is constructed from the new sample P using the unified training matrix $\tilde{U}$ as follows: the training matrix $\tilde{U}$ is reshaped into a row vector $\vec{U}$ and $$\tilde{P} = \frac{P}{\vec{U}}$$

is computed. $\tilde{P}$ represents the frequency of the new sample according to the unified training matrix. A random projected vector $P^{RP}$ is constructed. It is denoted by $p^{RP_i} = \{p^{RP_1}, \ldots, p^{RP_w}\}$, where $p^{RP_i} = \log(\tilde{P} \cdot rp^i)$, $i=1, \ldots,$ w. At the end of this process, the original row vector P is replaced by the logarithm of the normalized reduced row vector $P^{RP}$;

c. Processing the reduced vector $P^{RP}$—derivation of its embedding vector $\psi$: The baseline embedding matrix $\Psi$, which was saved in the training step, is used. The dimensionality of $P^{RP}$ is reduced from w (number of random vectors) to a smaller number r where usually r<<n. This process uses the application of GH, to extend the embedding matrix $\Psi$ with the normalized reduced vector $P^{RP}$. The output of this process is the extension of the matrix. This extension is the new embedding vector $\psi$ of the new sample;

d. Online classification of a new sample as normal or abnormal by using the embedding vector $\psi$: The baseline embedding matrix $\Psi$ and the baseline identification parameters $\min_{\psi^i}$ and $\max_{\psi^i}$, i=1, ..., r, $\|\phi\|_2$ (the norm of the density values) and $\gamma$ (the size of the bins in the histogram), which were saved in the training step, are used to classify the new point $\psi$ to be normal or abnormal. The normalized density value $\Phi_\psi$ is used. The new sample $\psi$ is classified as abnormal if its normalized density value is mapped into the smallest bin. Otherwise, $\psi$ is classified as a normal point.

The output from this online process is a r-dimensional embedding vector $\psi$ and a decision mechanism that determines whether the new point is classified as normal or abnormal.

Figure 6:
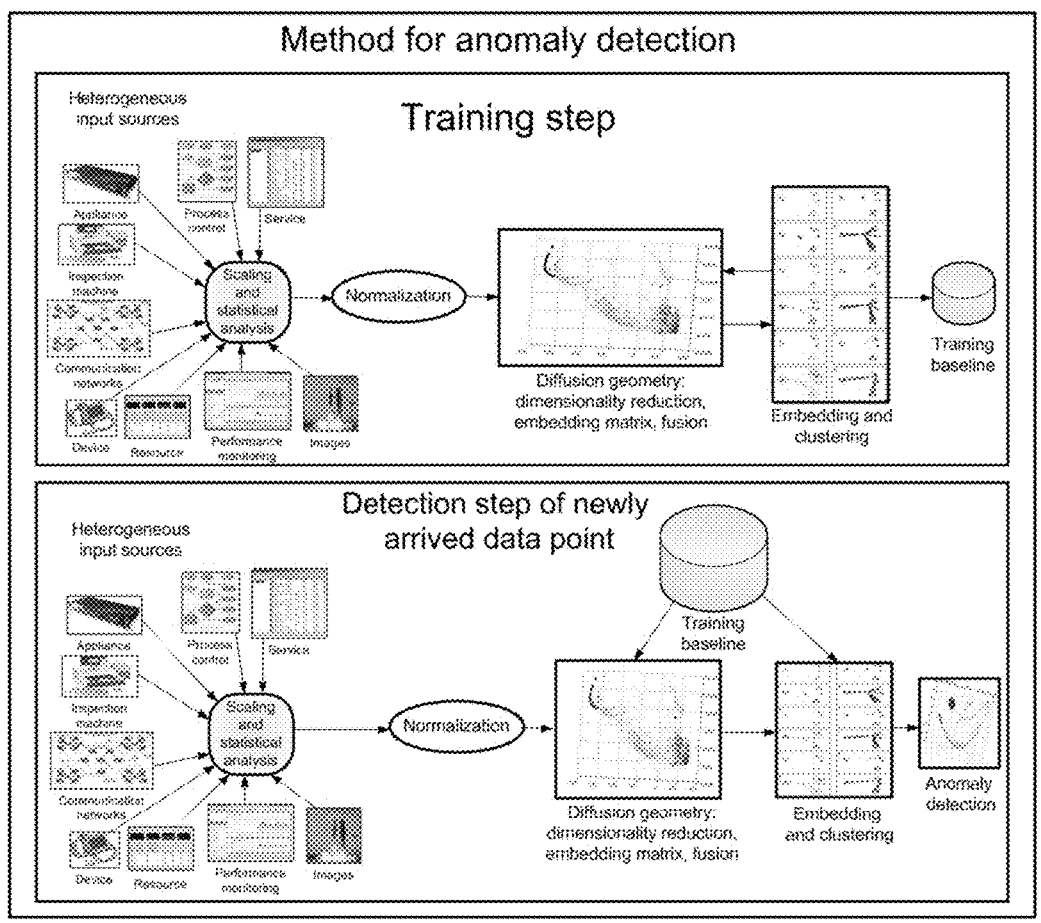
FIG. 6 is a functional flow of the two main steps in OFID, OLIDMD and OLIDPL algorithms.

FIG. 6 provides a visual description of the functional flow of the two main steps in the OFID, OLIDMD and OLIDPL algorithms. The top half in FIG. 6 describes the training step (step 100 in FIG. 1 and steps 200-206 in FIG. 2). The multi-dimensional input data to the training step can be from an entity such as a service, process control, an appliance, a device, an inspection machine, a communication network, a system, an apparatus, a piece of equipment, a resource, an image, a behavioral profile and the like. The input data is brought into a common scaling and then normalized as in step 202 of FIG. 2. Then, dimensionality reduction methods (step 204 of FIG. 2) are applied to produce the embedding matrix that generates clustering (training baseline). The detection step, in the lower half of FIG. 6, operates on a newly arrived multi-dimensional data point. This newly arrived data point is scaled and normalized, its dimensionality reduced (step 104 of FIG. 1) and its coordinates in the embedded space computed using out-of-sample extension (step 104 of FIG. 1). The last two steps (dimensionality reduction and out-of-sample extension computation) are done using the training baseline from the training step. Using the computed coordinates of the newly arrived data point and using Euclidian distance, the detection algorithm determines if the newly arrived data point is normal of abnormal (step 106 of FIG. 1).

EXAMPLES

The following section is meant to illustrate, using various examples, the wide scope of the practical uses and applications enabled by the methods of the invention. The methods were applied to detect anomalies in different data, both offline and online. It is to be understood that the examples presented in detail below represent only a small fraction of the applications to which the methods of the invention can be applied. We first provide explanations on the nature of the different data, then present experimental results. In some examples related to networks, our experimental results are compared with results obtained by known anomaly detection methods.

Intrusion Detection Evaluation Data (IDED)

1. DARPA intrusion detection evaluation dataset. These datasets are the most comprehensive evaluation datasets publicly available for evaluating the performance of intrusion detection systems. In other words, they are used as benchmarks for evaluating and developing intrusion detection systems, and appear in many references.
2. Governmental networks datasets. These datasets include real traffic captured in real-time from governmental networks, e.g. traffic from a network that consists of hundreds of web servers and from several Internet service provider networks that handle hundreds of users.
3. Academic network datasets. The data in these datasets were captured from the Tel-Aviv University (TAU) main web server (www.tau.ac.il) and from the Tel-Aviv University e-learning web server (www.virtual2002.tau.ac.il). Although these datasets were captured from the same academic network, the type of traffic (content) transferred through these two servers is completely different.
4. ONIDS simulation network datasets. These datasets were generated in a closed simulation network. In this network, different types of profiles, traffic and attacks were simulated:
   a. HTTP attacks data that includes a variety of the latest HTTP attacks against web servers;
   b. SQL injection attacks data that includes a variety of the latest SQL injection attacks against SQL databases;
   c. Worm attack data that include different stages of worm attacks against multiple users. They include exploitation, infection and propagation.

Following are detailed descriptions of these data.

DARPA Intrusion Detection Evaluation Datasets

Recent (1998, 1999) comprehensive evaluations of the performance of intrusion detection systems were performed on DARPA data (see Lincoln Laboratory, MIT, "DARPA Intrusion Detection Evaluation Datasets"). These evaluations included research on intrusion detection systems and on attacks against UNIX and Windows NT systems and against Cisco Routers. They used a relatively simple network architecture and background traffic designed to describe traffic that is similar to an Air Force base. The 1999 evaluation datasets included many novel aspects. Detections and false alarm rates were carefully measured for more than 18 systems. More than 56 attack types included stealthy and novel new attacks (updated and typical to those years) were used to measure detection rates. Weeks of background traffic were used to measure false alarms and misdetections rates. In addition, a unique intrusion detection corpus was created that included weeks of background traffic and hundreds of labeled and documented attacks. This corpus has been widely distributed and is being used as a benchmark for evaluating and developing intrusion detection systems. There are two evaluation datasets:
   1. The 1998 DARPA Intrusion Detection Evaluation Dataset, which includes nine weeks of network based attacks in the midst of normal flow of background data;
   2. The 1999 DARPA Intrusion Detection Evaluation Dataset, which includes five weeks of network based attacks, where two weeks do not contain any attacks and one week contains selected labeled attacks. The last two weeks contain 201 instances of 56 types of labeled attacks distributed throughout these two weeks.

Below, we concentrate on analyzing some of the network protocols in the DARPA evaluation datasets, without dealing with the content of the data. DoS and Probes attacks were detected.

Governmental Networks Datasets

To develop and verify this invention, we were provided full access to several real operational governmental networks, which suffer from thousands of attacks every day. The evaluated data were:

Web server network data, which contain traffic from a network, consists of hundreds of web servers. These web servers handle thousands of requests every day;

Internet user network data, which contain traffic from several Internet service providers and handle hundreds of users (government staff who use these networks to access the Internet).

Figure 7:
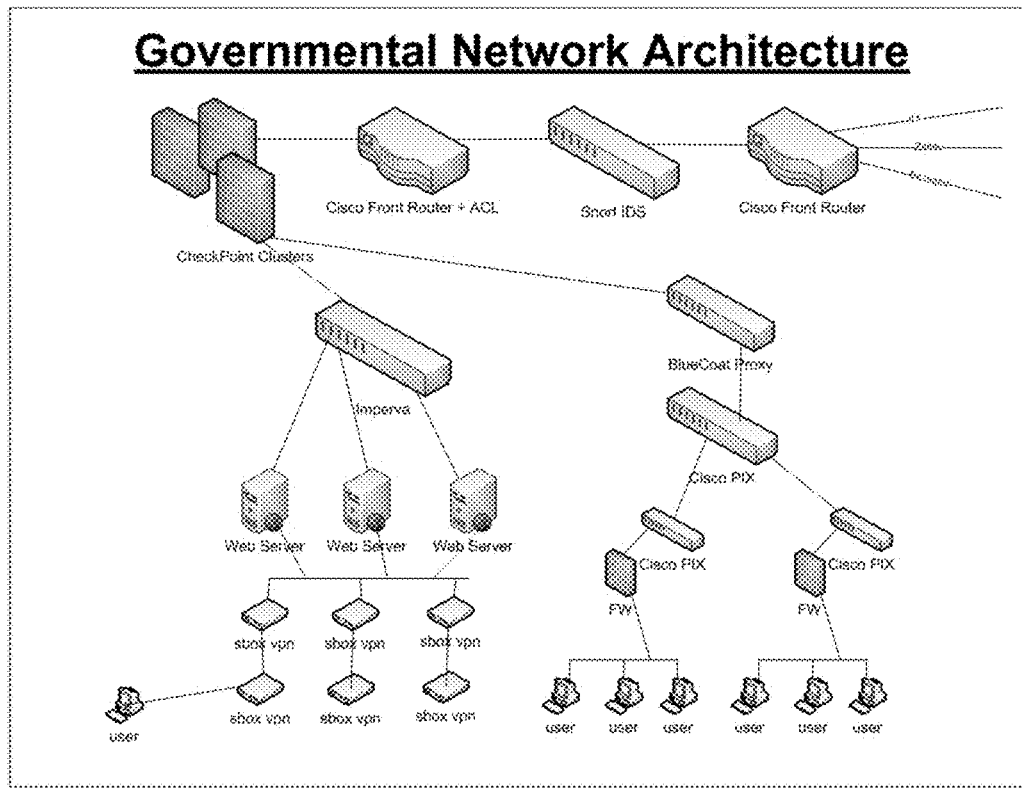
FIG. 7 shows schematically a governmental network architecture.

The governmental networks are protected using several network security tools: signature-based tools, anomaly-based tools, firewalls and proxies and VPNs. FIG. 7 describes the governmental network architecture including some of its major security tools. The governmental networks datasets were collected during several days using the tcpdump program. The resulting corpus size was of several terabytes of raw data. It also contained analysis logs from different security tools. We developed a unified database for advanced analysis of these logs and datasets. We concentrated on analyzing various aspects of these datasets: Web server network—metadata analysis, content analysis and more and Internet users networks—user profile analysis, metadata analysis, content analysis and more. The goal was to detect both external and internal attacks which reflect anomalous behavior.

Academic Network Datasets

The academic network datasets were created by two network sniffers (tcpdump programs) located outside Tel-Aviv University (TAU) main switch (gateway). One sniffer captured all the packets between TAU main web server (www.tau.ac.il) and the Internet. The other sniffer captured all the packets traffic between TAU e-learning web server (www.virtual2002.tau.ac.il) and the Internet. The academic network data contains mainly HTTP traffic between web clients and web servers. Both sniffers captured the whole content of the packets including the full payload. The outputs from these sniffing processes were two groups of unlabeled data:

Web server: The TAU web server (www.tau.ac.il) is the main web server of Tel-Aviv University. It accepts TCP connections on port 80 (HTTP). Each dataset was collected during a period of 10 minutes every hour, accumulating to a size of about 250 MB per dataset and about 5000 connections per datasets. The result was a corpus of 48 datasets with a total size of about 12 GB.

The Virtual TAU web server integrates advanced learning technologies through the Internet to supplement academic instructions. Virtual TAU hosts web sites of 1,500 staff members by presenting about 4,000 courses. These web sites contain an information tree that includes supplemental reading material, bibliographies, Web-links, learning activities, simulations, multimedia presentations, tests and evaluations, etc. In addition, this site facilitates mainly asynchronous communication tools (e.g., forums, on-line polls) for the students and the instructors. Currently, about 25,000 students are using Virtual TAU.—This web server accepts TCP connections on port 80 (HTTP). The result is a corpus of 288 datasets with a total size of about 45 GB.

ONIDS Simulation Network Datasets

Figure 8:
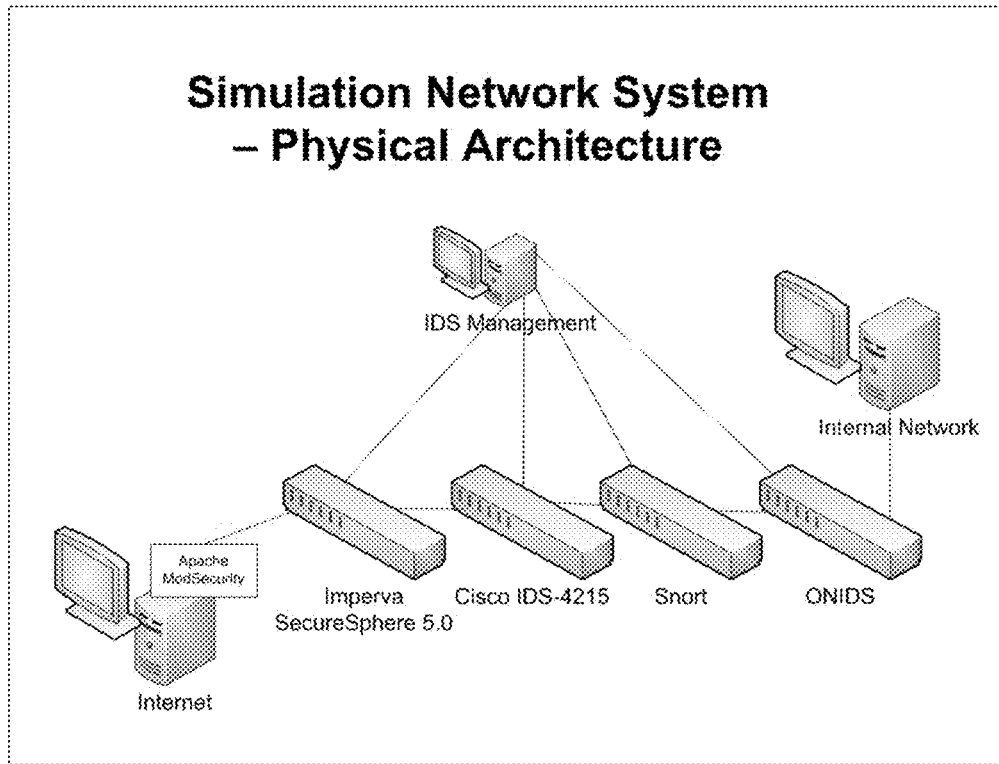
FIG. 8 shows schematically an ONIDS system.

In order to simulate different types of traffic and attacks that do not appear in the datasets above, we developed a system that simulates the traffic between an internal network and the Internet. The goal of this system is to simulate different attacks from the internal network to the Internet (and vice versa) while there is a normal traffic in the background between these networks. FIG. 8 presents the physical architecture of the system, used to verify the algorithms in a realistic network. In FIG. 8, the "internal network" machine simulates the internal network the "Internet" machine simulates the Internet. Both machines are connected to each other through several intrusion detection systems, listed below:

ONIDS implements the algorithms in the invention. It operates in a sniffing mode and it is completely passive. It does not affect the traffic between the internal network and the Internet.

Cisco IDS-4215 (Cisco IDS 4215 Sensor, Cisco Systems, Inc.) is the latest standalone IDS appliance from Cisco. It is a signature-based and anomaly-based IDS. It runs Cisco's latest intrusion prevention system software (IPS 6.0 (see Cisco IPS 6.0, hereinafter CIS60). It is configured to be in passive mode and it does not affect the traffic between the internal network and the Internet.

Snort IDS (see M. Roesch, "Snort", hereinafter SNORTM) is an open source signature-based network intrusion detection and prevention system capable of performing packet logging and real-time traffic analysis for IP networks.

Apache ModSecurity IDS (hereinafter MODSEC) is an open source signature-based intrusion detection and prevention engine for web applications. It is classified as a web application firewall. It is configured to be in passive mode and it does not affect the traffic between the internal network and the Internet.

The Imperva SecureSphere 5.0 IDS (hereinafter IMPERVA) is a signature-based and anomaly-based IDS.

Since all intrusion detection systems machines are in passive mode, the order of their connections is not important. FIG. 8 also shows an "IDS Management" component, which is a standalone PC connected directly to the management port of each IDS device. It is unseen by either the internal network or the Internet. It is used for management goals only.

In order for our system to simulate large networks with multiple machines in each network, we used several techniques and tools. These tools enabled us to implement large logical (virtual) networks with thousands of virtual machines using several physical machines. The following techniques and tools were implemented and used in the physical machines which contained the internal and the Internet networks:

VMware (VMware, Inc., hereinafter VMWARE;

BackTrack is used in both internal network machine and Internet machine;

Honeyd is a daemon that creates virtual hosts on a network. As a result, our virtual Internet network simulated 16,777,216 virtual machines;

Arpd is a daemon that listens to ARP requests and answers for IP addresses that are unallocated (ARP spoofing).

Hping is a command-line oriented TCP/IP packet assembler/analyzer. We use Hping to simulate an internal network;

Netcat is a network utility for reading from and writing to network connections on either TCP or UDP;

Nmap ("Network Mapper") is a command-line utility for network exploration and security auditing. We used Nmap on the internal network machine in order to scan the virtual Internet network using various scanning techniques;

Scapy is an interactive packet manipulation program. We used Scapy on the internal network machine in order to send special crafted packets to the virtual Internet network.

Figures 9, 10:
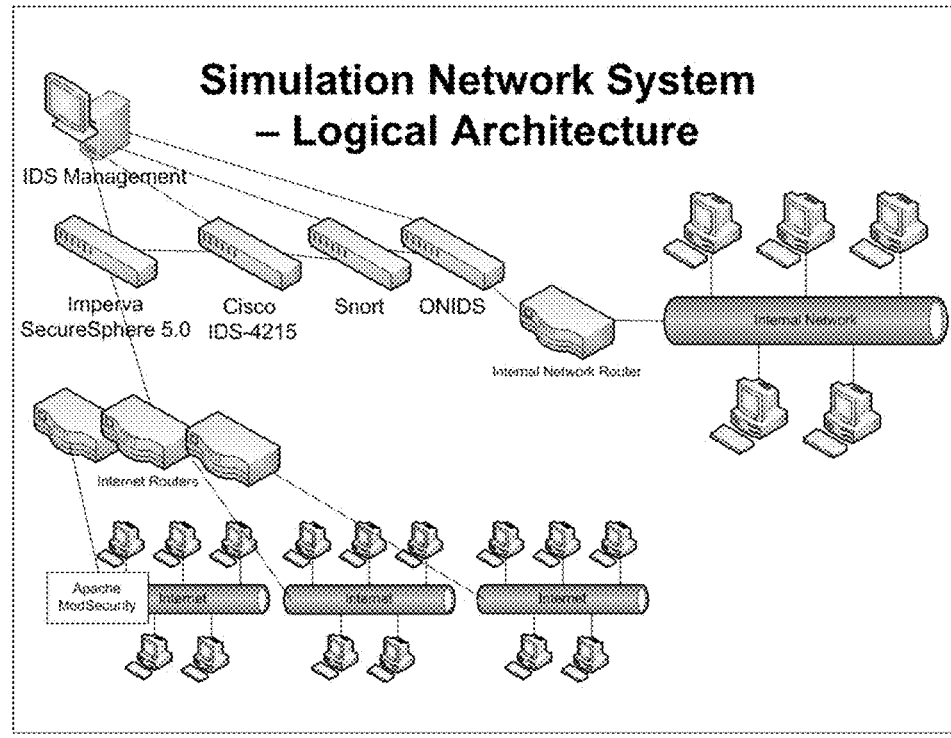
FIG. 9 is a description of the logical architecture of a NIDS simulation network.
FIG. 10 shows a portion of a multi-dimensional raw evaluation data sniffed and captured by the tcpdump program.

This collection of tools and techniques enabled us to simulate in our system a virtual internal network with dozens of virtual hosts that communicate with a virtual Internet network with thousands of virtual hosts and servers using only a few physical computers. ONIDS is an anomaly detection system configured to run computer executable instructions implementing the methods and techniques of the present invention. The computer executable instructions can be stored on a computer-readable medium, such as a hard disk or another storage medium. When such a program of instructions is to be executed, it is usually loaded into the random access memory of the computer, thereby configuring the computer to act in accordance with the techniques disclosed herein. FIG. 9 displays the logical (virtual) architecture of our simulation network.

Our system was used to simulate different known HTTP attacks: We compiled several well-known vulnerabilities in the HTTP service in order to generate the attack data with more than 60 variants of HTTP exploits. These vulnerabilities include CGI scripts, shell scripts, SQL injection, XPath injection, buffer overflows, IIS and Apache vulnerabilities, directory traversal, information gathering, system integrity, suspicious content and input validation error. These attacks were based on HTTP requests that were initiated by the HTTP client. The attacks were embedded in different parts of the HTTP request: the HTTP URI, the HTTP headers and the HTTP payload. Worm attack data was used as evaluation data in the simulation system. Three scans and propagation techniques were simulated in the system in order to scan and propagate worms to target hosts. Three network scenarios were simulated in the system:

1. Normal—several hosts from the internal network communicate with thousands of hosts and servers from the Internet network.
2. Single worm—a single host from the internal network is infected by a worm that tries to scan and propagate to other hosts. This is the very first stage of worm propagation in a network. In the background there is normal traffic flow between the other hosts (as in the normal scenario).
3. Multiple worms—multiple hosts from the internal network are infected by a worm that tries to scan and propagate to many other hosts. This is the second stage of worm propagation in a network (exponential propagation). In the background there is normal traffic flow between the other hosts (as in the normal scenario).

Intrusion Detection Traffic Analyzers (IDTA)

Figures 11, 12:
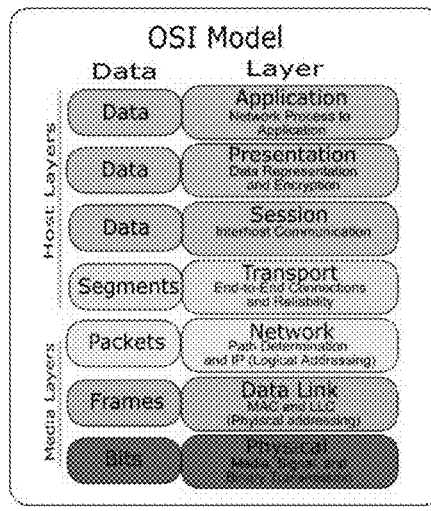
FIG. 11 is an example of an HTTP packet assembled from several protocols: Ethernet, IP, tcp and HTTP.
FIG. 12 shows the functional structure of Open System Interconnection (OSI) layers and the type of data processed by each layer.
Figure 18:
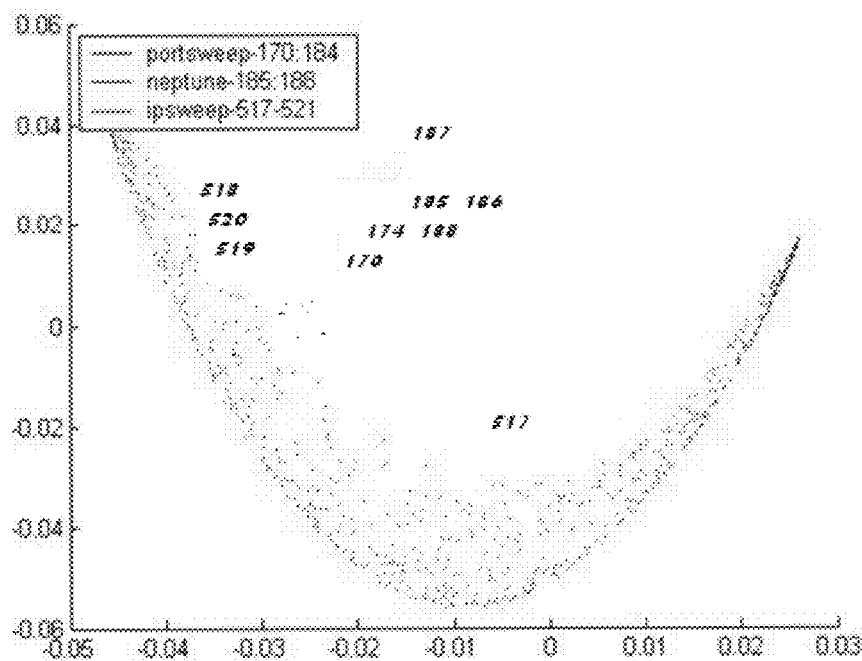
FIG. 18 shows results of the application of the training and detection steps of OFID using RLDM to one day (Thursday) from a week with attacks (abnormalities) of DARPA's data.

In order to analyze different datasets described in IDED above, we developed two different traffic analyzers. Some of the evaluation datasets included raw multi-dimensional data that was sniffed and captured by the tcpdump program. FIG. 10 displays a portion of this file as shown by the ethereal program (see G. Combs, Ethereal: A Network Protocol Analyzer). Every row in FIG. 10 represents a single packet where its attributes (also called features or measured parameters) are for example the packet number in this tcpdump file, its exact time and date, the source IP address of this packet, the destination IP address, the higher-level protocol and some information related to this packet (for example, clear text data in this packet). This tcpdump file contains the raw data itself without any prior processing or analysis. As a result, in order to process this data, a traffic analyzer had to be used. This traffic analyzer had to read the tcpdump file and processes all the packets. FIG. 18 shows an example of a single packet in this file. Each packet is assembled from several layers in the protocols. Since the evaluation data was captured from an Ethernet network, the lowest layer in the protocol of every packet is always the Ethernet (step 304 FIG. 3). The upper protocols layers depend on the application being used (step 306 in FIG. 3). In FIG. 11, we see an example of an HTTP packet that is assembled from several protocols: Ethernet, IP, tcp and HTTP. Each protocol has its own header with its own fields and data.

In order to analyze different data described in IDED above, we developed two different traffic analyzers: packet-oriented traffic analyzer (POTA) and connection-oriented traffic analyzer (COTA). POTA collects data from every arrival of a packet (step 302 in FIG. 3) and accumulates the statistics of various features in the packets that arrived during a specific time interval slice. This statistics is accumulated into global counters that are updated after the arrival of a new packet. These counters are created once in the training steps and they are global for all future packets (step 308 in FIG. 3). On the other hand, the COTA accumulates these statistics into local counters (step 318 in FIG. 3). These counters are created once for every new TCP/UDP connection (in the training step) and they accumulate the statistics of all the packets that belong to a specific connection. Each local counter is updated after the arrival of a new packet that belongs to this connection. Since the COTA holds statistics for every connection, it is very useful to analyze the application layer of the analyzed traffic in order to detect anomalies in the payload that is being transferred (streamed) during TCP/UDP sessions.

Detailed descriptions of POTA and COTA are given next. The features (parameters, measured data) extracted are described. Some of the features are not extracted but computed from other extracted features. This way we enlarge the number of features. In this case, we call a computed feature also computed data and the terms will be used interchangeably.

Packet-Oriented Traffic Analyzer (POTA)

Some of the evaluation data in IDED, like the DARPA data, contain multi-protocol network traffic. Since each protocol has its own header and fields, the traffic analyzer has to parse and handle each protocol separately (step 304 in FIG. 3). In order to retrieve maximum data and information from the packets, it is necessary to process many protocols. Furthermore, analyzing the data fields (features), in addition to the headers of the protocol, it is necessary to detect content-level anomalies. This way, the traffic analyzer can have a complete view of the features in the captured packets. However, in order to prove the validity of the proposed algorithms (OFID, OLIDMD and OLIDPL) using a packet-oriented traffic analyzer, it is possible to process a subset of protocols. Since most of the traffic in the evaluation data in IDED is TCP/IP, and most of the attacks in this data involve TCP/IP communication, our POTA handles only ip, icmp and tcp protocols. POTA can be extended in the same way to handle other protocols, such as to UDP.

Sequential Application of the POTA Process

1. Get a new arrival of a packet (step 302 in FIG. 3);
2. For each packet, the analyzer parses its IP header and checks the protocol field (of the IP header) for the next level protocol used in the data portion of the datagram (step 304 in FIG. 3);
3. The corresponding protocol handler is called (the analyzer handles only icmp and tcp protocols);
4. Each protocol handler parses the packet headers to extract features accordingly and collects several values;
5. At every predetermined time interval slice (for example, one minute), the analyzer summarizes the values collected during this time slice and saves the statistics of this time slice. The following data (other data is also possible) is gathered and computed every predefined time slice (step 308 in FIG. 3). The parameters (features) are: number of IP packets, number of icmp packets, ratio between the number of icmp packets and IP packets (not an extracted feature by computed data), number of tcp packets, number of tcp packets with different tcp flags (syn, syn_ack, fin, rst), ratio between the number of tcp packets with syn_ack flags and the number of tcp packets with syn flag (computed data), ratio between the number of tcp packets with rst flag and the number of tcp packets with syn flag, number of tcp connections (sessions), number of completed and uncompleted tcp connections, ratio between the number of the completed tcp connections and the number of the uncompleted tcp connections (computed data).

The output from this process is a statistics matrix (step 324 in FIG. 3) that contains a single row for every time slice of traffic. Each row contains the above 14 values (features), spread over different scales. For example, a typical DARPA datasets provides 22 hours of data. Therefore, the statistics matrix of DARPA datasets produced by POTA is of size 1320×14. This matrix is the input for the intrusion detection processes. These 14 values are the features we decided to choose to demonstrate the operation and performance of the algorithm.

The above choice represents one option. Of course, fewer, more and other features with other relations among the features can be chosen. The choice of the features vector is important and should be connected to the understanding of the "physical" nature of the underlying networks data. More features are useful. No bias is introduced by not preferring one feature over others.

Connection-Oriented Traffic Analyzer (COTA) Process

Some of our data, like the academic network and the governmental networks data, contain HTTP network traffic. As mentioned in POTA, analysis of data fields (features) of each packet, in addition to the headers of the protocol, is necessary to detect content-level anomalies. Since the traffic in these data is HTTP, most of the attacks in this protocol occur through the data fields. A COTA handles only the headers and the payload of the HTTP protocol (including the underlying TCP protocol). Extending our system to handle other application-layer protocols is possible. In order to analyze the content of the application-layer protocol (for example, the HTTP messages), The COTA uses the n-gram analysis to statistically model the data.

Sequential Application of the COTA Process

1. Get a new arrival of a packet (step 302 in FIG. 3);
2. For each packet, the analyzer parses its IP header and checks the protocol field (of the IP header) for the next level protocol used in the data portion of the datagram. In case the next level protocol is tcp, the tcp protocol handler is called. Otherwise, this packet is ignored (step 304 in FIG. 3);
3. The tcp handler parses the tcp header of the packet and checks its source and destination ports (of the tcp header). If none of them is 80 (the standard HTTP port) this packet is ignored (step 306 in FIG. 19);
4. The tcp protocol handler manages a map of tcp connections. Each connection is identified by the following quadruplet: IP address and port of the client-side (the initiator) of the connection and IP address and port of the server-side of the connection. The tcp connection is persistent for HTTP version 1.1;
5. If a corresponding tcp connection entry (according to the source and destination IP and port of the packet) does not exist for each packet then, a new entry is added to the connections map. This entry holds the following statistics of this specific tcp (HTTP) persistent connection (step 308 FIG. 3). The following parameters (features) are collected:
    a. Total duration of the connection measured by the time the first packet, is seen during this connection and the time the last packet is seen during this connection;
    b. Data duration of the connection measured by the time of the first data packet (packet that contains any payload), is seen during this connection and the time of the last data packet seen during this connection;
    c. number of tcp packets with different tcp flags (syn, syn_ack, fin, rst, cwr, urg, psh and ece), number of tcp packets, number of control tcp packets (packets without payload), number of data tcp packets (packets with payload), number of source (client) packets, number of source control packets, number of source data packets, number of source data bytes, number of destination (server) packets, number of destination control packets, number of destination data packets, number of destination data bytes.
6. Each packet, which contains the payload data, is passed to the HTTP protocol handler for content analysis (step 318 in FIG. 3). The HTTP protocol handler collects two types of content statistics for each HTTP request-response messages pair in this specific HTTP persistent connection, multiple pairs of HTTP request-response messages can be transferred during a single HTTP persistent connection) as follows:
    a. The collected features which are the HTTP metadata statistics are:
        i. number of request packets;
        ii. average sizes of the request packets (computed data);
        iii. standard deviation of the sizes of the request packets (computed data);
        iv. number of response packets;
        v. average sizes of the response packets (computed data);
        vi. standard deviation of the sizes of the response packets (computed data);
        vii. number of bytes in the URI of the client request message;
        viii. number of HTTP headers of the client request message;
        ix. average sizes of the HTTP headers of the request message (computed data);
        x. standard deviation of the sizes of the HTTP headers of the request message (computed data);
        xi. number of bytes in the status line of the response message;
        xii. number of HTTP headers of the response message;
        xiii. average sizes of the HTTP headers of the response message (computed data);
        xiv. standard deviation of the sizes of the HTTP headers of the response message (computed data).
    b. Computation of the HTTP payload statistics. The n-gram was tested for n=2-7 and it is described here for n=2. All the entries below are computed and not extracted—step 314 in FIG. 3—as follows:
        i. Frequency matrix of the n-gram ascii of the whole HTTP tcp payload of the client request message;
        ii. Frequency matrix of the n-gram ascii of the URI of the client request message;
        iii. Frequency matrix of the n-gram ascii of the HTTP headers of the client request message;
        iv. Frequency matrix of the n-gram ascii of the HTTP body of the client request message;
        v. Frequency matrix of the n-gram ascii of the whole HTTP tcp payload of the server response message;
        vi. Frequency matrix of the n-gram ascii of the status line of the entire server response;
        vii. Frequency matrix of the n-gram ascii of the HTTP headers of the server response message;
        viii. Frequency matrix of the n-gram ascii of the HTTP body of the server response message.

7. At the end of each tcp connection, the COTA summarizes the values collected by the tcp and HTTP handlers during this connection. The tcp handler produces a single series of values whereas the HTTP handler produces multiple series of values (a single series for each request-response pair). The traffic analyzer saves these statistics (step 340 in FIG. 3).

The outputs from this process are several statistical matrices:

1. A matrix that describes the statistics of tcp connections: 21 features (values) for every tcp connection;
2. A matrix that describes the statistics of pairs of request-response in HTTP metadata: 14 features for every request-response pair;
3. Matrices that describe the statistics of the frequency of the n-gram (in all the computation below n=2) ascii in the HTTP content: $256^n$ features for every request. Separate matrices are used for different data units (URI, headers, body and the whole payload);
4. Matrices that describe the statistics of the frequency of the n-gram ascii in HTTP content: $256^n$ features for every response. Separate matrices are used for different data units (status, headers, body and the whole payload).

For example, a typical academic network dataset provides 10 minutes of data. There are 500-2,500 tcp connections per dataset and 1,000-15,000 HTTP request-response pairs per dataset. These output matrices are the inputs for the intrusion detection processes.

The above choice of features is one option. There can be other options to choose features. As the number of features increases so is the dimensionality of the used data for training and detection procedures.

Syntactic Analysis of the Payload

In the section on the sequential application of the COTA process, we described a generic method for payload analysis. We used the n-gram analysis to statistically model the payload of the data. This method is not influenced by the payload load of the application. However, in order to increase payload accuracy analysis, the analysis methodology is adapted to payload type (according to the application that generated it).

In this section, we present a syntactic analysis of the payload. We used this method for the analysis of SQL queries, in order to detect SQL injection attacks. However, it is possible to adapt this method to any type of payload or application (as long it is possible to model the syntax of the payload).

To build our syntactic model for SQL-query, the following steps are taken:

1. The SQL query is transformed to a new domain, where the alphabet is composed of several tokens instead of alphabetical characters;
2. The statistics in this domain are computed.

These steps are described below.

Building the Tokens Model:

We transform an SQL query into a new domain. The new domain alphabet is constructed from elements called tokens. Each symbol of the SQL query is transformed and replaced by its associated token. The model was developed according to certain guidelines:

1. Characters or words with a similar SQL grammatical meaning should be grouped under the same token;
2. The use of larger number of tokens enables to get a better accurate description of different queries.

The different tokens with their associated symbols are described in Tables 1 and 2. Table 1 describes tokens classification.

TABLE 1

| Token name | Description |
| --- | --- |
| Command | SQL commands: SELECT, INSERT, UPDATE, etc |
| Support | SQL reserved words which are not commands: FROM, WHERE, LIKE, etc |
| Log | SQL logical conditions: AND, OR, NOT, etc |
| Punc | SQL punctuation signs: ( ), [ ], *, etc |
| Comm | SQL comment signs: --, \#, etc |
| Math | SQL mathematical signs: +, −, /, etc |
| Comp | SQL comparison signs: $<, \leq, >, \geq$, etc |
| Quote | SQL quotation marks: ', ", etc |
| Identifier | Table and column names, etc |
| Literal | Values which relate to user's input |

In addition, two location tokens were added: 'begin'—to mark the beginning of a query, and 'end'—to mark the end of a query. These two tokens enhance the representation accuracy level. This is due to the fact that sometimes the location of an SQL phrase can indicate whether it is valid or suspicious.

Table 2 describes the location tokens.

TABLE 2

| Token Name | Description |
| --- | --- |
| Begin | The beginning of an SQL query |
| End | The end of an SQL query |

Following is an example that demonstrates this process:

SELECT firstName,lastName,Address WHERE Age<50

The tokens-based representation is as follows:

command-identifier-punc-identifier-punc-identifier-support-identifier-comp-literal By adding the location tokens, the final representation becomes:

begin-command-identifier-punc-identifier-punc-identifier-support-identifier-comp-literal-end Statistical Analysis of the Model:

In our proposed method, we apply the n-gram model to SQL queries that are represented in the tokens domain. For example, by applying a 2-gram on the previously given representation begin-command-identifier-punc-identifier-punc-identifier-support-identifier-comp-literal-end we get the token frequency in a 2-gram model:

TABLE 3

| 2-gram sequence | Frequency |
| --- | --- |
| begin-command | 1 |
| command-identifier | 1 |
| identifier-punc | 2 |
| punc-identifier | 2 |
| identifier-support | 1 |
| support-ident | 1 |
| identifier-comp | 1 |
| comp-literal | 1 |
| literal-end | 1 |
| rest of sequences | 0 |

Application of 3-gram model to the same representation produces the following token frequency in a 3-gram model:

TABLE 4

| 3-gram sequence | Frequency |
| --- | --- |
| begin-command-identifier | 1 |
| command-identifier-support | 1 |
| identifier-support-identifier | 1 |
| support-identifier-comp | 1 |
| identifier-comp-quote | 1 |
| comp-quote-literal | 1 |
| quote-literal-quote | 1 |
| literal-quote-end | 1 |
| rest of sequences | 0 |

By increasing n, more rare sequences are identified. This may reduce the number of false negative detections (attacks which are not identified). Unfortunately, this process can also add noise to the detection process and increase the number of false positive detections (valid queries which mistakenly identified as attacks).

The output from this syntactic analysis process contain a matrix that describes the statistics of the frequency of the n-gram syntax in SQL queries. Since for the SQL syntactic analysis we defined 12 different tokens, the output matrix contains $12^n$ features for every SQL query. This output matrix is the input for the intrusion detection processes (training and detection). The above feature choice is one option. There can be other options to choose features.

Comparison Between POTA and COTA

The POTA and the COTA handle data from various layers of the OSI layers (see International Standardization Organization (ISO), ISO/IEC 7498-1:1994—Information technology—Open Systems Interconnection—Basic Reference Model: The Basic Model, 1994). FIG. 12 shows the OSI layers and the type of data each layer processes.

Table 51 summarizes the usage of each traffic analyzer and the major differences among them.

TABLE 5

| | POTA | COTA |
| --- | --- | --- |
| Analyzed protocols | IP, ICMP, TCP | TCP, HTTP |
| Analyzed data | Protocols headers | Protocols headers, protocols payload |
| Analyzed OSI layers | Layers 3, 4 | Layer 3-7 |
| Metadata analysis | Layers 3, 4 | Layers 3, 4, 7 |
| Payload analysis | | Generic syntactic |
| Analyzed profile | Global for every packet | Local for every connection |
| Tested evaluation data | DARPA, Worms simulation | NIDS, SQL injection simulation |
| Examples of detected attacks | DoS, probes, worms | HTTP attacks, SQL injections, Emails anomalies |

It is important to mention that these traffic analyzers can be extended to handle many other protocols.

Performance of the OFID and OLIDMD and OLIDPL Algorithms to Networks

This section describes the experimental results from the application of the OFID, OLIDMD and OLIDPL algorithms to different types of network data. The outputs are presented after the derivation of the embedding matrix.

Figure 13:
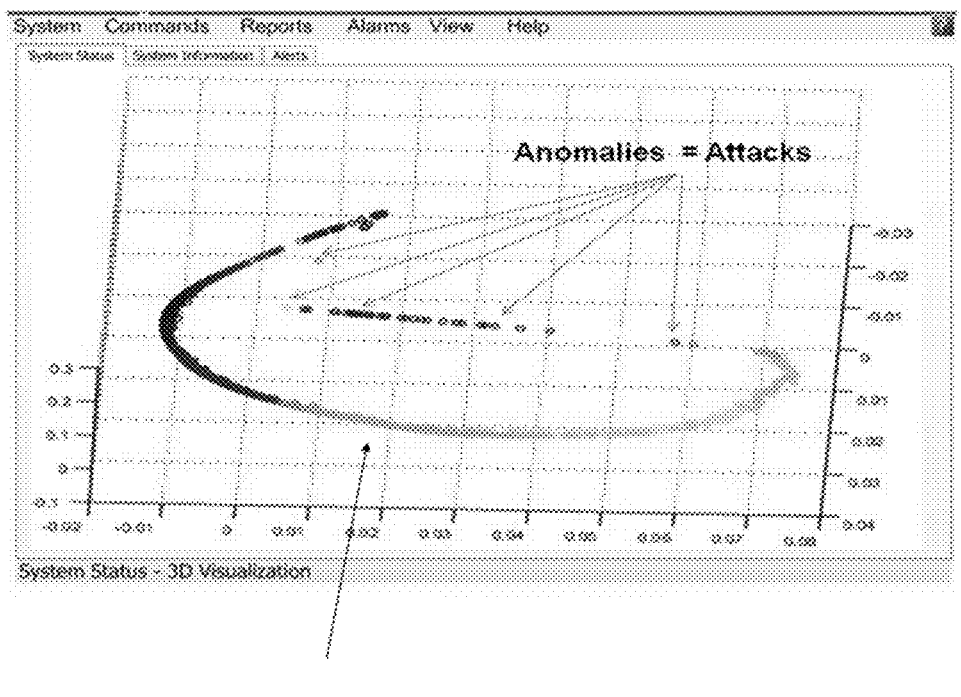
FIG. 13 is a general format showing the way experimental results are displayed in the figures below, displaying a normal cluster and abnormal points (attacks, intrusions) that deviate from the normal cluster.

FIG. 13 presents a general format of how we display the experimental results. The normal behavior manifold (cluster), which is shown as a cluster of dense points (which will some times be displayed with different concentrations) is displayed in a two- or three-dimensional space. This lower-dimensional space is the output after the application of the training step (steps 100 of FIG. 1 and 200-206 of FIG. 2) that generates an embedding matrix that generates this normal behavior cluster. The newly arrived points, which did not participate in the training step, that are located outside the normal behavior cluster, whose coordinates were determined by the out-of-sample extension in the detection step (steps 102-106 of FIG. 1), are the abnormal points which also called intrusions and attacks. Normal behaved points will belong to a normal behavior cluster.

The experimental results were derived from the application of both training and detection steps. The outputs are visualized in a picture. Every attack (intrusion, abnormality) is marked. The X-, Y- and Z-coordinates in the following figures represent the first, second and third eigenvectors of the first, second and third eigenvalue, respectively, as described in the detailed description of each algorithm. The Z-coordinate is only shown in some figures.

In some of the IDED such as DARPA and ONIDS, the attacks (intrusions and abnormalities) were labeled and documented by the creators of these IDEDs. Thus, we know exactly the starting and the ending time of each attack. This enables us to verify the performance of the algorithms.

In all the figures that show anomalies (abnormalities), which deviate from a normal cluster (normal activity), a group of r, r=2, 3 discriminating eigenvectors, which constitute the embedding matrix, was sufficient to describe and visualize the actual activities. Therefore, in these figures, r is either 2 or 3.

Performance of OFID: Experimental Results

Experimental Results from DARPA Data Using OFID

The OFID was tested on two different weeks from the 1999 DARPA that was described in IDED. One week contained various types and instances of attacks and the others did not contain any attacks. Since the attacks were labeled and documented by DARPA, we know exactly the starting and the ending time of each attack. This enabled to validate the output from the OFID algorithm.

Figure 14:
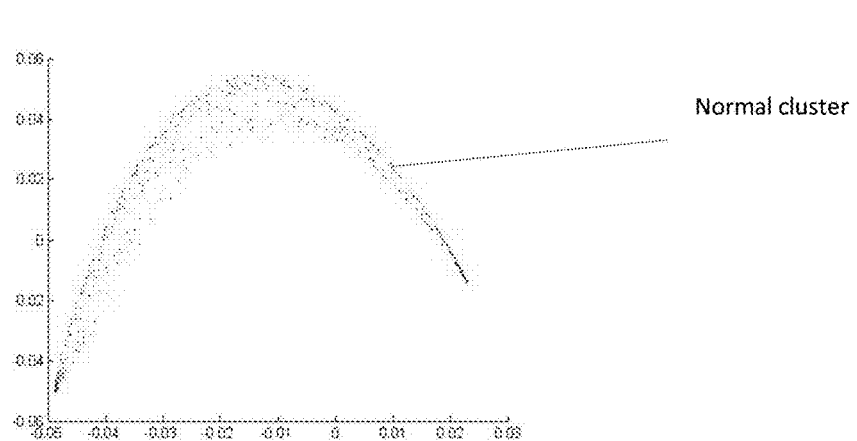
FIG. 14 shows results of the application of the training and detection steps of OFID using RLDM to one day (Monday) from a week with no attacks (no abnormalities) of DARPA's data.
Figure 15:
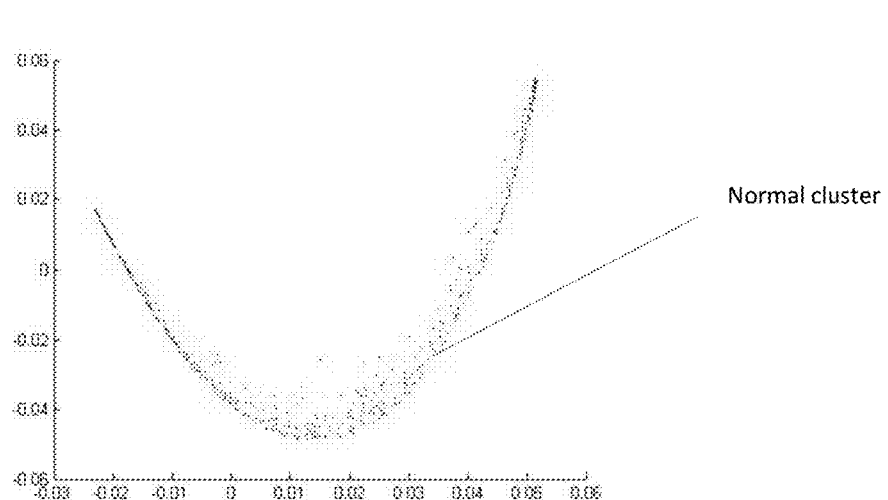
FIG. 15 shows results of the application of the training and the detection steps OFID using RLDM to one day (Tuesday) from a week with no attacks (no abnormalities) of DARPA's data.

FIGS. 14 and 15 display the outputs from the application of our OFID training and detection procedures using RLDM to Monday and Tuesday, respectively, which were days in a week without attacks (abnormalities). All the points are normal and lie on the main normal behavior manifold. No abnormal data points were found Wednesday till Friday (not displayed). These results confirm the events in DARPA's data.

Figure 16:
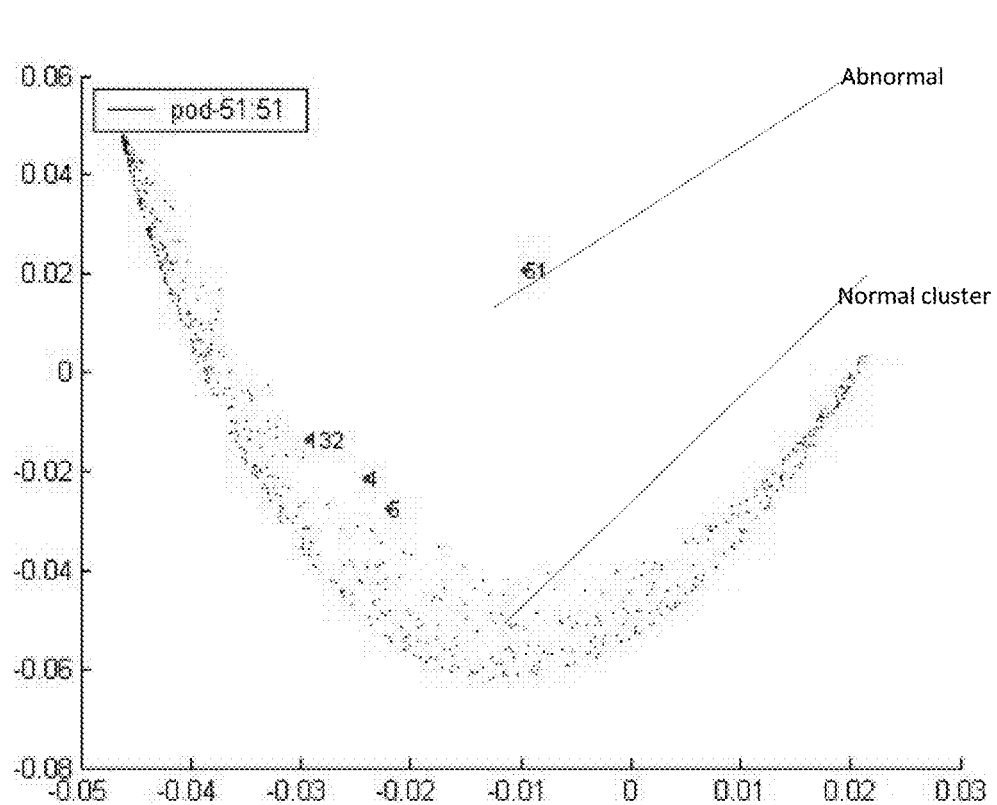
FIG. 16 shows results of the application of the training and detection steps of OFID using RLDM to one day (Monday) from a week with attacks (abnormalities) of DARPA's data.
Figure 17:
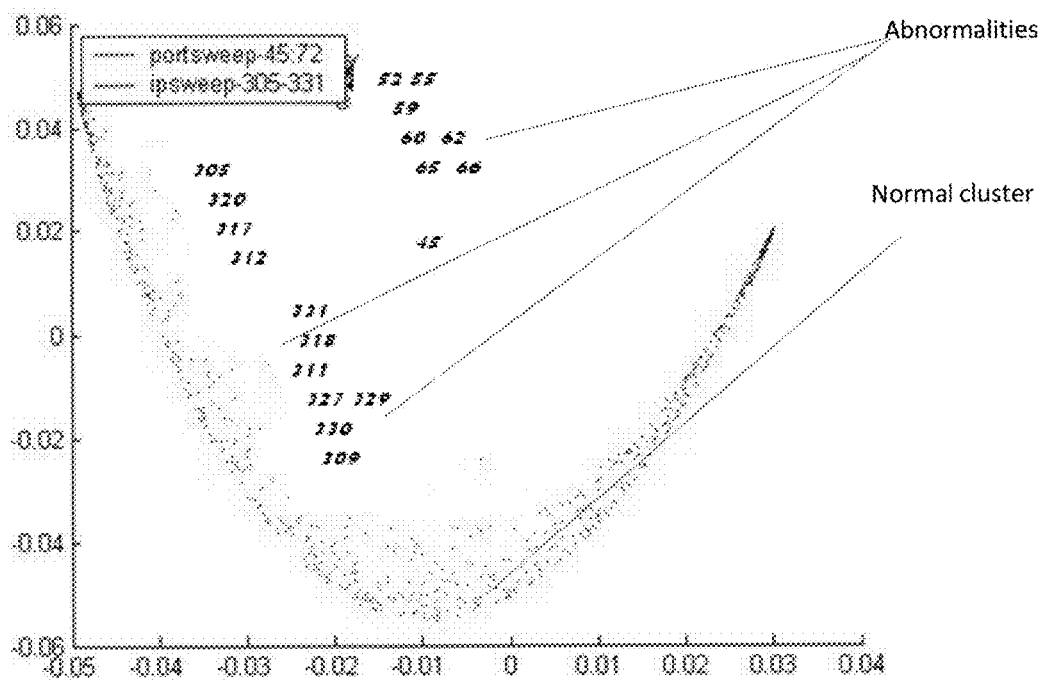
FIG. 17 shows results of the application of the training and detection steps of OFID using RLDM to one day (Tuesday) from a week with attacks (abnormalities) of DARPA's data.

FIGS. 16, 17 and 18 display the outputs from the application of our OFID training and detection procedures using RLDM to Monday, Tuesday and Thursday, respectively, which were days in a week with attacks (abnormalities). All the abnormal points (attacks) lie outside the main normal behavior manifold. Attacks were also found on Wednesday and Friday (not displayed).

FIG. 16 displays Monday's normal activities and a ping of death attack that started and ended at time 51.

FIG. 17 displays Tuesday's normal activities and attacks: a) a portsweep attack started at time 45, continued at time 46 to 71 and ended just before time 72; and b) an ipsweep attack that started just after time 305, continued at time 306 to 330 and ended at time 331.

FIG. 18 displays Thursday's normal activities and attacks: a) a portsweep attack started at time 170, continued at time 171 to 183 and ended at time 184; b) a neptune attack started at time 185, continued at time 186 to 187 and ended at time 188; and c) an ipsweep attack started at time 517, continued at time 518 to 520 and ended just before time 521.

Figure 19:
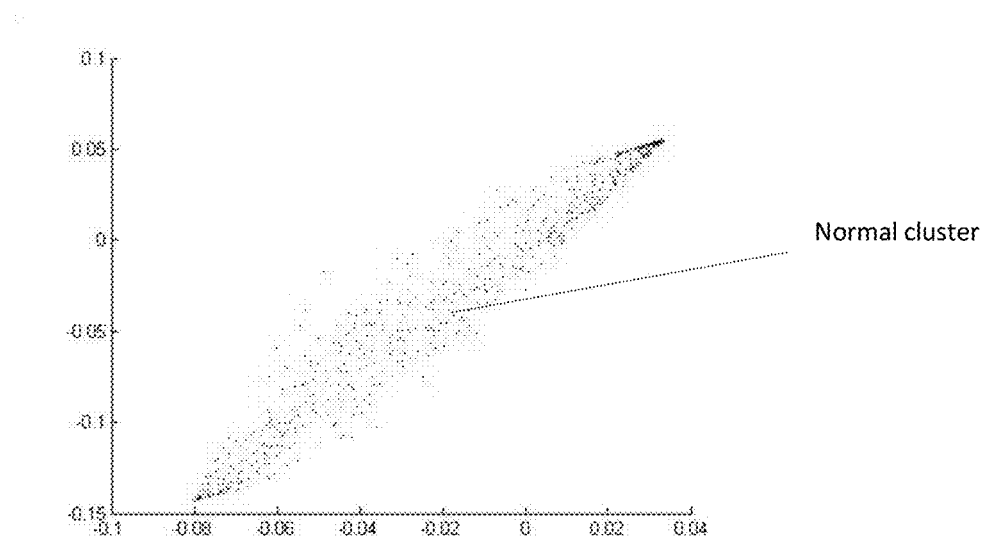
FIG. 19 shows results of the application of the training and detection steps of OFID using AADB to one day (Tuesday) from a week with no attacks (no abnormalities) of DARPA's data.
Figure 20:
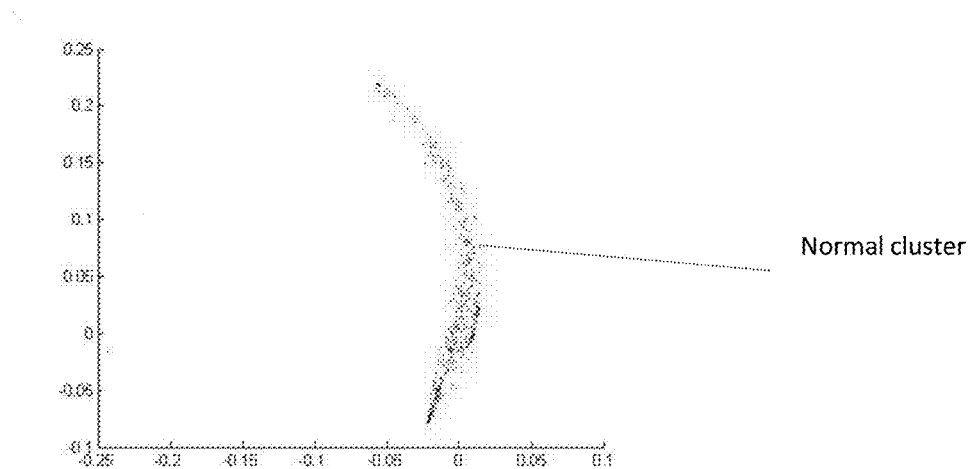
FIG. 20 shows results of the application of the training and detection steps of OFID using AADB to one day (Wednesday) from a week with no attacks (no abnormalities) of DARPA's data.

FIGS. 19 and 20 display the outputs from the application of our OFID training and detection procedures using AADB to Tuesday and Wednesday, respectively, which were days in a week without attacks. All the points are normal and lie on the main normal behavior manifold. No abnormal data points were found also on Monday, Thursday and Friday (not displayed).

Figure 21:
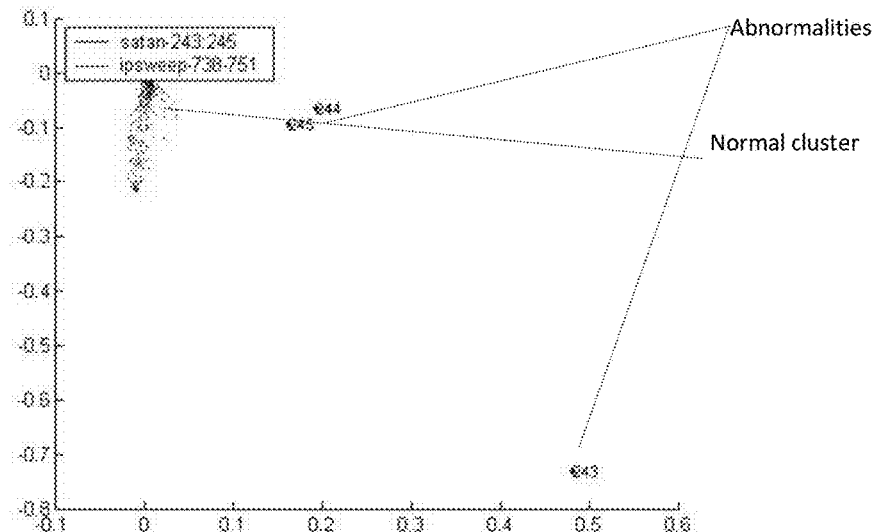
FIG. 21 shows results of the application of the training and detection steps of OFID using AADB to one day (Wednesday) from a week with attacks (abnormalities) of DARPA's data.

FIG. 21 displays the output from the application of the training and detection steps using AADB to Wednesday's data. The following attacks were detected: a) a satan attack, indicated as a cluster of black points on the right part of the figure, started at time 243, continued at time 244 and ended at time 245; and b) an ipsweep attack, indicated as a cluster of points on the upper part of the figure, started at time 738, continued at time 738 to 750 and ended just before time 751. All the normal points lie on the main manifold, while there are two separate clusters of significant outliers (attacks). In addition, all (100% of) attacks in the other days of this week were detected correctly.

All of the results above, obtained with our OFID algorithm, confirm the events in DARPA's data.

Performance of OLIDMD: Experimental Results
Experimental Results on DARPA Data

Figure 22:
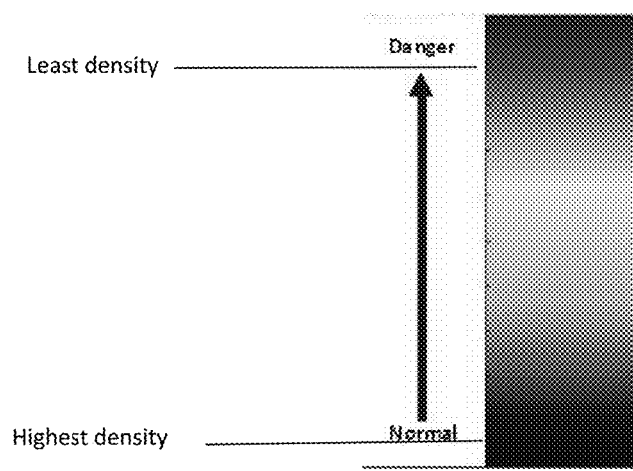
FIG. 22 shows how a range of densities indicates the status of the "sureness" of a point in the normal cluster.
Figure 23:
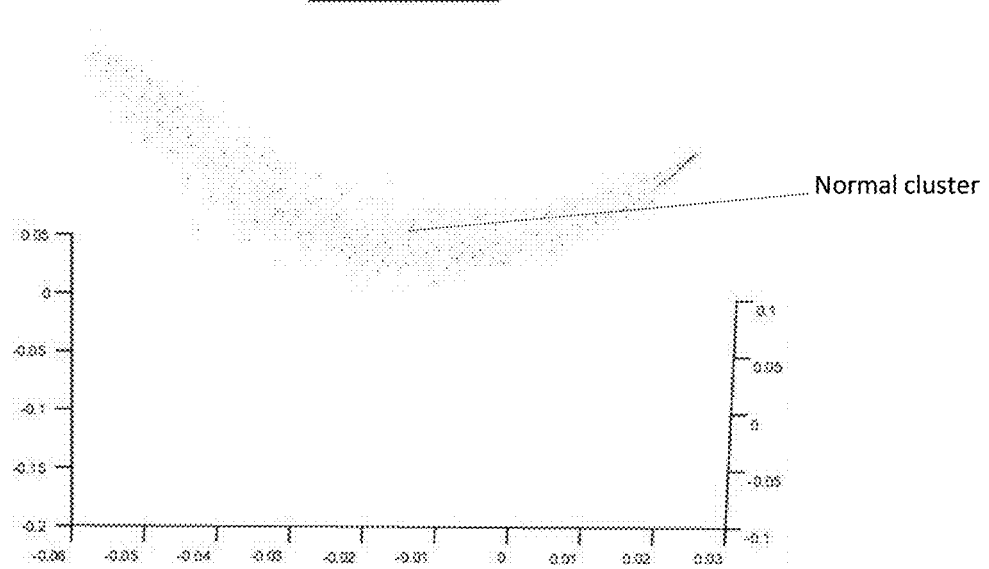
FIG. 23 shows results of the application of the training and detection steps of OIIDMD to one day (Monday) from a week with no attacks (no abnormalities) of DARPA's data.
Figure 24:
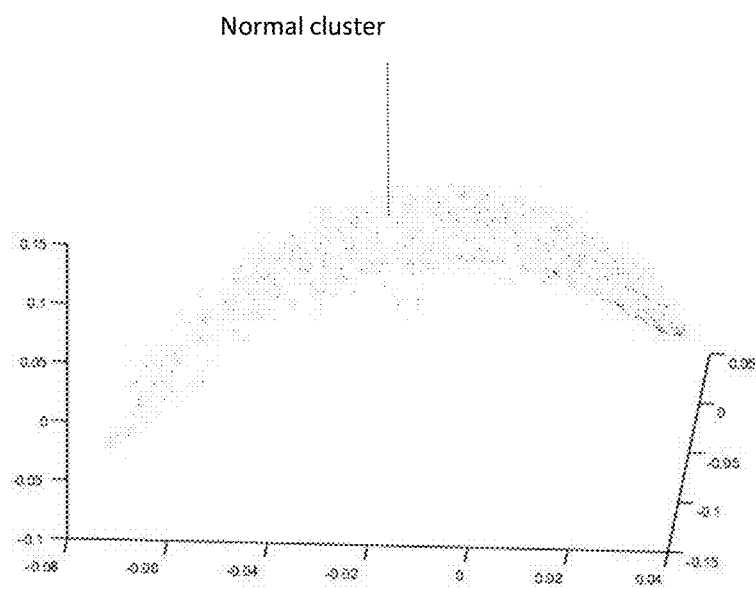
FIG. 24 shows results of the application of the training and detection steps of OIIDMD to one day (Friday) from a week with no attacks (no abnormalities) of DARPA's data.

The OLIDMD was tested on two different weeks from the 1999 DARPA data described in IDED. One week contains various types and instances of attacks and the other week does not contain any attacks. Since the attacks were labeled and documented by DARPA, we know exactly the starting and the ending time of each attack. This enables to validate the output from the OLIDMD algorithm. This section presents the experimental results in the following order:

1. Each output displays: a) Training step: application of the Gaussian normalization and RLDM to derive the embedding matrix $\psi$ that spans the embedded (lower dimension) space. b) Detection step: online application of the Gaussian normalization and the result from the application of out-of-sample extension (GH) to determine whether a newly arrived data point is normal or abnormal.
2. The same as 1 above, but the normal behavior manifold (normal cluster) is displayed using a density function of each point. This presentation provides a visual perception of the normal and abnormal points in the manifold. It gives each point a visual score that shows how close is the point to a normal area and whether it is getting closer to an abnormal area. A point in the highest density area means that it is absolutely normal. A lesser density means that the point is normal but located in a less populated area than the denser one. Smallest (least) density means that the point is normal but located in "sparse" density area indicate that a danger is approaching. The range of densities is shown in FIG. 22. FIGS. 23 and 24 display respectively results for a Monday and a Friday of the week without attacks. All the newly arrived points are normal and lie in the main manifold. The rest of the days in this week were also detected correctly (not shown).

Figure 25:
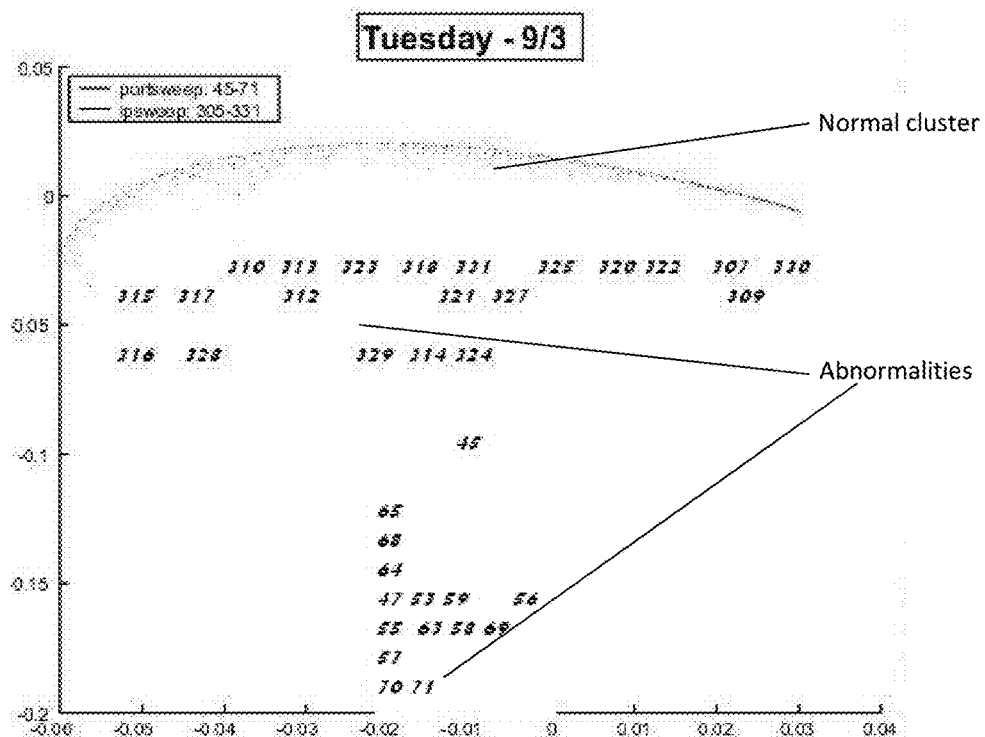
FIG. 25 shows results of the application of the training and detection steps of OLIDMD to one day (Tuesday) from a week with attacks (abnormalities) of DARPA's data.
Figure 26:
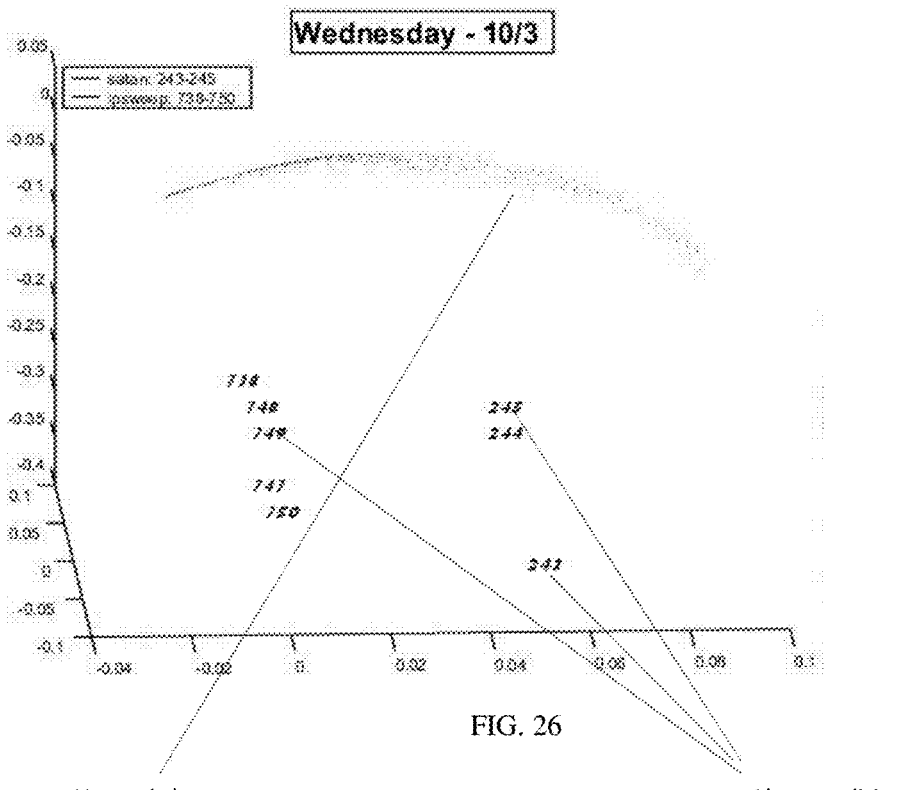
FIG. 26 shows results of the application of the training and detection steps of OLIDMD to one day (Wednesday) from a week with attacks (abnormalities) of DARPA's data.
Figure 27:
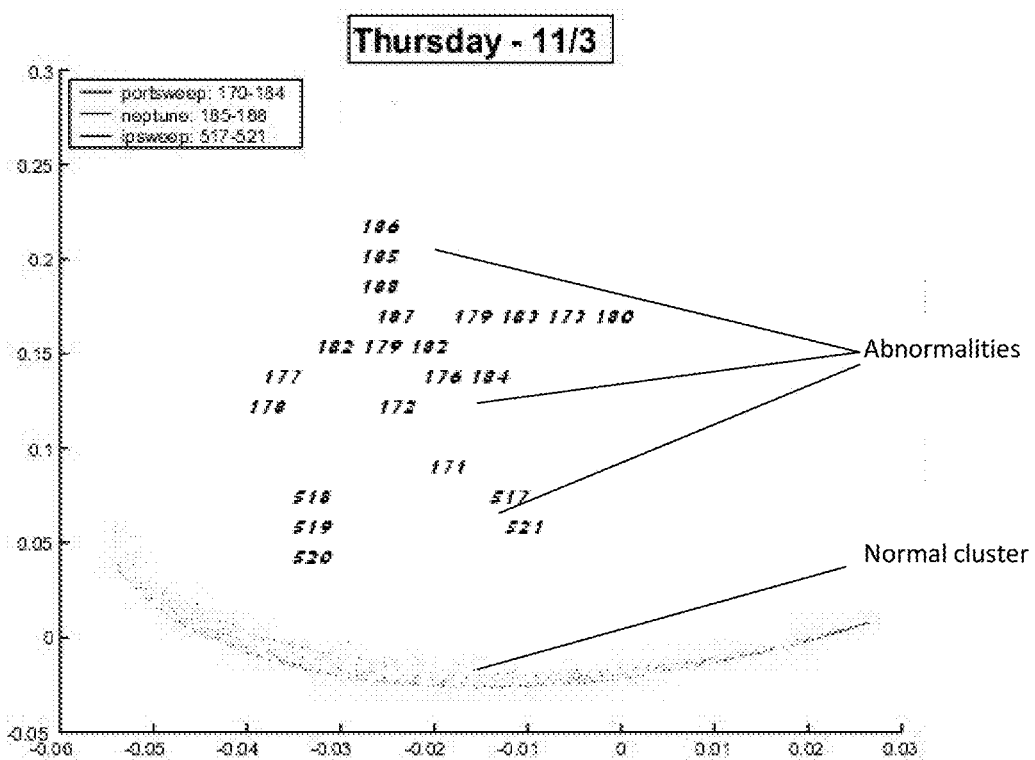
FIG. 27 shows results of the application of the training and detection steps of OLIDMD to one day (Thursday) from a week with attacks (abnormalities) of DARPA's data.

FIGS. 25, 26 and 27 display respectively results for a Tuesday, Wednesday and Thursday in the week with attacks. All the newly arrived points, which are classified as abnormal, lie outside the main manifold (cluster). The attacks on the rest of the days in this week were also detected correctly (not shown). In more detail, the attacks detected on Tuesday were a: portsweep attack, started at time 45, continued at time 46 to 71 and ended just before time 72, and an ipsweep attack, started just after time 305, continued at time 306 to 330 and ended at time 331. The attacks detected on Wednesday were a satan attack, started at time 243, continued at time 244 and ended at time 245 and an ipsweep attack started at time 738, continued at time 738 to 750 and ended just before time 751. The attacks detected on Thursday were a portsweep attack started at time 170, continued at time 171 to 183 and ended at time 184, a neptune attack started at time 185, continued at time 186 to 187 and ended at time 188, and an ipsweep attack started at time 517, continued at time 518 to 520 and ended just before time 521. In each of FIGS. 25-27, all the normal points lie on the main manifold.

Figure 28:
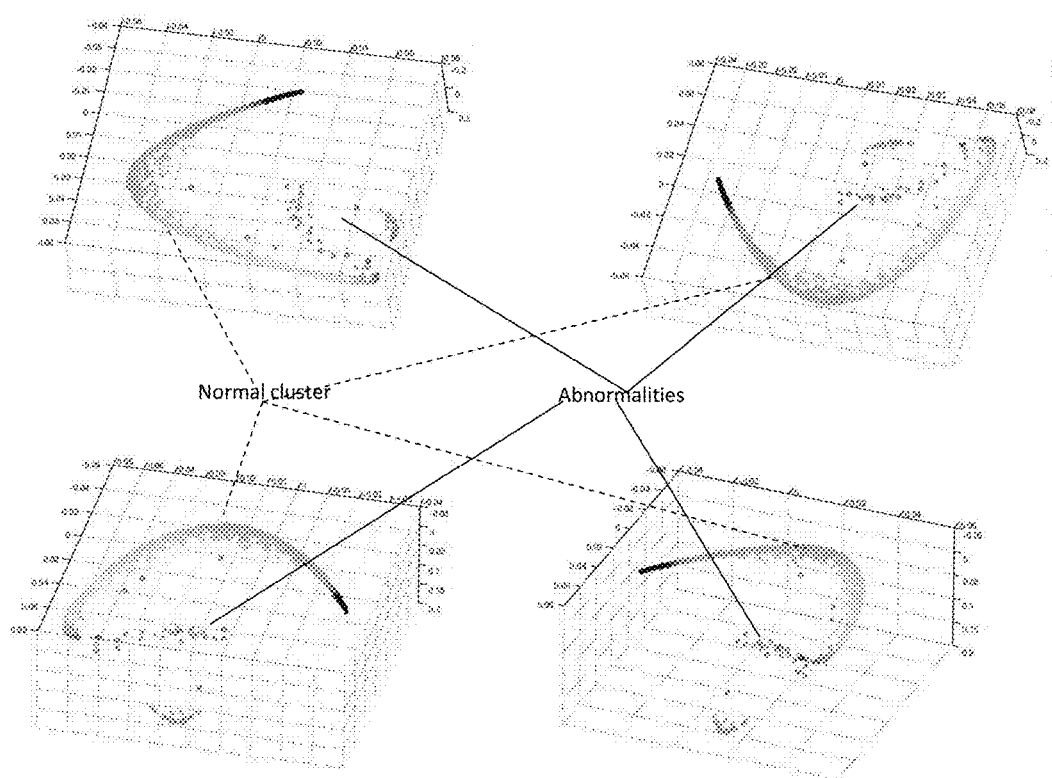
FIG. 28, displayed in different angles, is the same as FIG. 25 where each point has its own density.

FIG. 28 used the same input data, training and detection techniques as those used to generate FIG. 25. Here we add density (as in FIG. 22) to each data point in the cluster (normal manifold). Tuesday's results are displayed in different viewing angles to show better the same anomalies.

Experimental Results on Data that Contain Worms

Our online worm detection algorithm was tested on seven datasets described in IDED. We used the first dataset as training data for the training step. We used the other six, single and double datasets, as the test data for the detection step. For every data point in the test data and for every time slice, a newly arrived data point is handled online by the application of the detection step in OLIDMD.

Single Worm Data

Figure 29:
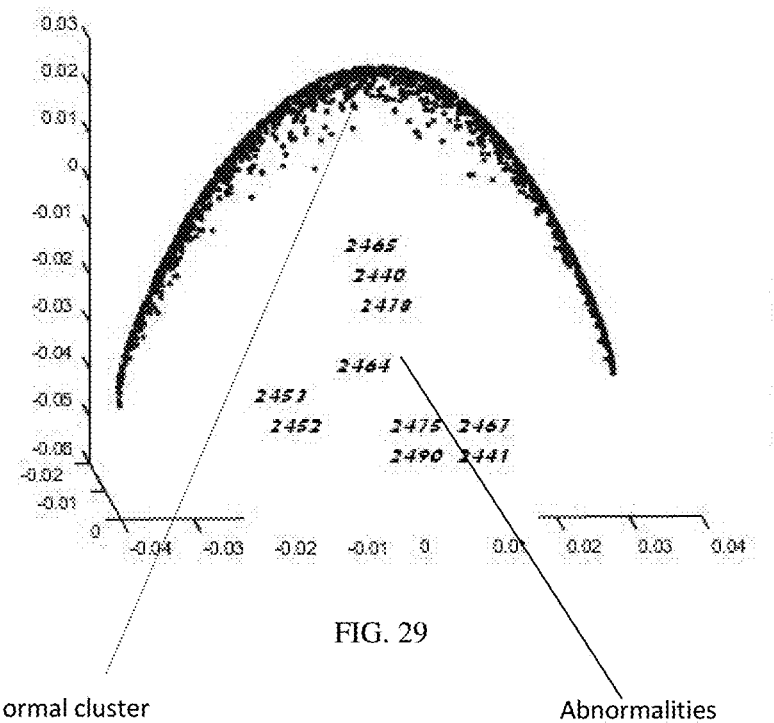
FIG. 29 displays detections of 5 attacks from simulated data that contains a single worm data.

FIG. 29 displays detections of 5 attacks from a single worm dataset. This dataset contains worms that use 5 different scans at different times:

a SYN-RST scan against targets that listen to the scanned port—starts at time 2440 and ends at time 2441;

a SYN-ACK-RST scan against targets that listen to the scanned port—starts at time 2452 and ends at time 2453;

a FIN scan against targets that listen to the scanned port—starts at time 2464 and ends at time 2467;

a SYN-RST scan against targets that do not listen to the scanned port—starts at time 2475 and ends at time 2477;

a FIN scan against targets that do not listen to the scanned port—starts at time 2489 and ends at time 2490;

The OLIDMD algorithm correctly detected all worms. All the normal points lie on the main manifold while the only significant outliers are the attacks of the worm.

Multiple Worm Data

Figure 30:
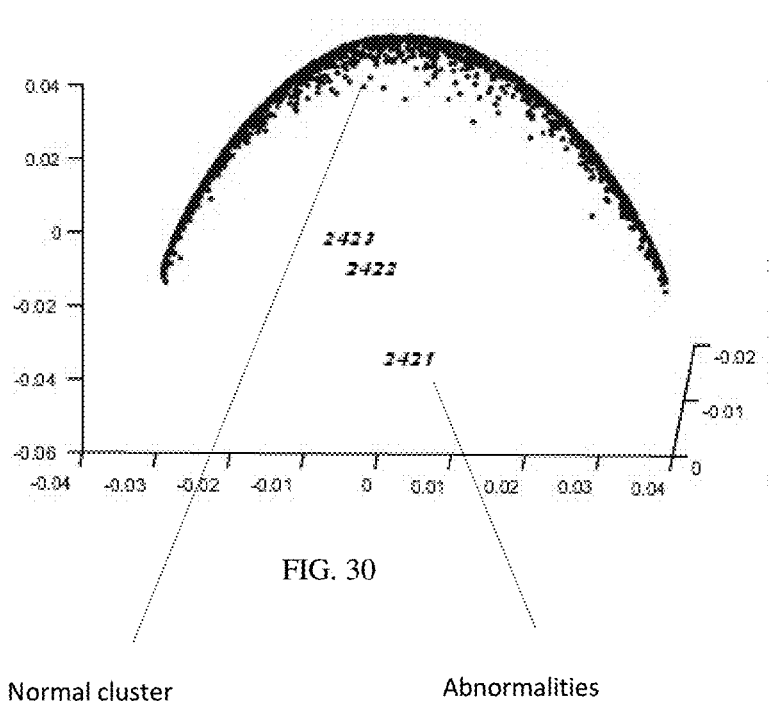
FIG. 30 displays the detection of SYN-RST attacks to the listened ports from simulated data that contains a multiple worm data using OLIDMD.
Figure 31:
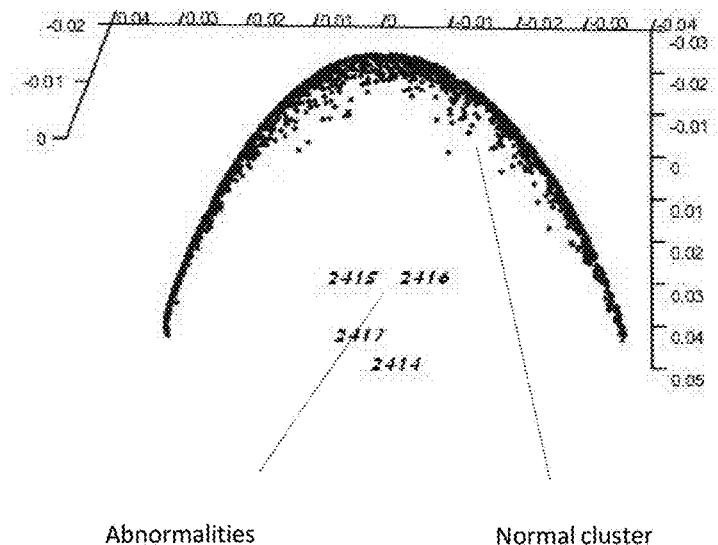
FIG. 31 displays the detection of FIN attacks to the listened ports from simulated data that contains a multiple worm data using OLIDMD.

FIG. 30 shows the results of OLIDMD processing of a data with attacks by worms that use the SYN-RST scan against targets which listen to the scanned ports. These attacks started at time 2421 and ended at time 2424. FIG. 31 shows the results of OLIDMD processing of a dataset with attacks by multiple worms that use the FIN scan against targets which listen to the scanned ports. These attacks started at time 2414 and ended at time 2417. In both FIGS. 30 and 31, all the normal points lie on the main manifold (normal cluster) while the only significant outliers are the attacks of the worms.

Performance of OLIDPL: Experimental Results

OLIDPL was tested on academic network data, ONIDS simulation network data and the governmental network data described in IDED. The inputs were the statistics of the payloads of these data, produced by COTA. Here we present some experimental results on the academic network data, SQL injection data (part of the ONIDS simulation network data) and the governmental network data after the application of OLIDPL.

Experimental Results from the Academic Network Data

The OLIDPL algorithm was tested on data captured from the academic networks during 48 hours starting on 12/28/06 at 00:00 AM and ending on 12/30/06 at 00:00 AM. The data from the first day (12/28/06) was used as the training set for the detection step. We chose 4,000 samples from this day as representative samples for the baseline of the normal behavior of the network activities. The data from second day (12/29/06) was used as the testing set for the detection step. We used 5 hours from this testing set in order to test our anomaly detector. Each hour contained injected HTTP attacks (described in IDED).

Figure 32:
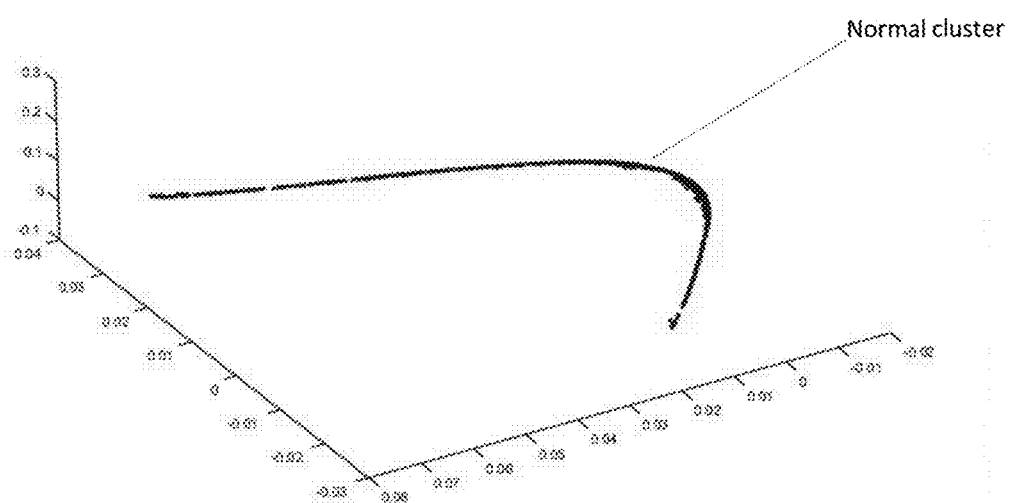
FIG. 32 displays a cluster of the training data to academic data captured on 28/12/06 that contains 4,000 baseline samples in the training procedure of OLIDPL.
Figure 33:
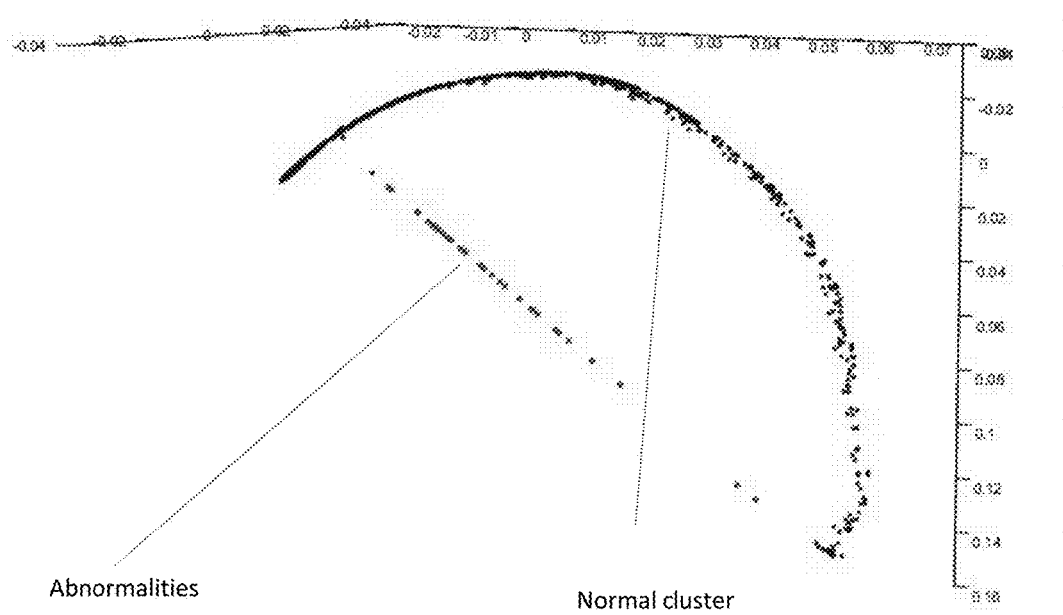
FIG. 33 displays a normal cluster and abnormalities by the application of OLIDMD to academic data captured on 29/12/06-07:00 AM-08:00 AM.

1. Experimental results from content analysis of HTTP URI request: This section presents the experimental results of the training step for HTTP URI content and of the detection step for HTTP URI content.
    a. Training step for HTTP URI content—Application of the pre-processing and the RLDM to the first day with the application of the detection step for abnormal points. FIG. 32 presents the HTTP URI baseline generated from training of the first day (12/28/06). It includes 4,000 samples, where each sample is a single representative from the coarse grained matrix (step 410 in FIG. 4). All the points lie on the same manifold (cluster) and there are no outliers in the training data.
    b. Detection step of HTTP URI content using GH: FIG. 33 presents the output from the detection step from all the samples captured on the second day (12/29/06) between 07:00 AM to 08:00 AM, i.e. 10,750 samples, where each sample represents a single HTTP URI. All the abnormalities were detected.

Experimental Results on SQL Injection Data

OLIDPL was tested on data obtained over two days from the SQL injection data. The data from the first day was used as a training set for the detection step. We chose 4,000 samples from this day as representative samples for the baseline of the normal behavior of the network activities. The data from the second day was used as test data for the detection step. We used two hours from this test in order to test our anomaly detector. The two hours contained two SQL injection attacks (described in IDED).

Figure 34:
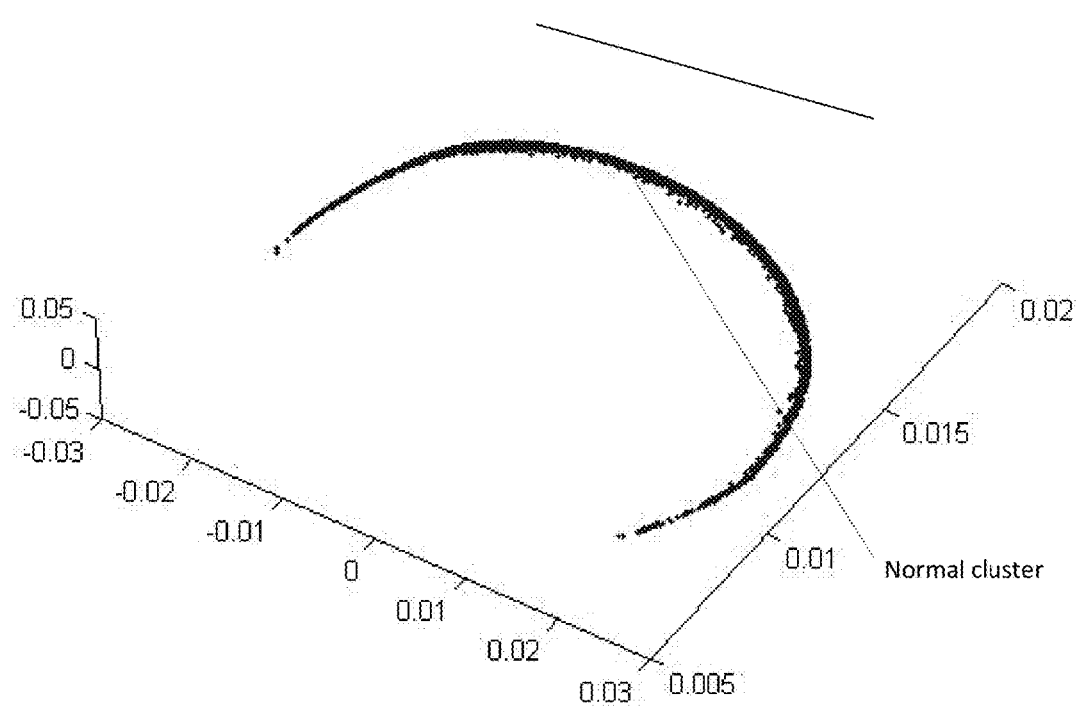
FIG. 34 displays a normal cluster of the embedded training data, generated by application of OLIDPL, to detect SQL injection in simulated data.
Figure 35:
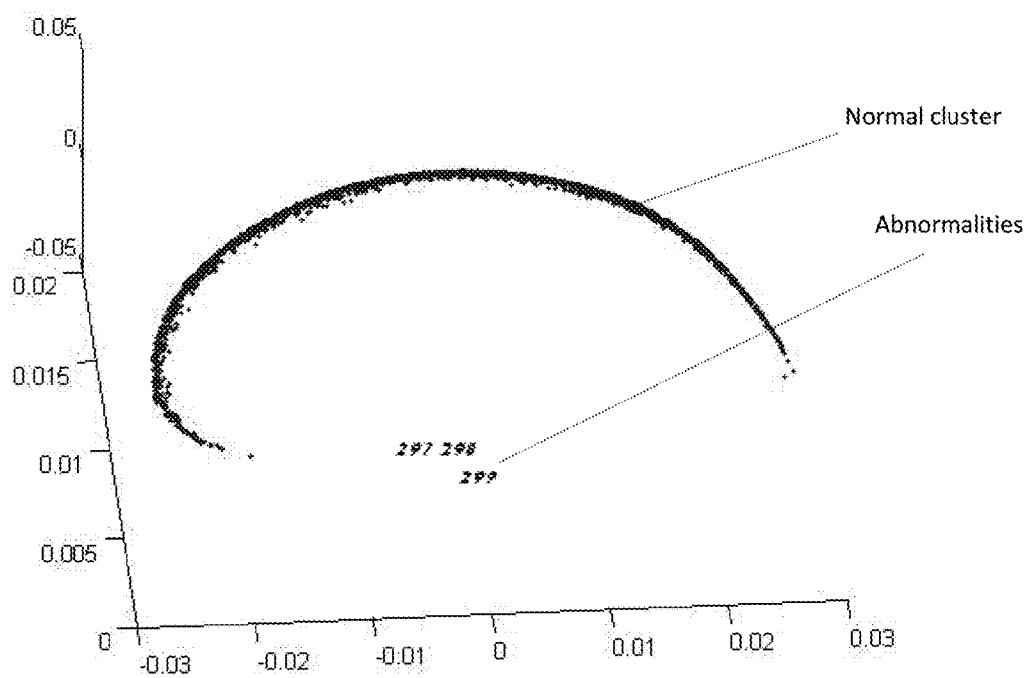
FIG. 35 displays the abnormalities that deviate from a normal cluster by the application of OLIDPL to detect SQL injection in simulated data to which SQL injections were inserted.

FIGS. 34 and 35 present the experimental results from the content analysis of the SQL queries. FIG. 34 presents 4000 baseline samples of the embedded training data to detect SQL injection. This embedded space was generated from the first day. Each sample in FIG. 34 is a single representative of the coarse grained matrix. As we can see, all the points lie on the same manifold and there are no outliers. FIG. 35 presents the output from the detection step from all the samples captured during the two hours of the second day. Each sample represents a single SQL query. All the SQL injection attacks were detected.

Experimental Results on the Governmental Network Data

The OLIDPL algorithm was tested on data obtained over two days from the governmental network data (described in IDED). These data were captured during 48 hours. The data from the first day was used as the training set for the detection step. The training set includes anomalies and attacks (polluted data). We chose 4,000 samples from this day as representative samples to be a baseline of the normal behavior of the network activities. The data from second day was used as test data for the detection step. About 770,000 HTTP requests took place during this time period. These requests include normal traffic, anomalous traffic and attacks. We used these HTTP requests to test our anomaly detector. The governmental security system uses Snort in order to detect and prevent attacks by malicious Internet users. Therefore, we used the same Snort version with the same set of rules in order to label the data and compare the performance of OLIDPL to Snort.
    1. Snort Results: Snort generated about 17,000 alerts with different levels of severity. There were many false alerts of legitimate traffic and we filtered about 99% of these false alerts. Therefore, the total number of true alerts detected by Snort was about 250. These attacks included several types, for example:
        a. Cross-site scripting attacks
            GET /heb"%20onmouseover="this.style.textdecoration%20='none';
            "%20onmouseout="this.style.textdecoration%20='underline';">
            ministry%20of%20foreign<br>affairs%20(hebrew)
            </a></td>
            </images/pixel_transparent.gif"></td></tr></images/pixel
            _transparent.gif"></td></tr></table><!--
            locate%20mission-->
            <script%20language="javascript">%20%20
            20%20try{var%20opopu
            p%20=%20
            window.createpopup( );opopup.document.creat-estylesheet( );}catch%20
            (e)
            %20 {%20//alert('top.asp%20error%20occurred
            (505):%20'%20+%20e.
            message
            %20+%20'.');%20}function%20richdropdown( )
            {%20%20%20%20opo
            pup. document
            .body.innerhtml%20=%20ocontexthtml.innerhtml;
            %20%20%20%20%2
            0opopup
            .document.stylesheets(0)
            .csstext%20=%20document.stylesheet
        b. IIS 5.0 cross site scripting vulnerability
            POST /_vti_bin/shtml.exe/_vti_rpc HTTP/1.1
        c. Directory traversal attacks
            GET/../../Web/main/document.asp?Documen-tID=119140& MissionID=
            5&tem=:HTTP/1.1
        d. Access to a potentially vulnerable web application
            GET/peace/empower.html HTTP/1.0
        e. WEB-PHP remote include path
            /index.php?_REQUEST=&_REQUEST%
            5boption%5d=com_content
            &_REQUEST%5b
            Itemid%5d=1&GLOBALS=&mosConfig_
            absolute_path=http://disqad.
            za.p1/
            evil/mascansearch/shell.txt? HTTP/1.1
        f. Robots
            GET/robots.txt HTTP/1.1
    2. OLIDPL Results
        a. OLIDPL detected all the real attacks detected by Snort including the cross-site scripting attacks, directory traversal attacks, access to a potentially vulnerable web application and WEB-PHP remote include path that were described in the Snort results.
        b. OLIDPL detected more than 680 anomalies that were mis-detected by Snort.

Examples of HTTP anomalies that were detected by OLIDPL but were undetected by Snort:

1. Attempt to get into Google accounts
    GET
    /accounts/SetSID?ssdc=1&sidt=tgy%2BJhQBAAA%
    3D.ClOZSHtr00bXUIC7
    IRphg8iKp65zbplJEToPGcKw9z%2BB121uw
    D394HLf14V16%2FH6tQT8D
    uOGmNpJfX8ve6YVCzA7kA0LHLHx7q
    29SB5Xk%2Fv3OPcHuSE4imDP %2F4EtAKE2IoSeArbD9iuRA4TmGgfdKpv
R70QnPLohe%2BKdV7KdrocU
2ffi58vs0VXhGY1BuLyYX%2B4%2FCjKDhvp
B0FdxnJSaL5C3ukeRjW%2
FsJm%2Fup%2FmUEbzt8dsS25iTnecPj CsmeLHM-
CDrQMqwqeHBRLromu2
4V8w%3D%3D.EKCfEaT8H85n3OBcYQxgc
A%3D%3D&continue=http%3
A%2F%2Fmail.google.com%2Fmail%2F%
3Fauth%3DDQAAAHUAAAAlT
RldzU3HIKgJoWTZs4EjF4wloF3_f8Prfsbkqp
SAMZyPSgQj-z0-
RN2V3wkUHdzdLvykW33ncfY6Ygmvcu
P2r2bE6YHrVEQxl0M2DUOt0oX
9y0qTYFrjh7IuLkSiZnB3kzhvJ9TRj-
gj1M7zDVEiLCBK4TnsITmUPpWaDF2KIQ HTTP/
1.1
GET
/accounts/Logout2?ilo=1&ils=s.NG&ilc=0&continue=
https%3A%2F%2Fww
w.google.com%2Faccounts%2FServiceLogin%
3Fservice%3Dmail%26passiv
e%3Dtrue%26rm%3Dfalse%26continue%3
Dhttp%253A%252F%252Fmail.g
oogle.com%252Fmail%253Fui%253Dhtml%
2526zy%253D1%261tmp1%3Dde
fault%261tmp1cache%3D2%26h1%3Den&zx=-
947374576HTTP/1.1
2. Suspicious webmail request
GET /webmail.prodigy.net.mx/cgi-bin/webmail/
Mariopergoliniteacordas.mp3?ID=I2rASbNe
ARRTjIgsdpYSwhYUVDcEt7
UcZxsiw79OInxUIj12sv&Act_View=1&R_
Folder=aW5ib3g=&msgID=4740
&
Body=2&filename=Mariopergoliniteacordas.mp3
HTTP/1.1
3. Crawlers
GET/crawlers/img/
stat_m.php?p=0&rn=0.7413160734538396&c=
1&wh=800
x600&px=24&j=Y&s1=1.3&r=http%3A//www.soto-
vik.ru/catalog/reviews/No
kia_N76-
prev.html&fr=0&pg=http%3A//www.sotovik.ru/price_
new/%3Faction%3Din
dex%26firm%3D237%26model%3D2669%
26city%3D1%26white %3D1%26t
ariff%3D21%26priceHigh%3D9999 HTTP/1.1
Examples of HTTP attacks that were detected by OLIDPL
but were undetected by Snort:
1. Nimda IIS worm attack
GET
/MSOffice/
cltreq.asp?UL=1&ACT=4&BUILD=6551&
STRMVER=4&CAPR
EQ=0HTTP/1.1
2. VocalTec VGW4/8 telephony gateway remote authentication bypass vulnerability
GET /home.asp" HTTP/1.1
3. Spam attacks
GET /?ref=turkeylist.net HTTP/1.1
4. Remote commands execution exploit attack
GET/index?/cgi-perl/polling/poll.p1 HTTP/1.1
5. Attempt to gain administrator privileges
GET
/_vti_bin/owssvr.dll?UL=1&ACT=4&BUILD=6551&
STRMVER=4&CAPR
EQ=0
HTTP/1.1
6. Directory traversal attack
GET /.../ HTTP/1.1
7. Backslash attack
GET /\\ HTTP/1.1

Comparison Between OFID, OLIDMD and OLIDPL as Intrusion Detection Algorithms and Commercial Security Tools Worms and SQL Injection Attacks—Comparison to Cisco IDS-4215

We tested the capabilities and the performance of Cisco IDS-4215 on two datasets:
1. Worm attack data from IDED to test the anomaly detection capabilities of Cisco IDS-4215.
2. SQL injection attack data from IDED to detect the signature capabilities of Cisco IDS-4215.

The anomaly detection engine of Cisco IDS-4215 was tested using seven worm datasets described in IDED and tested with OLIDMD. Cisco IDS-4215 was tested online while simulating different network scenarios. First, we used the normal dataset as the training data for the training step by setting the anomaly detection sensor of Cisco IDS-4215 to learning mode. Then, after the training period was completed, we began the testing step by setting the anomaly detection sensor of Cisco IDS-4215 to detection mode. We used the single and multiple worm data (six datasets) as the test data for the detection step. For every simulation datasets, we recorded the logs generated by the Cisco IDS-4215 device. At the end of each simulation, we analyzed the anomaly detection engine logs. To summarize the results:
1. Training step (learning mode) using the normal datasets.
   a. Normal data—while the anomaly detection engine was in learning mode, the other signature based engines (Snort, CISCO, Imperva, Apache ModSecurity) produced hundreds of false alerts (for example, TCP SYN Flood). For the rest of the test, we ignored these engines due to the following main reasons:
      i. These engines do not have any learning capabilities therefore, they will continue to produce hundreds of false alerts during the testing step;
      ii. The goal of the test is to compare the capabilities and the performance of the anomaly detection engine of Cisco IDS-4215 with OLIDPL and not to test the other static IDS engines that are signatures based.
2. Testing step (detection mode) using the single worm and the multiple worm data. The "detection" results refer to the detection of anomalous activities by the anomaly detection engine of Cisco IDS-4215.

Table 6 summarizes the testing results of the anomaly detectors of Cisco IDS-4215 and OLIDMD.

TABLE 6

| Traffic type | Attack method | Attacked port | CISCO IDS-4215 | OLIDMD |
|---|---|---|---|---|
| Single worm | SYN-RST scan | Open | Zero detection | Full detection |
| Single worm | SYN-ACK-RST scan | Open | Zero detection | Full detection |
| Single worm | FIN scan | Open | Zero detection | Full detection |
| Single worm | SYN-RST scan | Closed | Zero detection | Full detection |
| Single worm | FIN scan | Closed | Zero detection | Full detection |
| Multiple worms | SYN-RST scan | Open | Zero detection | Full detection |

TABLE 6-continued

| Traffic type | Attack method | Attacked port | CISCO IDS-4215 | OLIDMD |
|---|---|---|---|---|
| Multiple worms | SYN-ACK-RST scan | Open | Zero detection | Full detection |
| Multiple worms | FIN scan | Open | Zero detection | Full detection |
| Multiple worms | SYN-RST scan | Closed | Full detection | Full detection |
| Multiple worms | FIN scan | Closed | Zero detection | Full detection |
| Detection rate | | | 10% | 100% |

Evaluating the Signature Capabilities of Cisco IDS-4215 Using SQL Injection Attack Data The signature detection engine of Cisco IDS-4215 was tested using the two categories of SQL injection data described in IDED and tested with OLIDMD. Cisco IDS-4215 was tested online while simulating the different SQL injection attacks. We used 5 well known SQL injection attacks and 5 unknown SQL injection attacks for the testing. To summarize the results:

1. Known attacks: this data contains 5 different known SQL injection attacks—detection of one attack out of the five attacks by the signature engine of Cisco IDS-4215;
2. Unknown attacks: this data contains 5 different unknown SQL injection attacks—zero detection of the attacks by the signature engine of Cisco IDS-4215.

Table 7 summarizes the test results of the SQL injection attacks of Cisco IDS-4215 and OLIDMD.

TABLE 7

| Attack type | Number of attacks | CISCO IDS-4215 Success rate | OLIDMD |
|---|---|---|---|
| SQL injection - known attacks | 5 | 20% | 100% |
| SQL injection - unknown attacks | 5 | 0% | 100% |

Evaluating the Functionalities of Cisco IDS-4215

Table 8 summarizes the research of the functionalities and the capabilities of Cisco IDS-4215 (see CISCO4215) in comparison with OLIDMD:

TABLE 8

| Detection method | CISCO IDS-4215 Signature based | OLIDMD Anomaly based |
|---|---|---|
| Anomaly detection | Linear and one-dimensional threshold based | Non-linear and high dimensional |
| Anomaly detection layers | Layers 3, 4 | Layers 2-7 |
| Anomaly detection attack types | Subgroups of worm attacks | Worms, Trojans, viruses, P2P, injections, leakages, etc. |
| 0-day attacks detection | Detection of specific propagation of certain worms only after the first infctions | Detection of the first instance of the attack before any infection of the network |
| Worm propagation detection method | Layers 3, 4 | Layers 2-7 including propagation via e-mails, p2p, etc |
| Anomaly detection parameters configuration | 36 thresholds parameters that have to be carefully configured and fine tuned by the user/system | Automatic configuration and automatic (un-supervised) learning. No thresholds and no parameter tuning. |
| Anomaly detection flexibility | 36 parameters that define a specific detection methodology. Adding parameters requires change in the anomaly mechanism and rules | Adding more parameters is almost transparent due to the generic technology core |
| Anomaly detection in other areas and fields | Limited to he specific detection of the certain subgroup of worms | Used in other anomaly detection fields: performance, finance, fraud, etc |
| Visualization | Simple 2-dimensional graph that only presents the number of alerts | Rich and colored 3-dimensional graph that presents the location of each sample in the manifold and rates the severity of the alert. |

SQL Injection Attacks: Comparison to Snort, Apache Mod-Security and Imperva SecureSphere 5.0

Snort (see SNORTM) and Apache ModSecurity (see MOD-SEC) are signature-based intrusion detection systems. Imperva SecureSphere 5.0 (see IMPERVA) is a signature-based and anomaly-based intrusion detection system. We tested the performance of Snort, Apache ModSecurity and Imperva SecureSphere 5.0 using the SQL injection attack data in IDED. We trained Imperva SecureSphere 5.0 using a training dataset. We used the two categories of SQL injection data in IDED and tested with OLIDMD. Snort, Apache ModSecurity and Imperva SecureSphere 5.0 were tested online while simulating the different SQL injection attacks. We used 5 well known SQL injection attacks and 5 unknown SQL injection attacks for the testing. To summarize the results:

1. Known attacks: this data contains 5 different known SQL injection attacks—detection of 4 attacks by Apache Mod-Security and Imperva SecureSphere 5.0 and one attack by Snort;
2. Unknown attacks: this data contains 5 different unknown SQL injection attacks—zero detection of the attacks by Snort, Apache ModSecurity and Imperva SecureSphere 5.0.

Table 9 summarizes the testing results of the SQL injection attacks of Snort, Apache ModSecurity, Imperva Secure-Sphere 5.0 and OLIDMD.

TABLE 9

| Attack type | Number of attacks | Snort detection rate | Apache ModSecurity detection rate | Imperva Secure-Sphere 5.0 detection rate | OLIDMD detection rate |
|---|---|---|---|---|---|
| SQL injection - known attacks | 5 | 20% | 80% | 80% | 100% |
| SQL injection - unknown attacks | 5 | 0% | 0% | 0% | 100% |

HTTP Attacks: Comparison to Snort

The governmental security system (IDED) uses Snort in order to detect and prevent attacks by malicious Internet users. We used the same Snort version with the same set of rules as used by the governmental security system in order to label the data and compare between the performance of OLIDPL and Snort. We used the governmental network HTTP data (from IDED) for comparing between both systems. Table 10 summarizes the testing results of Snort and OLIDPL. For each tested system we present the following parameters:

1. Number of tested URIs: The total number of URIs that were tested for attacks/anomaly detection;
2. Number of false alerts: The number of normal and legitimate HTTP URIs that were mistakenly identified by the detecting system as attacks/anomalies (false positive);
3. Rating false alerts: The rate of false alerts out of the total number of tested URIs;
4. Number of known attacks: The number of HTTP URIs that were identified by the detection system as attacks and are known as attacks. Since Snort is a signature-based system, we categorized each true alert that was identified by Snort as a known attack. In other words, in case Snort finds a match to a signature for a true attack, then, this attack must be a known attack. For example, GET /robots.txt HTTP/1.1;
5. Number of unique known attacks: The number of unique known attacks from the total number of known attacks;
6. Number of unknown attacks: The number of HTTP URIs that were identified by the detection system as attacks but are unknown to Snort as attacks. However, these attacks were confirmed as true attacks. Since Snort is a signature-based system, we categorized each such true alert that was not identified by Snort as an unknown attack. In other words, in case Snort has no matched signature for a true attack, this attack must be an unknown attack (for Snort). Each such unknown attack was confirmed as a true attack according to several security web-sites and forums. For example,
GET
/MSOffice/
cltreq.asp?UL=1&ACT=4&BUILD=6551& STRM-VER=4
&CAPREQ=0 HTTP/1.1;
7. Number of unique unknown attacks: The number of unique unknown attacks from the total number of unknown attacks;
8. Number of anomalies: The number of HTTP URIs that were identified by the detection system as anomalies but were not confirmed as known attacks (according to security web-sites and forums). For example,
GET
/accounts/Logout2?ilo=1&ils=s.NG&ilc=0&continue= https%3A%2F%2Fww
w.google.com%2Faccounts%2FServiceLogin% 3Fservice%3Dmail%26passiv
e%3Dtrue%26rm%3Dfalse%26continue% 3Dhttp%253A%252F%252Fmail.g
oogle.com%252Fmail%253Fui%253Dhtml% 2526zy%253D1%261tmp1%3Dde
fault%261tmp1cache%3D2%26h1%3Den&zx=-947374576HTTP/1.1

TABLE 10

|  | Snort | OLIDPL |
| --- | --- | --- |
| Number of tested URIs | 773,841 | 773,841 |
| Number of false alerts | ≈17,000 | ≈390 |
| Rate of false alerts | ≈2.2% | ≈0.05% |

TABLE 10-continued

|  | Snort | OLIDPL |
| --- | --- | --- |
| Number of detections of known attacks | 250 | 150 |
| Number of unique known attacks | 25 | 17 |
| Number of detections of unknown attacks | 0 | 80 |
| Number of unique unknown attacks | 0 | 15 |
| Number of detections of anomalies | 0 | ≈600 |

OLIDPL detected most of the attacks detected by Snort. However, OLIDPL generated much less false alerts than Snort (≈98%). Furthermore, OLIDPL detected several serious attacks that were mis-detected by Snort since its database does not contain their signatures.

Detection of Anomalies in Spectral Images

Figure 36:
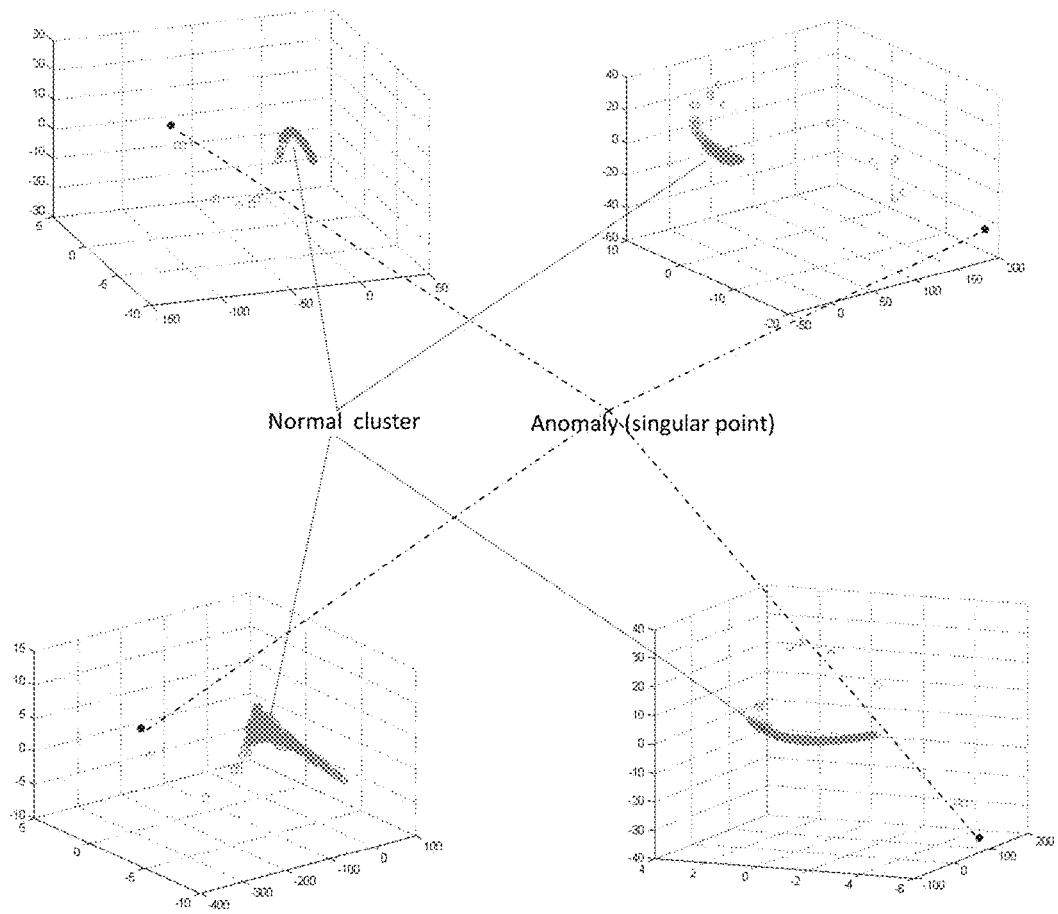
FIG. 36 displays a normal cluster and abnormalities after the application of OFID to an hyper-spectral image.
Figure 37:
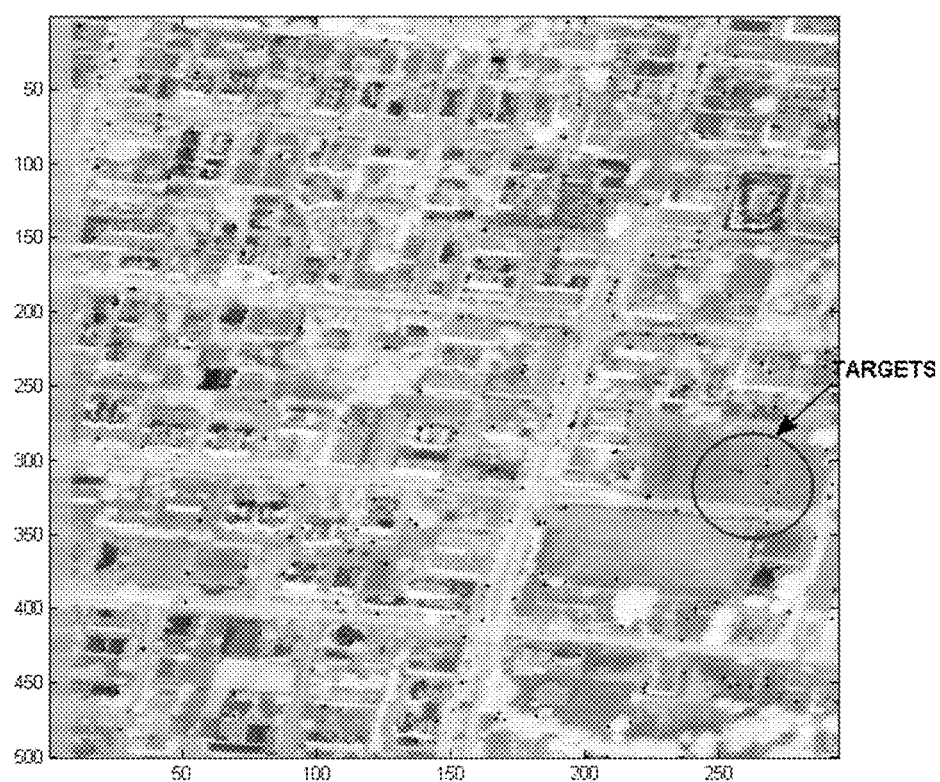
FIG. 37 shows one wavelength out of 180 wavelengths of a 1200×800×180 hyper-spectral image cube, with abnormalities marked.

OFID was applied to detect abnormalities in a multi-dimensional hyper-spectral (source) image of size 1200× 800×180 (also called image cube), where 180 is the number of wavelengths processed to detect abnormalities located in a pixel or sub-pixel in the image cube. In this example, a data point is a vector including all the values of all the wavelengths of a pixel, and may also be called a "multipixel" or a "spectral signature". An abnormality is classified as a pixel whose spectral signature is different from its surrounding pixels. The input data does not have to be scaled since the inputs are pixels with the same numeric range. The data is normalized. A traffic analyzer parsed the data and computed its statistics. The distances among the pixels are computed between normalized vectors of multipixels. To find these abnormalities, OFID is applied to reduce the number of wavelengths in the image cube to get an embedded space. FIG. 36 displays a normal cluster and abnormalities after the application of OFID to the hyper-spectral image. FIG. 37 shows the image at one wavelength, with abnormalities marked. More information on application of OFID to detection of abnormalities in hyper-spectral images maybe found in A. Averbuch, A. Schclar, Diffusion bases for dimensionality reduction, submitted, Report 2007.

Figure 38:
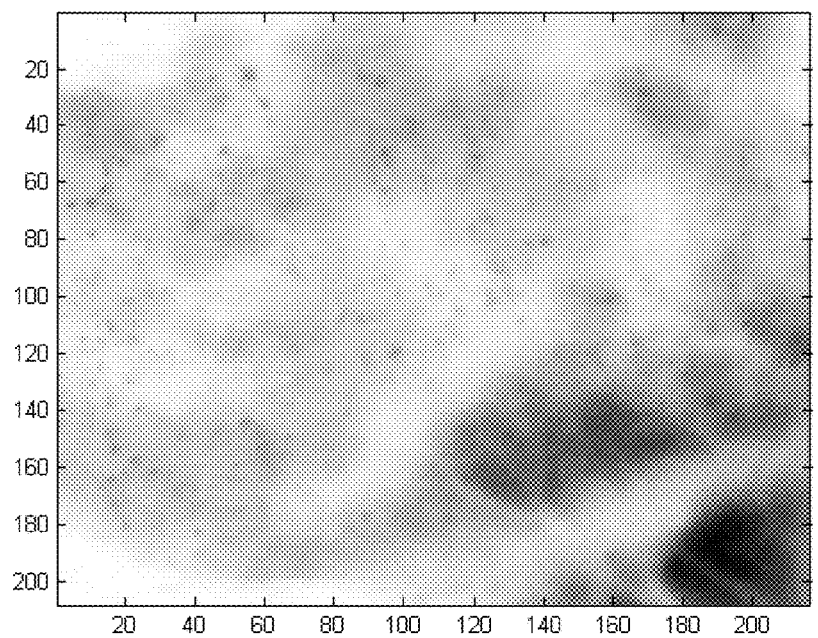
FIG. 38 (top) is a multi-spectral image in one wavelength out of 4 wavelengths taken in the lab. The abnormalities are marked on FIG. 38 (bottom)
Figure 38:
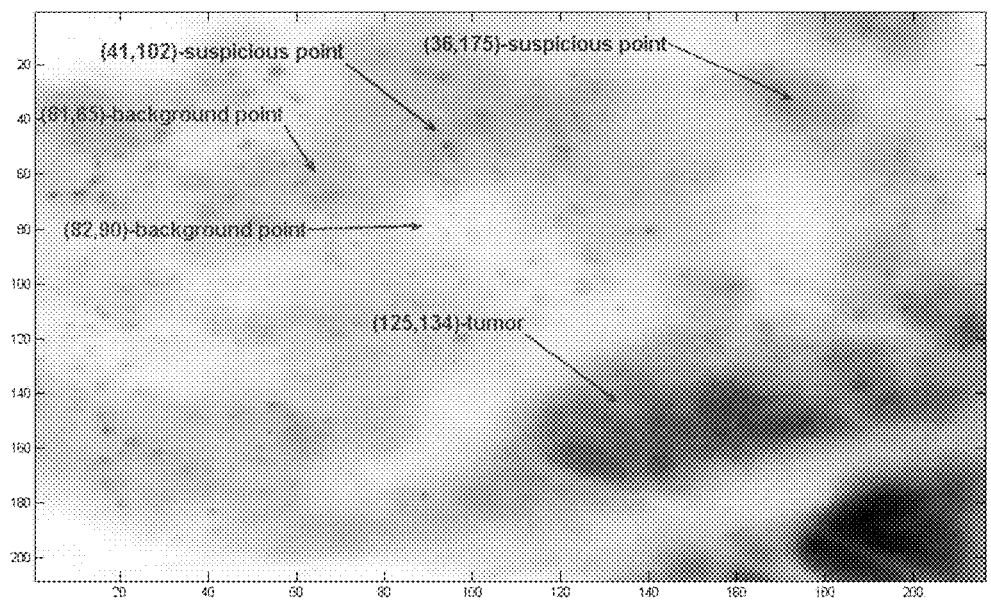
Figure 39:
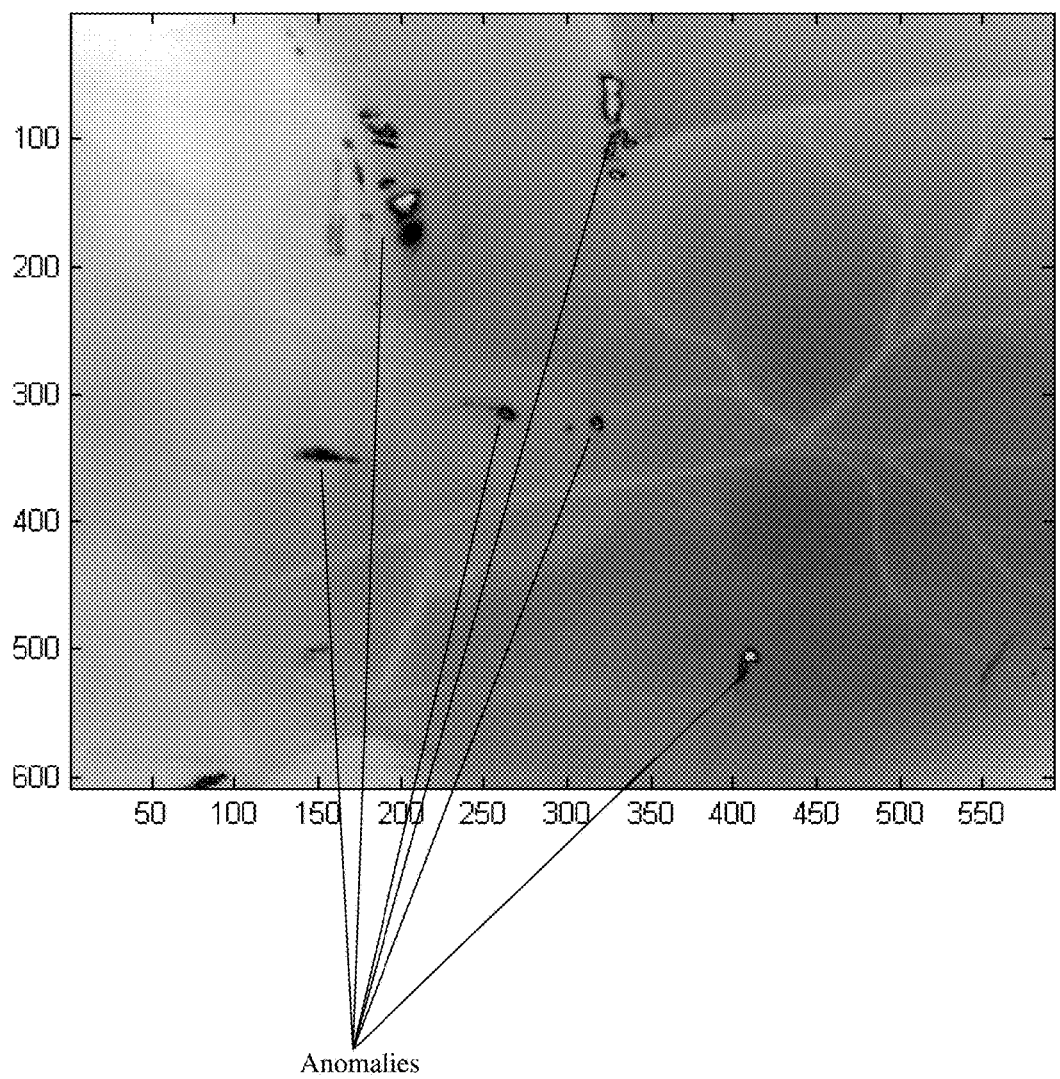
FIG. 39 displays abnormalities in a multi-spectral image of a mouse obtained by the application of OFID and marked by black points.

The same procedure was applied to medical imaging. Hyper-spectral imaging was performed on a mouse with suspected tumors using the CRi Maestro imaging system (Cambridge Research Instruments, Cambridge, Mass., USA). FIG. 38 (top) is a multi-spectral image at one wavelength out of 4 wavelengths, obtained experimentally in the laboratory. Abnormalities detected by OFID are marked on FIG. 38 (bottom) and on FIG. 39, which shows another multi-spectral image at one wavelength out of 4 wavelengths, obtained with the same imaging system.

Detection of Anomalies (Defects) in Semiconductor Wafers (Semiconductor Process Monitoring)

Figure 40:
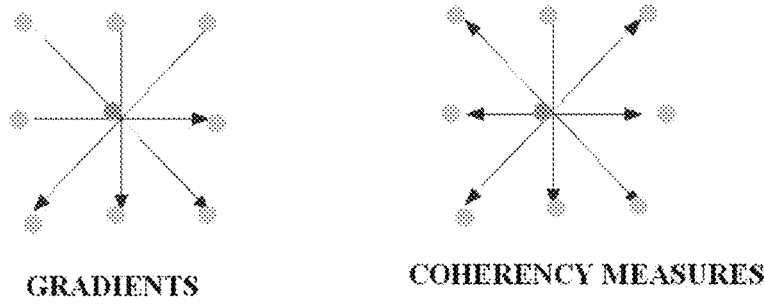
FIG. 40 illustrates the way to compute features of a pixel using a coherency measure.
Figure 41:
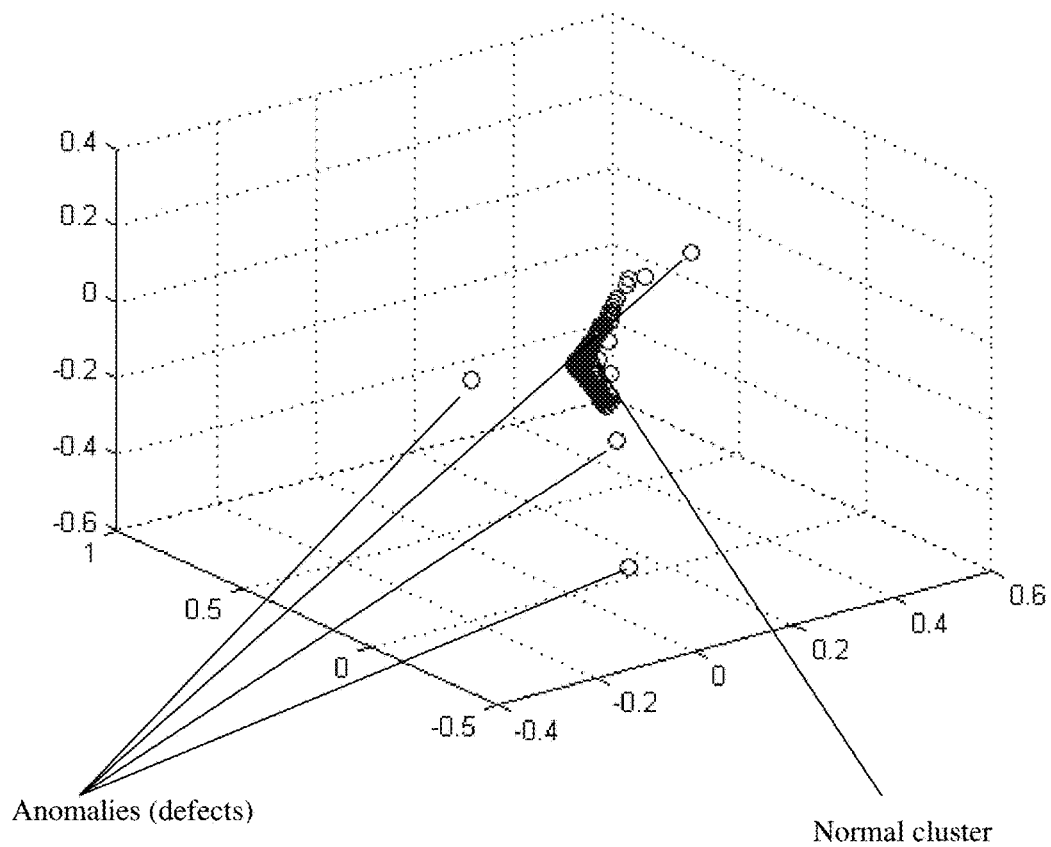
FIG. 41 is the output from the application of the OFID algorithm, where the anomalies (defects) are the isolated points far from the normal cluster.
Figure 42:
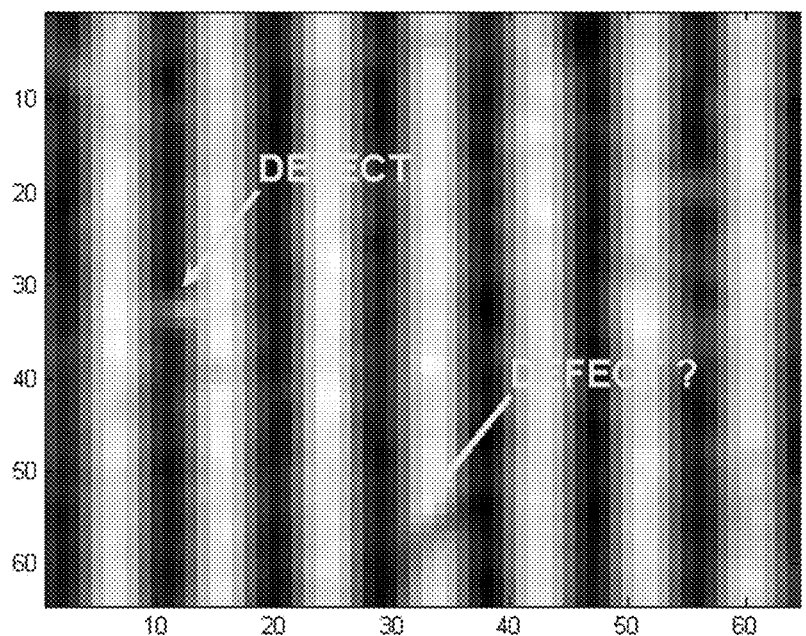
FIG. 42 (top and bottom) shows marked defects in wafers found in the output of FIG. 41.
Figure 42:
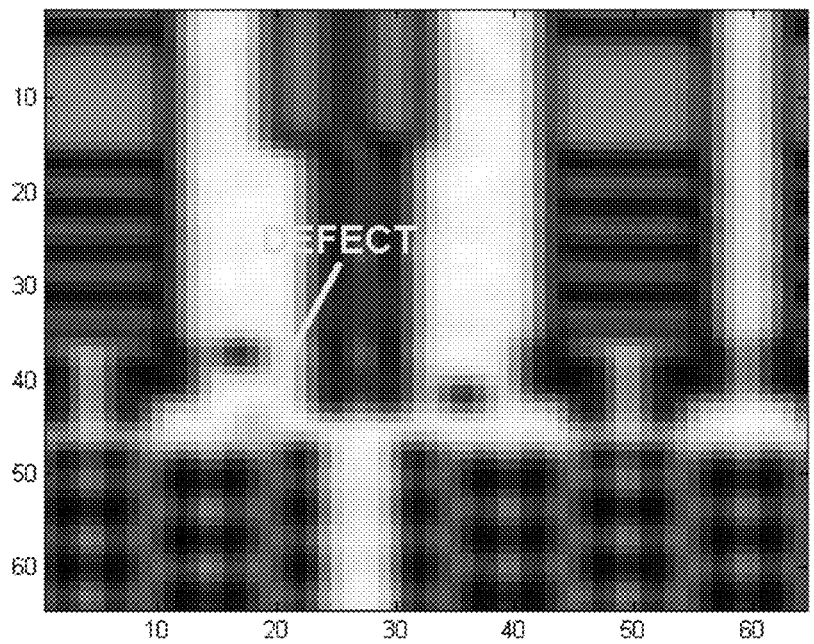

OFID was applied to detect defects in semiconductor wafers. One way to find features that are based on the relation of a pixel with its neighborhood is described in FIG. 40. In this application, a data point is composed of the coherency measures and gradients along four beams starting from a pixel. Wafer images were obtained optically or by SEM either in gray scale or in multi-spectral formats. The feature selection and extraction was done via dimensionality reduction and projection into a lower dimension (3D) space. The OFID was applied once these features were computed. FIG. 41 is the output from the application of the OFID algorithm, where the potential anomalies (defects) are 4 isolated points far from the normal cluster. Two points (defects) are marked on FIG. 42 (top). One is a definite defect while the other is only a suspected defect (which means that the pointed out feature is not surely a defect but it surely represents an anomaly). FIG. 42 (bottom) is another image of a semiconductor wafer section in which a marked abnormality (defect) was correctly detected using OFID.

Performance Monitoring and Problem Avoidance

This example illustrates the detection of performance bottlenecks through identification of anomalies (as was explained above) in data that changes all the time via monitoring the performance of a computer. Assume there is a large computer system that serves for example a large commercial financial application. The system cannot afford to be down, but crashes because it is loaded with non-stop incoming transactions. A monitor is installed inside this system. This monitor collects each time unit many parameters like CPU utilization, queues of transactions, virtual memory usage, disk usage, communication queues, etc. A vector of these parameters represents a data point. After a long period of time, we get a large volume of data in which each entry is a row of collected numbers per time slice (time unit interval). Each row represents all the recorded numbers that time unit interval. This data has to be analyzed constantly to inform the operator if there is a buildup of a problem such as deadlocking, queues overload, or communication problems that may crash the system.

Figure 43:
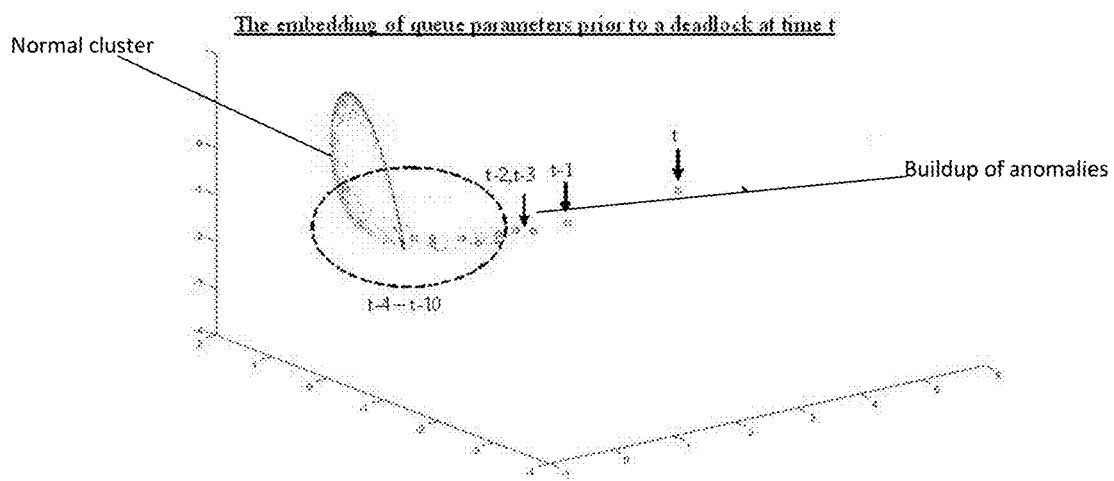
FIG. 43 shows how deviations from a normal behavior cluster increase as time proceeds.
Figure 44:
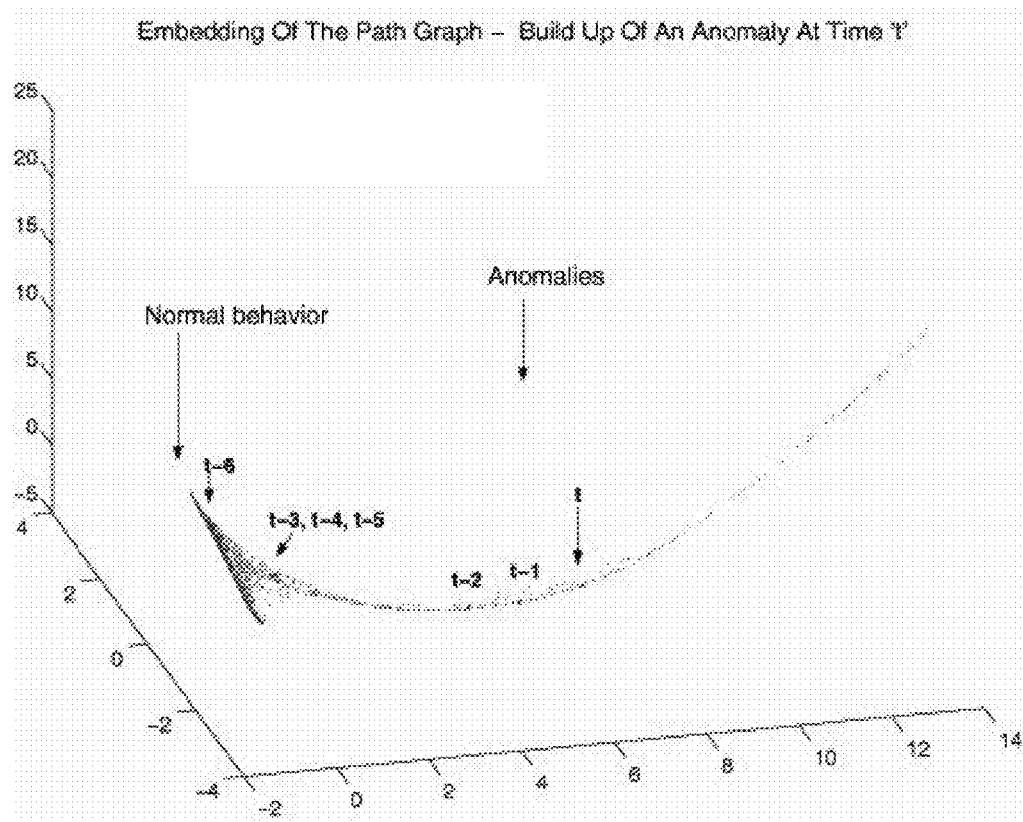
FIG. 44 shows similar activities as in FIG. 43, in a different time period.

The training procedure establishes the normal behavior cluster. In time of normal behavior, the embedded space from the application of OLIDMD algorithm on the designated training data has a well established profile ("normal cluster") as shown in FIGS. 43 and 44. The activities in these figures occurred in different time periods. We can see that the well established training data profile is violated when, for example, a deadlock occurs. This is seen from the application of the detection procedure in the OLIDMD algorithm to a newly arrived data point. In FIG. 43, we see that anomalies (abnormalities), which deviate from the normal cluster started at time t−10, continue to be far away from the normal cluster as time passes. A crash occurred at time t. In FIG. 44, we see again that the distances of the new anomalies distances of the anomalies from the normal cluster, which indicate the emergence of a problem, are increasing consistently. In both cases, the emergence of abnormalities can be tracked.

Human Health Monitoring

Current health monitoring practices provide physiological data on a patient, the data comprised of physiological parameters which can be acquired simultaneously (in a synchronized way in real-time. These parameters include (but are not limited to) pulse, temperature, heart rate, EKG data, EEG data, blood oxygenation, blood sugar and blood pressure. A data point here is a vector of a plurality of any combination of physiological parameters (preferably more than 3 parameters), acquired simultaneously) per time unit (e.g. per second). Therefore, in each time unit, one obtains multi-dimensional data. Training may be performed to obtain "normal" behavior, i.e. a "healthy" status. Application of the detection step to continuously monitored data can then be used to detect anomalies, which are indicative of a health problem.

Detection of Mastitis

The methods of the invention can be applied to detect abnormalities during cow milking. Training and detection can be performed per cow udder quarter or per udder (four quarters). The data may include such parameters as milk electrical conductivity, milk flow rate, total milk quantity, milk optical parameters such as transparency and reflectivity, spectral data, acoustical data, somatic cell count and the like. A data point here is a vector of a plurality of any combination of parameters (preferably more than 3 parameters), acquired simultaneously (in a synchronized way) per time unit (e.g. per second). Milk spectra may be obtained in real-time using a regular in-line spectrometer or the spectral imaging method described in "Snapshot spectral imaging systems and methods", Michael A. Golub, Menachem Nathan and Amir Averbuch, PCT Application PCT/IL2007/000926. Note that each spectroscopy or spectral imaging measurement can provide tens of parameters (since an intensity value at one wavelength can be a "parameter" in a data point) and can be synchronized with measurements of electrical conductivity, flow rate, milk amount and the like. Therefore, in each time unit, one obtains multi-dimensional data. Training may be performed to obtain "normal" behavior, i.e. the mastitis-free condition of milk for each cow. Application of the detection step to continuously monitored data can then be used to detect abnormalities, which are indicative of mastitis.

SUMMARY

OFID, OLIDMD and OLIDPL anomaly-based systems contradict the following assumptions:
1. Signature-based systems generate less false alerts than anomaly-based systems;
2. Signature-based systems detect many more known attacks than anomaly-based systems;
3. Automatic anomaly-based systems are not practical in real world since there is no efficient way to learn the traffic in a real environment that includes anomalies (the problem of polluted training set);
4. Un-supervised anomaly detection is not practical in the real world.

The methods and systems disclosed herein do not:
1. Rely on signatures of threats (yesterday's attacks);
2. Model/compare to RFCs of protocols—model parameters and compare to thresholds;
3. Define what is right (normal) and what is wrong (abnormal);
4. Include any bias by preferring some parameters over others;
5. Define different analysis methods for different protocols/applications.

The invention may be applied to any multi-dimensional data, offline and online. In particular, it can be applied to provide:
  a unified threat manager for network health (external and internal attacks to perform intrusion detection and prevention—such as adaptive intrusion prevention system (IPS), application fire wall, anti-spam, client protection, database protection, detection of Trojan horses, etc.);
  smart phone protection;
  base station protection;
  detection and prevention of SQL injection;
  risk management in financial transactions;
  fraud detection;
  performance monitoring;
  prediction and tracking of emerging problems and problem avoidance;
  guarantee QoS in networks;
  network behavior analysis (NBA);
  acoustics processing;
  electronic intelligence and cyber threat management;
  automatic generation of user/resource profiling to detect deviations from a profile;

data leakage prevention;
protocol/application classification and identification;
defect detection in wafers;
hyperspectral processing for medical, civilian and military applications,
process control;
mastitis detection.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein. For example, any digital computer system can be configured or otherwise programmed to implement the methods disclosed herein, and to the extent that a particular digital computer system is configured to implement the methods of this invention, it is within the scope and spirit of the present invention. Once a digital computer system is programmed to perform particular functions pursuant to computer-executable instructions from program software that implements the present invention, it in effect becomes a special purpose computer particular to the present invention. The techniques necessary to achieve this are well known to those skilled in the art and thus are not further described herein.

Computer executable instructions implementing the methods and techniques of the present invention can be distributed to users on a computer-readable medium and are often copied onto a hard disk or other storage medium. When such a program of instructions is to be executed, it is usually loaded into the random access memory of the computer, thereby configuring the computer to act in accordance with the techniques disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing the present invention.

Accordingly, drawings, tables, and description disclosed herein illustrate technologies related to the invention, show examples of the invention, and provide examples of using the invention and are not to be construed as limiting the present invention. Known methods, techniques, or systems may be discussed without giving details, so to avoid obscuring the principles of the invention. As it will be appreciated by one of ordinary skill in the art, the present invention can be implemented, modified, or otherwise altered without departing from the principles and spirit of the present invention. Therefore, the scope of the present invention should be determined by the following claims and their legal equivalents.

All patents, patent applications and publications mentioned in this specification are herein incorporated in their entirety by reference into the specification, to the same extent as if each individual patent, patent application or publication was specifically and individually indicated to be incorporated herein by reference. In addition, citation or identification of any reference in this application shall not be construed as an admission that such reference is available as prior art to the present invention.

What is claimed is:

1. A method, comprising:
   a) obtaining a data set of network traffic comprising N-dimensional data points from a traffic analyzer, wherein N>3 and wherein the traffic analyzer is configured to generate a statistics matrix comprising the N-dimensional data points;
   b) by a computer,
      i. processing the statistics matrix into a Markov kernel matrix,
      ii. processing the Markov kernel matrix to obtain processed data points with a dimension r lower than N, wherein the processing includes finding r discriminating eigenvectors by providing i=1, . . . , r eigenvalues and respective associated eigenvectors, generating for each i=2, . . . , r a respective $i^{th}$ cluster based on the $i^{th}$ eigenvector and generating other respective clusters based on eigenvectors 1, . . . , i−1, i+1, . . . , r, computing a distance between each respective $i^{th}$ cluster based on the $i^{th}$ eigenvector and each of the other respective clusters based on eigenvectors 1, . . . , i−1, i−1, . . . , r, and finding r eigenvalues and associated respective eigenvectors that provide the highest distance, the associated respective eigenvectors that provide the highest distance being the discriminating eigenvectors,
   wherein the r discriminating eigenvectors thus found form an embedded space in which processed data points with a reduced dimension r form a normal cluster,
      iii. detecting an abnormal data point in the processed data points with a dimension r lower than N without relying on a signature of a threat and without use of a threshold, and
      iv. blocking the abnormal data point.

2. The method of claim 1, further comprising receiving and processing a newly arrived N-dimensional data point into a newly-arrived data point with reduced dimension r, and wherein the detecting an abnormal data point in the processed data points with reduced dimension r includes determining that the newly-arrived data point with reduced dimension r resides outside the normal cluster.

3. The method of claim 2, wherein the determining that the newly-arrived data point with reduced dimension r resides outside the normal cluster includes applying an out-of-sample extension (OOSE) procedure to the newly arrived N-dimensional data point with reduced dimension r to compute its coordinates in the embedded space and determining whether the newly arrived N-dimensional data point resides outside the normal cluster based on its computed coordinates.

4. The method of claim 3, wherein the determining is based on a histogram of density values of embedded data points computed from the embedding matrix, wherein the histogram of density values is divided into bins of a given size and wherein the abnormal data point is included in a bin with the smallest size.

5. The method of claim 1, wherein the detecting an abnormal data point in the processed data points with a dimension r further includes detecting the abnormal data point without tuning a method parameter.

6. The method of claim 1, further comprising generating an alert on the abnormal data point.

7. The method of claim 6, further comprising visualizing the abnormal data point.

8. The method of claim 7, wherein the visualizing is two-dimensional or three-dimensional.

9. The method of claim 1, further comprising generating an alert on the abnormal data point.

10. The method of claim 9, further comprising visualizing the abnormal data point.

11. The method of claim 10, wherein the visualizing is two-dimensional or three-dimensional.

12. The method of claim 2, further comprising generating an alert on the abnormal data point.

13. The method of claim 12, further comprising visualizing the abnormal data point.

14. The method of claim 13, wherein the visualizing is two-dimensional or three-dimensional.

15. The method of claim 1, wherein the traffic analyzer includes a communications network traffic analyzer.

16. The method of claim 1, wherein the traffic analyzer includes a financial network traffic analyzer.

17. A system, comprising:
a) a traffic analyzer for providing a data set of network traffic comprising N-dimensional data points, wherein N>3 and wherein the traffic analyzer is configured to generate a statistics matrix comprising the N-dimensional data points; and
b) a computer program stored on a non-transitory computer readable medium, the computer program dedicated to:
  i. process the statistics matrix into a Markov kernel matrix,
  ii. process the Markov kernel matrix to obtain processed data points with a reduced dimension r lower than N by forming an embedded space defined by r discriminating eigenvectors, wherein r≤N and wherein the discriminating eigenvectors are selected by providing i=1, . . . , r eigenvalues and respective associated eigenvectors, and, for each i=2, . . . , r, by generating a respective $i^{th}$ cluster based on the $i^{th}$ eigenvector and other clusters based on eigenvectors 1, . . . , i−1, i+1, . . . , M, by computing a distance between each $i^{th}$ cluster and each of the other clusters, and by finding the r eigenvalues and their respective eigenvectors that provide the highest distance to define a normal cluster of processed data points with reduced dimension M,
  iii detect an abnormal data point in the processed data points with reduced dimension r without relying on a signature of a threat and without use of a threshold, and
  iv. block the abnormal data point.

18. The system of claim 17, wherein the computer program is further dedicated to process a newly arrived N-dimensional data point into a newly-arrived data point with reduced dimension r, and to detect an abnormal data point in the processed data points with reduced dimension r by determining that the newly-arrived data point with reduced dimension r resides outside the normal cluster.

* * * * *